(12) United States Patent
Resendes et al.

(10) Patent No.: US 11,236,250 B2
(45) Date of Patent: Feb. 1, 2022

(54) SWITCHABLE WATER-BASED PAINT OR COATING COMPOSITIONS

(71) Applicant: QUEEN'S UNIVERSITY AT KINGSTON, Kingston (CA)

(72) Inventors: Rui Resendes, Toronto (CA); Philip G. Jessop, Kingston (CA); Michael F. Cunningham, Kingston (CA); Bhanu Prakash Mudraboyina, Kingston (CA); Adam Michael Ozvald, Kingston (CA); Timothy James Clark, Kingston (CA); Brian Mariampillai, Inverary (CA); Yun Yang, Kanata (CA); Amy Marie Holland, Kingston (CA); Charles Howard Honeyman, Toronto (CA)

(73) Assignee: Queen's University at Kingston, Kingston (CA)

( * ) Notice: Subject to any disclaimer, the term of this patent is extended or adjusted under 35 U.S.C. 154(b) by 32 days.

(21) Appl. No.: 15/579,424

(22) PCT Filed: Jun. 6, 2016

(86) PCT No.: PCT/CA2016/050644
§ 371 (c)(1),
(2) Date: Dec. 4, 2017

(87) PCT Pub. No.: WO2016/191890
PCT Pub. Date: Dec. 8, 2016

(65) Prior Publication Data
US 2018/0142117 A1    May 24, 2018

Related U.S. Application Data

(60) Provisional application No. 62/242,643, filed on Oct. 16, 2015, provisional application No. 62/171,141, filed on Jun. 4, 2015.

(51) Int. Cl.
  *C09D 139/00* (2006.01)
  *C09D 133/10* (2006.01)
  (Continued)

(52) U.S. Cl.
  CPC .............. *C09D 133/10* (2013.01); *C08K 3/18* (2013.01); *C08L 101/12* (2013.01); *C09D 5/08* (2013.01);
  (Continued)

(58) Field of Classification Search
  None
  See application file for complete search history.

(56) References Cited

U.S. PATENT DOCUMENTS

| 2011/0294942 | A1  | 12/2011 | Duffy et al. |
| 2013/0105377 | A1* | 5/2013  | Jessop ............... B01D 61/005 210/203 |
| 2014/0076810 | A1* | 3/2014  | Jessop ............... C02F 1/445 210/638 |

FOREIGN PATENT DOCUMENTS

| CN | 104327663 A | 2/2015 |
| EP | 2 868 681 A1 | 5/2015 |

(Continued)

OTHER PUBLICATIONS

Campbell Hausfeld Operating Instructions and Parts Manual for HVLP Paint Sprayers. Nov. 2002. (Year: 2002).*
(Continued)

*Primary Examiner* — Richard A Huhn
(74) *Attorney, Agent, or Firm* — Angela Lyon

(57) ABSTRACT

The present application provides switchable, homogeneous paint composition and methods of painting and/or forming films or coatings using the composition. The composition includes a liquid having an aqueous solution and dissolved acid gas (e.g., carbonated water), and a switchable polymer.

(Continued)

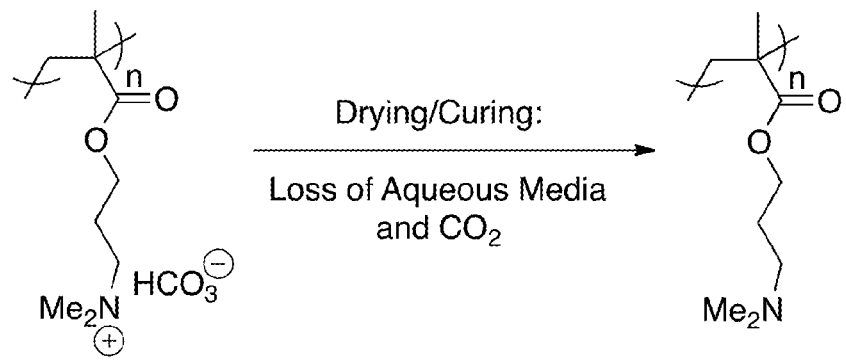

At least partially solvated polymer → Drying/Curing: Loss of Aqueous Media and $CO_2$ → Water-soluble, water-resistant, and/or hydrophobic film or polymeric coating The switchable polymer converts from a protonated, water-soluble form in the liquid to a water-insoluble unprotonated form following removal or substantial removal of the liquid and acid gas.

16 Claims, 7 Drawing Sheets

(51) Int. Cl.
| | |
|---|---|
| *C08K 3/18* | (2006.01) |
| *C09D 201/00* | (2006.01) |
| *C08L 101/12* | (2006.01) |
| *C09D 11/106* | (2014.01) |
| *C09D 5/08* | (2006.01) |
| *C09D 11/107* | (2014.01) |
| *C09D 139/08* | (2006.01) |

(52) U.S. Cl.
CPC .......... C09D 11/106 (2013.01); C09D 11/107 (2013.01); C09D 201/00 (2013.01); *C09D 139/00* (2013.01); C09D 139/08 (2013.01)

(56) References Cited

FOREIGN PATENT DOCUMENTS

| WO | 2012/079175 A1 | 6/2012 |
|---|---|---|
| WO | 2014/097309 A1 | 6/2014 |

OTHER PUBLICATIONS

Ullmann's Encyclopedia of Industrial Chemistry. 2010. vol. 25. "Paints and Coatings, 2. Types" (Year: 2010).*

Monthéard, J. et al., "Nouvelles synthèses des N,N-diméthyl-vinyl-2 (-3 ou -4) benzylamines". Makromol. Chem., Rapid Commun. 1987, 8, 255-259 (Year: 1987).*

Extended European Search Report dated Nov. 15, 2018, including the Supplementary European Search Report and the European Search Opinion, in connection with corresponding EP Application No. 16802310.9 (6 pgs.).

International Search Report and Written Opinion dated Aug. 12, 2016 of corresponding International application No. PCT/CA2016/050644; 9 pgs.

International Preliminary Examination Report dated Apr. 4, 2017; 5 pgs.

* cited by examiner

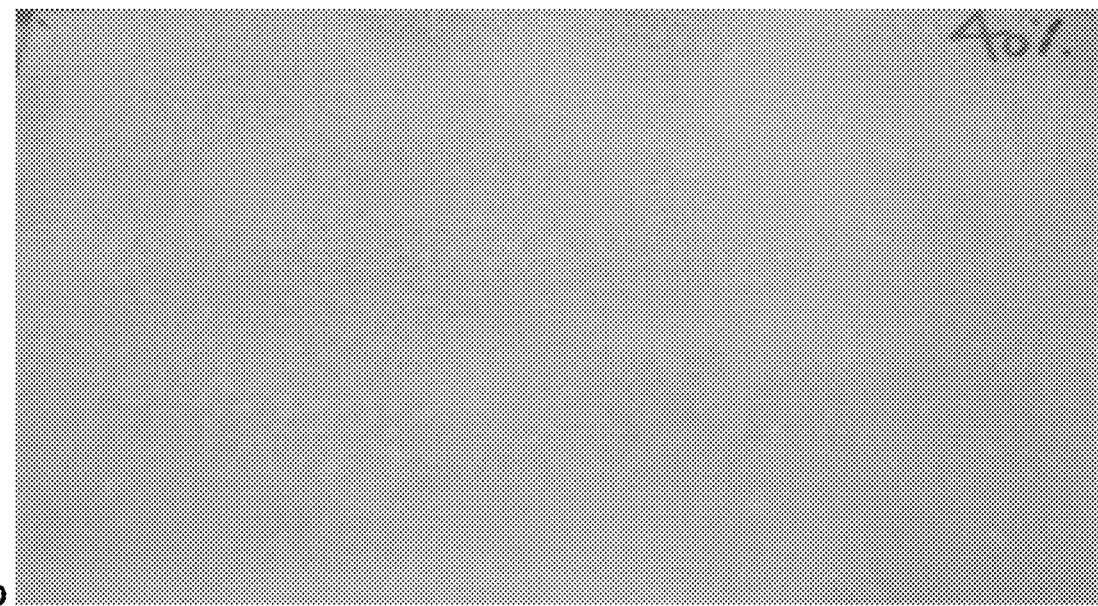
FIGURE 4, cont.

SWITCHABLE WATER-BASED PAINT OR COATING COMPOSITIONS

CROSS-REFERENCE TO RELATED APPLICATIONS

This application claims priority to and the benefit of U.S. provisional application No. 62/171,141 filed on Jun. 4, 2015, and U.S. provisional application No. 62/242,643 filed Oct. 16, 2015, the entire contents of which are incorporated herein by reference.

FIELD OF THE INVENTION

The present application pertains to the field of paints and coatings. More particularly, the present application relates to water-based paints and coatings.

INTRODUCTION

Oil-based paints consist of polymers dissolved in an organic solvent. These oil-based paints are homogeneous, since the polymer is dissolved in the organic solvent. When an oil-based paint is applied to a surface, the solvent evaporates to leave a solid film of polymer. The polymer is selected so that the solid film is neither too hard (which might result in cracking of the film) nor too soft (which might result in the film retaining dirt too easily). Typically, a polymer having a glass transition temperature ($T_g$) between 20° C. and 50° C. is preferred, though other $T_g$ values may be useful for particular applications. While the coating formed from oil-based paints is of high quality, the use of organic solvents suffers from numerous drawbacks, including flammability concerns, inhalation hazards, and environmental problems (such as smog formation).

Water-based paints (also known as "latex paints") consist of water-insoluble polymers existing as small particles suspended in water (i.e., a latex suspension). These paints are heterogeneous since the polymer is in a different phase than the solvent. The suspension is typically stabilized by surfactants, which prevent the polymeric particles from merging and, therefore, coagulating. When a water-based paint is applied to a surface, the particles should merge to form a solid polymer film. Consequently, lower $T_g$ polymers are used in water-based paints so that the polymer is soft enough to allow merging to take place at room temperature. Often the merging is not complete so that the dried film consists of partially-merged particles. Furthermore, the surfactants can interfere with the drying process by inhibiting particle merging and/or by migrating to the surface or to locations where the surfactants increase in concentration, creating a flaw in the coating. Although the coating produced from water-based paints is of lower quality than that obtainable using an oil-based paint, the use of water-based paints avoids the flammability concerns, inhalation hazards and environmental problems associated with oil-based paints.

There remains a need for a water-based paint that is homogeneous, rather than heterogeneous, which would allow users to obtain the higher quality coating associated with oil-based paints while retaining the health, environmental and safety advantages associated with water-based paints.

One strategy for achieving this would be to use a water-soluble polymer. When a paint consisting of a solution of that polymer in water is applied to a surface, the water would evaporate and leave behind the polymer as a coating. Unfortunately, this strategy is not suitable because the resulting coating would be water-soluble and would come off the surface whenever washed or exposed to water (e.g., rain).

The above information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present application provides a water-based composition comprising a switchable polymer, for use as a paint or for producing a water insoluble coating. The present application also provides coatings, films and paints produced from the drying/curing of the water-based composition. In one aspect, the present application provides a water-based composition comprising a polymeric amine, polymeric amidine, or polymeric guanidine, where the polymer is largely insoluble in non-carbonated water but is soluble in carbonated water such that the solution in carbonated water can be used in or as a paint or coating formulation. Application of the solution of polymer in carbonated water onto a surface is followed by partial or complete deprotonation of the polymer, along with water and $CO_2$ loss, leaving behind a film or polymeric coating of the polymer in a largely water-insoluble form.

In accordance with an aspect of the present application, there is provided a composition comprising:

(a) a polymer comprising protonatable moieties in their protonated form; and (b) water into which an acid gas, such as $CO_2$, has been dissolved at a partial pressure higher than in air, wherein the protonatable moieties convert to their non-protonated form with removal of said acid gas or with reduction of the acid gas to an amount equivalent to that present in air, or less, and wherein, upon conversion to said non-protonated form, the polymer forms a substantially hydrophobic coating on a substrate.

In accordance with an aspect of the present application, there is provided a composition comprising:

(a) a polymer comprising protonatable moieties in their protonated form; and (b) water into which $CO_2$ has been dissolved at a partial pressure higher than in air, wherein the protonatable moieties convert to their non-protonated form with removal of $CO_2$ or with reduction of the $CO_2$ to an amount equivalent to that present in air, or less.

The composition defined above is useful for forming a film or a polymer coating on a substrate as part of a switchable paint or coating composition; or, as part of a paint, coating, or ink formulation. Prior to application to the substrate, all or most or some of the protonatable moieties of the polymer are in their protonated form. The polymer forms a homogeneous, or essentially homogeneous, polymeric coating on the substrate when all or a majority of the protonatable moieties of the polymer are converted to their non-protonated form, following application of the composition to a substrate, and the removal of $CO_2$, or with reduction of the $CO_2$ to an amount equivalent to that present in air, or less.

In accordance with an embodiment of the application, there is provided a paint or coating composition, wherein the protonatable moieties are guanidines, amidines, tertiary amines, secondary amines, primary amines, or a combination of two or more of these moieties.

In accordance with another embodiment, there is provided a composition wherein the protonatable moieties comprise one or more of

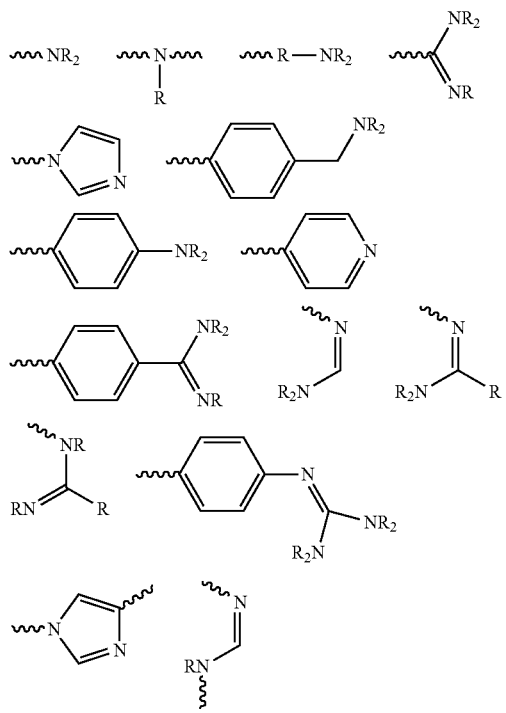

where R is an aliphatic group or a substituted aliphatic group; and the wiggly lines represent one or more bonds attaching the protonatable moiety to the remainder of the polymer.

In accordance with another embodiment, there is provided a composition wherein R is alkyl, substituted alkyl, alkenyl, substituted alkenyl, alkynyl, substituted alkynyl, aryl, or substituted aryl.

In accordance with another embodiment, there is provided a composition wherein R is $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl.

In accordance with another embodiment, there is provided a composition wherein the polymer comprises one or more repeatable unit selected from the group consisting of:

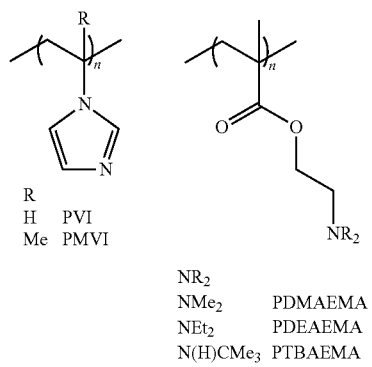

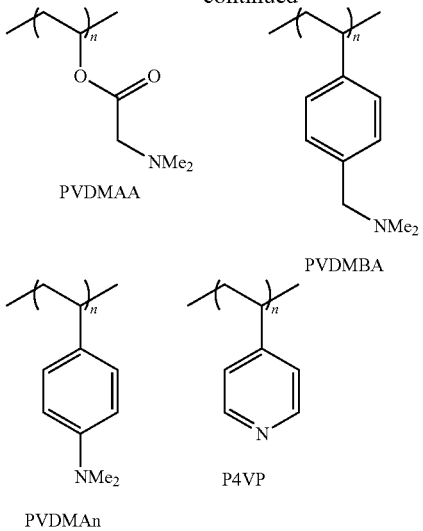

In accordance with another embodiment, there is provided a composition wherein the polymer is poly(2-diethylamino)ethylmethacrylate, (pDEAEMA). In another embodiment, the polymer is poly(2-diethylamino)ethyl methacrylate, (pDEAEMA); or poly(methylmethacrylate)-poly(2-diethylamino)ethylmethacrylate (pMMA-pDEAEMA).

In accordance with another embodiment, there is provided a composition wherein the polymer has a $T_g$ in the range of from about 20° C. to about 50° C. In another embodiment, the polymer has a $T_g$ in the range of from about 20° C. to about 50° C.; or, alternatively, from about 30° C. to about 50° C.; or, alternatively, from about 40° C. to about 50° C.

In accordance with another embodiment, there is provided a composition wherein the polymer is present at a concentration of from about 10-60% by weight, or from about 15-40% by weight or about 20% or about 25%.

In accordance with another aspect of the application, there is provided a method of forming a coating wherein the homogeneous polymeric composition described above is applied to a surface and allowed to dry. As the composition dries under ambient conditions, the amount of $CO_2$ in contact with the composition is reduced to the amount present in air (under the ambient conditions), resulting in formation of the coating.

In accordance with another embodiment of the application, there is provided a method wherein the composition is painted, sprayed or cast on the surface.

In accordance with another embodiment of the application, there is provided a method wherein the composition is painted onto the surface by brush, draw-down bar, doctor blades, spray, heated spray, or any other method of paint application.

In accordance with another embodiment of the application, there is provided a method wherein the composition is applied to a surface at a temperature of about room temperature; or, alternatively, at a temperature of about 25° C.; or, alternatively, at a temperature between about 25° C. to about 15° C.; or, alternatively at a temperature between about 25° C. to about 10° C.; or, alternatively at a temperature between about 25° C. to about 5° C.; or, alternatively at a temperature between about 25° C. to about 1° C.; or, alternatively at a temperature about 4° C.

In accordance with an aspect of the present application, there is provided a composition comprising:
a liquid medium; and
a polymer comprising protonatable moieties, wherein a portion of the protonatable moieties are in their protonated form such that the degree of polymer protonation is sufficient to at least partially solvate the polymer in the liquid medium;
the liquid medium comprising water or an aqueous solution and an acid gas dissolved at a concentration sufficient to maintain said portion of protonatable moieties in their protonated form;
wherein,
when the composition is applied to a substrate under ambient conditions the concentration of dissolved acid gas decreases such that some or all of the portion of protonatable moieties switch from their protonated form to their non-protonated form and the degree of polymer protonation is reduced such that it becomes insufficient to maintain the at least partial dissolution of the polymer in the liquid medium, and the polymer forms a film that is substantially water-insoluble, water-resistant, and/or hydrophobic.

In accordance with another aspect of the present application, there is provided a composition comprising:
a polymer comprising protonatable moieties at least a portion of which are in their protonated form;
water; and
an acid gas dissolved in the water at a partial pressure higher than the partial pressure of the acid gas in air,
wherein all or a portion of the protonatable moieties that are in their protonated form convert to their non-protonated form reduction of the partial pressure of the dissolved acid gas to an amount that is approximately equivalent to the partial pressure of the acid gas present in the ambient atmosphere,
wherein, upon application of the composition to a substrate and conversion of all or a portion of said protonated protonatable moieties to said non-protonated form, the degree of protonation of the polymer is reduced and the polymer forms a substantially water-insoluble, water-resistant, and/or hydrophobic coating on the substrate.

In accordance with an embodiment of the present application, there is provided a composition which further comprises at least one cross-linking agent.

In accordance with another embodiment, there is provided a composition wherein the at least one crosslinking agent is inhibited from cross-linking by the dissolved acid gas.

In accordance with another embodiment, there is provided a composition wherein the protonatable moieties are guanidines, amidines, tertiary amines, secondary amines, primary amines, or a combination of two or more of these moieties.

In accordance with another embodiment, there is provided a composition wherein the protonatable moieties comprise one or more of

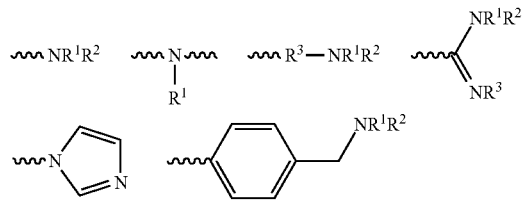

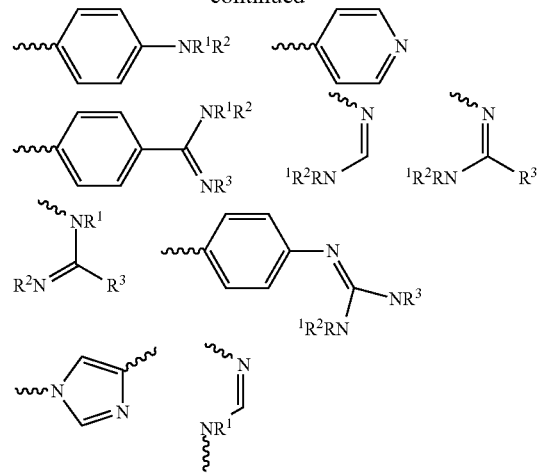

where
the wiggly lines represent one or more bonds attaching the protonatable moiety to the remainder of the polymer; and
each of $R^1$, $R^2$, and $R^3$ is independently H, an aliphatic group, a substituted aliphatic group, or absent, as required to satisfy valence rules.

In accordance with another embodiment, there is provided a composition wherein each of $R^1$, $R^2$, and $R^3$ is independently H, alkyl, substituted alkyl, cycloalkyl, substituted cycloalkyl, heterocycloalkyl, substituted heterocycloalkyl, alkenyl, substituted alkenyl, alkynyl, substituted alkynyl, aryl, substituted aryl, heteroaryl, or substituted heteroaryl.

In accordance with another embodiment, there is provided a composition wherein each of $R^1$, $R^2$, and $R^3$ is independently H; a substituted or unsubstituted $C_1$ to $C_8$ alkyl, alkenyl, or alkynyl group that is linear, branched, or cyclic; a substituted or unsubstituted $C_1$ to $C_8$ alkyl, alkenyl, or alkynyl group that is linear, branched, or cyclic, wherein one or more C of the alkyl group is replaced by $\{-Si(R^4)_2-O-\}$; a substituted or unsubstituted $C_kSi_m$ group where k and m are independently a number from 0 to 8 and k+m is a number from 1 to 8; a substituted or unsubstituted $C_4$ to $C_8$ aryl group; a substituted or unsubstituted $C_4$ to $C_8$ aryl group, wherein one or more C is replaced by $\{-Si(R^4)_2-O-\}$; a substituted or unsubstituted aryl group having 4 to 8 ring atoms; a substituted or unsubstituted aryl group having 4 to 8 ring atoms, wherein said aryl group comprises one or more $\{-Si(R^4)_2-O-\}$; a $-(Si(R^4)_2-O)_p-$ chain in which p is from 1 to 8 which is terminated by H, or is terminated by a substituted or unsubstituted $C_1$ to $C_8$ aliphatic group; wherein $R^4$ is a substituted or unsubstituted $C_1$ to $C_8$ aliphatic group; or wherein any two of $R^1$, $R^2$, and $R^3$, taken together with the nitrogen to which they are attached, are joined to form a heterocyclic ring.

In accordance with another embodiment, there is provided a composition wherein each of $R^1$, $R^2$, and $R^3$ is H, $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl.

In accordance with another embodiment, there is provided a composition wherein the polymer is a linear or branched homopolymer; a linear or branched co-polymer comprising two or more repeat units; a dendrimer; a self-assembled polymer; a cross-linking polymer; or any combination thereof.

In accordance with another embodiment, there is provided a composition wherein the co-polymer, dendrimer, self-assembled polymer, or cross-linking polymer comprise repeat units having protonatable moieties, and repeat units having no protonatable moieties.

In accordance with another embodiment, there is provided a composition wherein the co-polymer is a random co-polymer; a graft co-polymer; a block co-polymer; a star co-polymer; or any combination thereof.

In accordance with another embodiment, there is provided a composition wherein the polymer comprises one or more repeat units selected from the group consisting of:

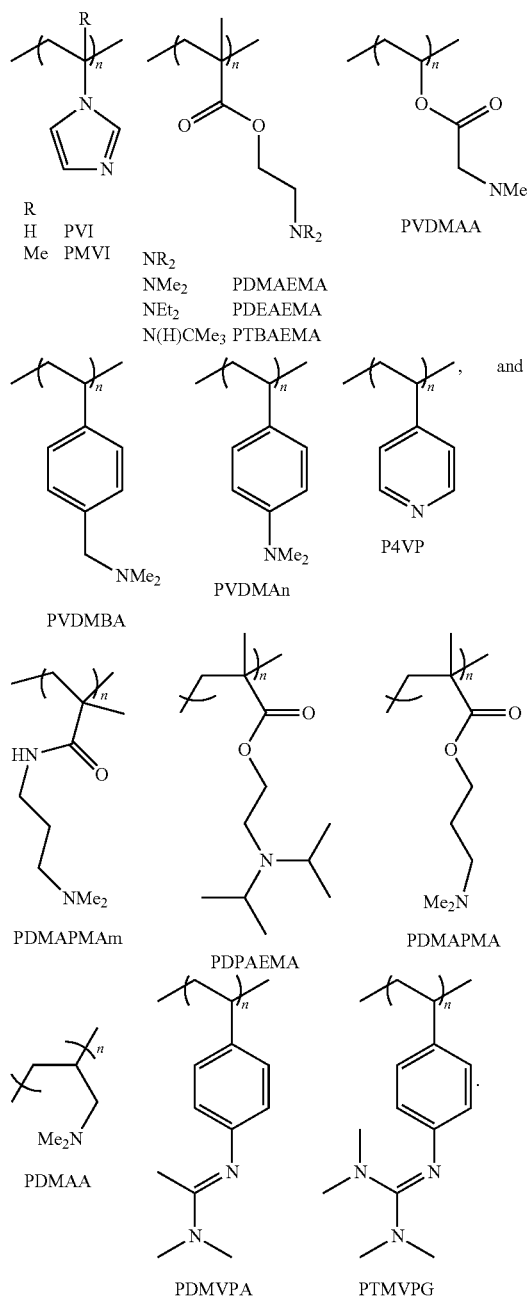

In accordance with another embodiment, there is provided a composition wherein the polymer is poly(2-diethylamino) ethyl methacrylate, (p(DEAEMA)); or poly(methylmethacrylate)-poly(2-diethylamino)ethylmethacrylate (p(MMA-co-DEAEMA)); or, poly(N,N'-dimethylaminopropylmethacrylamide); or, poly(N,N'-dimethylaminopropylmethacrylamide)-co-poly(butylmethacrylate) (p(DMAPMAm-co-BMA)); or poly(dimethylaminopropylmethacrylamide-co-butylacrylate) (p(DMAPMAm-co-BA)); or poly(N,N'-dimethylaminopropylmethacrylamide)-poly(butylmethacrylate)-poly(2-hydroxyethylmethacrylate) (p(DMAPMAm-co-BMA-co-NEMA)).

In accordance with another embodiment, there is provided a composition wherein the polymer has a $T_g$ in the range of from about 20° C. to about 50° C.; or, alternatively, from about 30° C. to about 50° C.; from about 40° C. to about 50° C. or, alternatively, from about 30° C. to about 45° C. In other embodiments, the polymer has a $T_g$ in the range of from about −20° C. to about 50° C.; or, alternatively, from about −15° C. to about 50° C.; or, alternatively from about −20° C. to about 20° C.

In accordance with another embodiment, there is provided a composition wherein the polymer has a molecular weight between 5000-100000; or, between 10000-100000; or, between 10000-80000; or between 15000-80000; or, between 20000-75000; or, between 25000-70000; or between 40000-60000.

In accordance with another embodiment, there is provided a composition wherein the polymer is present at a concentration of from about 10-60% by weight, or from about 15-40% by weight. In other embodiments, the polymer is present at a concentration of from about 20-40% by weight, or from about 20-30% by weight, or about 20%, or about 25%.

In accordance with another embodiment, there is provided a composition wherein the composition forms a waterborne dispersion.

In accordance with another embodiment, there is provided a composition wherein polymer is only partially dissolved in the liquid medium or the water when the acid gas is dissolved at a concentration sufficient to maintain said at least a portion of the protonatable moieties in their protonated form.

In accordance with another embodiment, there is provided a composition wherein the polymer is a co-polymer, wherein each component of said co-polymer has a different solubility in the liquid medium or water.

In accordance with another embodiment, there is provided a composition wherein the liquid medium or water further comprises at least one organic co-solvent, at least one rheology modifier, at least one stabilizer, at least one antioxidant; at least one pigment, at least one titanium dioxide, or at least one surfactant; at least one surface tension modifier; at least one buffer or pH modifier; at least one biocide; at least one bacteriocide; at least one dye; at least one UV absorber; at least one preservative; or, any combination thereof.

In accordance with another embodiment, there is provided a composition wherein the film is also resistant to organic solvents, acidic solutions, or basic solutions.

In accordance with another embodiment, there is provided a composition wherein the acid gas is $CO_2$, $CS_2$, or COS. In other embodiments, the acid gas is $CO_2$.

In accordance with another aspect, there is provided a paint formulation comprising a composition as herein described.

In accordance with another aspect, there is provided a coating formulation comprising a composition as herein described.

In accordance with another aspect, there is provided an ink formulation comprising a composition as herein described.

In accordance with another aspect, there is provided a method of forming a film on a substrate, comprising applying a composition as herein described to a substrate; and curing the composition.

In accordance with an embodiment, there is provided a method wherein curing comprises heating, drying under a stream of flushing gas, or allowing the composition to dry under ambient conditions.

In accordance with another embodiment, there is provided a method further comprising crosslinking the composition.

In accordance with another embodiment, there is provided a method wherein crosslinking the composition comprises crosslinking during, or after application of the composition to the substrate. In another embodiment, crosslinking the composition comprises crosslinking while curing the composition.

In accordance with another embodiment, there is provided a method wherein the composition is spread, sprayed, flow coated, electrodeposited, roll-to-roll processed, painted, dipped, or cast on the substrate. In other embodiments, the composition is applied to a substrate by brush, draw-down bar, doctor blades, knives, air knives, immersion, extrusion, spray, heated spray, or any other application method. In yet other embodiments, the composition is applied to the substrate by ink jets, roll-to-roll processing, lithography, flexography, or ink rollers.

In accordance with another embodiment, there is provided a method wherein the composition is applied to a surface at a temperature of about room temperature; or, alternatively, at a temperature of about 25° C.; or, alternatively, at a temperature between about 25° C. to about 15° C.; or, alternatively at a temperature between about 25° C. to about 10° C.; or, alternatively at a temperature between about 25° C. to about 5° C.; or, alternatively at a temperature between about 25° C. to about 1° C.; or, alternatively at a temperature about 4° C.; or, alternatively at a temperature about, or below 0° C.

In accordance with another embodiment, there is provided a method wherein the composition is applied to a surface at a temperature of about 250° C.; or, alternatively, at a temperature of about 150° C.; or, alternatively, at a temperature between about 60° C. to about 250° C.; or, alternatively at a temperature between about 60° C. to about 200° C.; or, alternatively at a temperature between about 60° C. to about 150° C.; or, alternatively at a temperature between about 60° C. to about 110° C.

In accordance with another aspect, there is provided a film made by the method as described herein.

BRIEF DESCRIPTION OF THE FIGURES

For a better understanding of the present invention, as well as other aspects and further features thereof, reference is made to the following description which is to be used in conjunction with the accompanying drawings, where.

Figure 1:
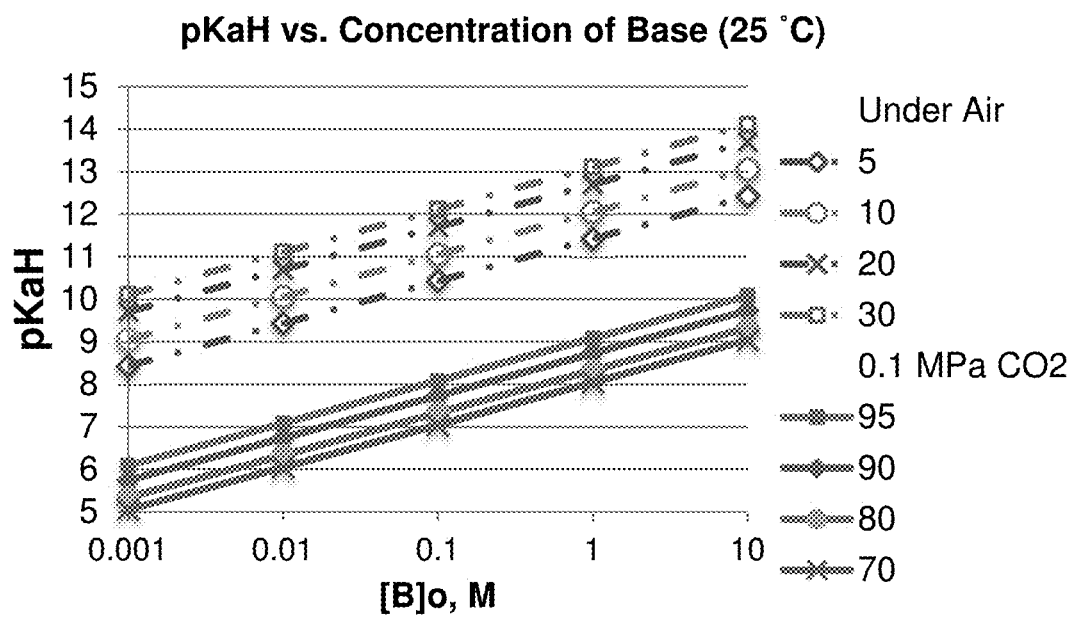
FIG. 1 depicts a graphical representation of pKaH values required for a base to have a specified % protonation when mixed with water at 25° C. Dashed lines show required pKaH to obtain specified % protonation in absence of $CO_2$. Solid lines show pKaH required to obtain specified % protonation values in presence of 0.1 MPa of $CO_2$.

Table 1 delineates gel-permeation chromatography (GPC) analysis of switchable poly(MMA-co-DEAEMA) co-polymers;

Table 2 delineates characterization of poly(MMA-co-DEAEMA) co-polymers (Example 3B);

Table 3 delineates water, isopropanol and 1M acetic acid wipe tests on 10/90, 20/80, 30/70 and 40/60 poly(MMA-co-DEAEMA) polymeric coatings;

Table 4 delineates water, isopropanol and 1M acetic acid wipe tests on cured co-polymer 10/90, 20/80, 30/70 and 40/60 poly(MMA-co-DEAEMA) polymeric coatings crosslinked with 1,6-dibromohexane (a) or dibromo-p-xylene (b);

Table 5 delineates water, isopropanol and 1M acetic acid wipe tests on cured polymeric coatings of homopolymer ptBAEMA, ptBAEMA cross-linked with 1,6-dibromo hexane, and ptBAEMA cross-linked dibromo-p-xylene;

Table 6 delineates poly(DMAPMAm-co-BMA) resistance to aqueous solutions, and organic solvents;

Table 7 delineates results of solvent wipe tests for poly (BMA-co-DMAPMAm-co-HEMA) coatings where polymer was dissolved in methyl ethyl ketone (MEK) prior to application (example without $CO_2$); and Table 8 delineates results of solvent wipe tests for poly (BMA-co-DMAPMAm-co-HEMA) coatings where polymer was dissolved in methyl ethyl ketone (MEK)/carbonated water prior to application (example with aqueous $CO_2$);

DETAILED DESCRIPTION

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

As used herein, "protonatable moiety", "switchable moiety" or "switchable group" refers to a N-comprising functional group that exists in a first form, such as a non-protonated hydrophobic or relatively water-insoluble form, under a first set of conditions (e.g., at a first partial pressure of an acid gas, such as $CO_2$, in the presence of water or an aqueous solution); and, exists in a second form, such as a protonated hydrophilic or relatively water-soluble form, under a second set of conditions (e.g., at a second partial pressure an acid gas, such as to $CO_2$, that is higher than the first partial pressure). The switchable moiety can be an amine, amidine, or guanidine that comprises a nitrogen atom sufficiently basic to be protonated by a trigger, such as an acid gas (e.g., $CO_2$, COS, $CS_2$, or a combination thereof). In some embodiments, when the acid gas used is $CO_2$, and the group is referred to as a '$CO_2$-switchable group'.

As used herein, the term "acid gas" refers to a gas that forms an acid when mixed with water or an aqueous solution. Although use of $CO_2$ as an acid gas is mentioned and is used in the examples provided in this application, other acid gases also include $CS_2$ and COS. As would be readily understood by one skilled in the relevant art, $CS_2$ is a volatile liquid if its partial pressure in the gas phase is greater than its normal vapour pressure at that temperature; and, it's a gas if its partial pressure is lower than its normal vapour pressure at that temperature.

However, as would be appreciated by one skilled in the relevant art, any one of the acid gases $CO_2$, $CS_2$, or COS has associated with it environmental and/or health risks. For example: $CS_2$ and COS pose a flammability risk where $CO_2$ poses none; and $CS_2$ and COS have a greater toxicity than $CO_2$. As such, as one skilled in the relevant art would understand, should triggers such as $CS_2$ and COS be used in place of, or in combination with $CO_2$ for the herein described paint and coating compositions, human and environmental exposure to the $CS_2$ or COS triggers would have to be properly managed and limited. Such exposure will be limited by following regulations and safety measures known in the art, or those delineated by industrial, commercial, and/or government regulations and governing bodies, etc.

Other examples of acid gases include $SO_2$ and $NO_2$; however, these gases are relatively more acidic than $CO_2$. A composition comprising $SO_2$ or $NO_2$ as an acid gas may comprise a polymer having protonatable, switchable moieties of lower basicity relative to that required for compositions comprising, for example, $CO_2$. Examples of switchable groups comprising protonatable moieties discussed herein have basicities suitable for use with $CO_2$ at 1 bar. One skilled in the relevant art could identify basic groups having different basicities suitable for use with, for example, other acid gases or with $CO_2$ at a pressure greater than 1 bar. Further, as would be appreciated by one skilled in the relevant art, acid gases $SO_2$ and $NO_2$ also have associated with them environmental and/or health risks. As such, as one skilled in the relevant art would understand, should acid gases such as $SO_2$ or $NO_2$ be used in the herein described paint and coating compositions (for example, in place of, or in combination with other acid gases, like $CO_2$), human and environmental exposure to those acid gasses would have to be properly managed and limited. Such exposure may be limited by following regulations and safety measures known in the art, or those delineated by industrial, commercial, and/or government regulations and governing bodies, etc.

To identify a moiety or functional group suitable to act as a $CO_2$-switchable moiety or switchable functional group at a particular pH, the relationship between pH, basicity of the switchable group (as measured by the pKaH), and concentration of the switchable group in water (moles of switchable group per litre of solution) is used. If it is assumed, for the simplest case, that all switchable groups are fully dissolved in water in both neutral and protonated forms, then % protonation can be obtained using activity coefficients, or reasonably approximated using equation (A):

$$\% \text{ protonation} = \frac{[H_3O^+]}{[H_3O^+] + K_{aH}} \quad (A)$$

Switching of $CO_2$-switchable groups using equation 1 requires that pH of the aqueous solution in the absence of $CO_2$ is above a system midpoint, and pH in the presence of $CO_2$ is below said system midpoint. The system midpoint is defined as pH at which number of moles of unprotonated base in the system is equal to number of moles of protonated base in the system. Contrast this to a definition of an aqueous phase midpoint, which is defined as pH at which number of moles of unprotonated base in the aqueous phase is equal to number of moles of protonated base in the aqueous phase. In the simplest case, where the switchable groups are fully dissolved in an aqueous phase in both their neutral form and cationic form, then the system midpoint and aqueous phase midpoint are equal, and occur when pH is equal to pKaH. In order for a group to be "switched" adequately by $CO_2$ addition, so that its properties are significantly changed, it must be converted from a largely unprotonated state (low % protonation) to a largely protonated state (high % protonation). Therefore, a suitable switchable functional group to choose is one that will ensure that pH without $CO_2$ and pH with $CO_2$ are on opposite sides of the system midpoint.

Because $CO_2$ is acidic, and therefore lowers pH, pH without $CO_2$ should be above the system midpoint (meaning at a pH higher than the system midpoint); and, pH with $CO_2$ should be below the system midpoint (meaning at a pH lower than the system midpoint). Equation (B) predicts $[H_3O^+]$ concentration at any particular concentration of switchable species in water, for this simplest case where a switchable group is fully dissolved in both its neutral and cationic forms. From the $[H_3O^+]$ obtained using equation (B), one can use equation (A) to calculate % protonation of switchable groups when $CO_2$ is absent.

With regard to Equation (B), when a base is added to pure water at a concentration $[B]_0$, under air, the resulting pH is in the basic region. The base is partly protonated due to production of hydroxide salt $[BH^+][OH^-]$. From $[H_3O^+]$, % protonation can be calculated (equation (A)). For an ideal switchable group, % protonation would be very low (for example, below 20%, ideally below 5%). Equation (C) can be used to calculate $[H_3O^+]$ (and then via equation (A), % protonation of the switchable groups) when $CO_2$ is present at a pressure $P_{CO2}$. Ideally, % protonation of switchable groups would be high (for example: above 60%, ideally above 95%)

$$0=[H_3O^+]^3+(K_{aH}+[B]_0)[H_3O^+]^2-K_w[H_3O^+]-K_wK_{aH} \quad (B)$$

$$0=[H_3O^+]^3+(K_{aH}+[B]_0)[H_3O^+]^2-(K^*_{a1}K_HP_{CO2}+K_w)[H_3O^+]-(K^*_{a1}K_HP_{CO2}+K_w)K_{aH} \quad (C)$$

Figure 2:
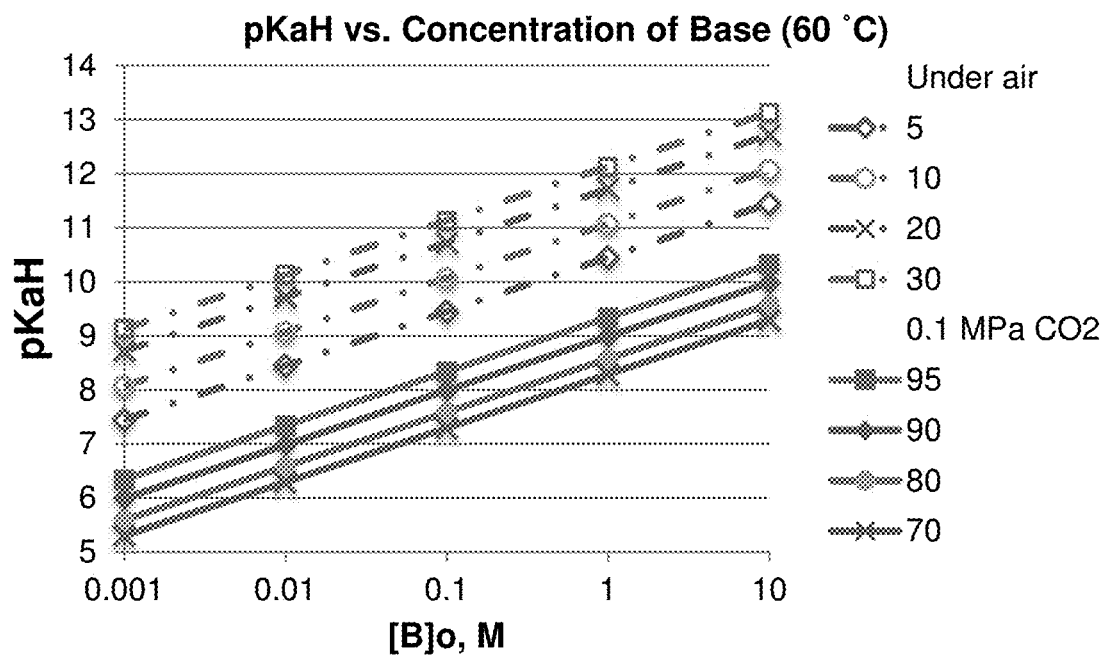
FIG. 2 depicts a graphical representation of pKaH values required for a base to have a specified % protonation when mixed with water at 60° C. Dashed lines show required pKaH to obtain specified % protonation in absence of $CO_2$. Solid lines show pKaH required to obtain specified % protonation values in presence of 0.1 MPa of $CO_2$.
Figure 3:
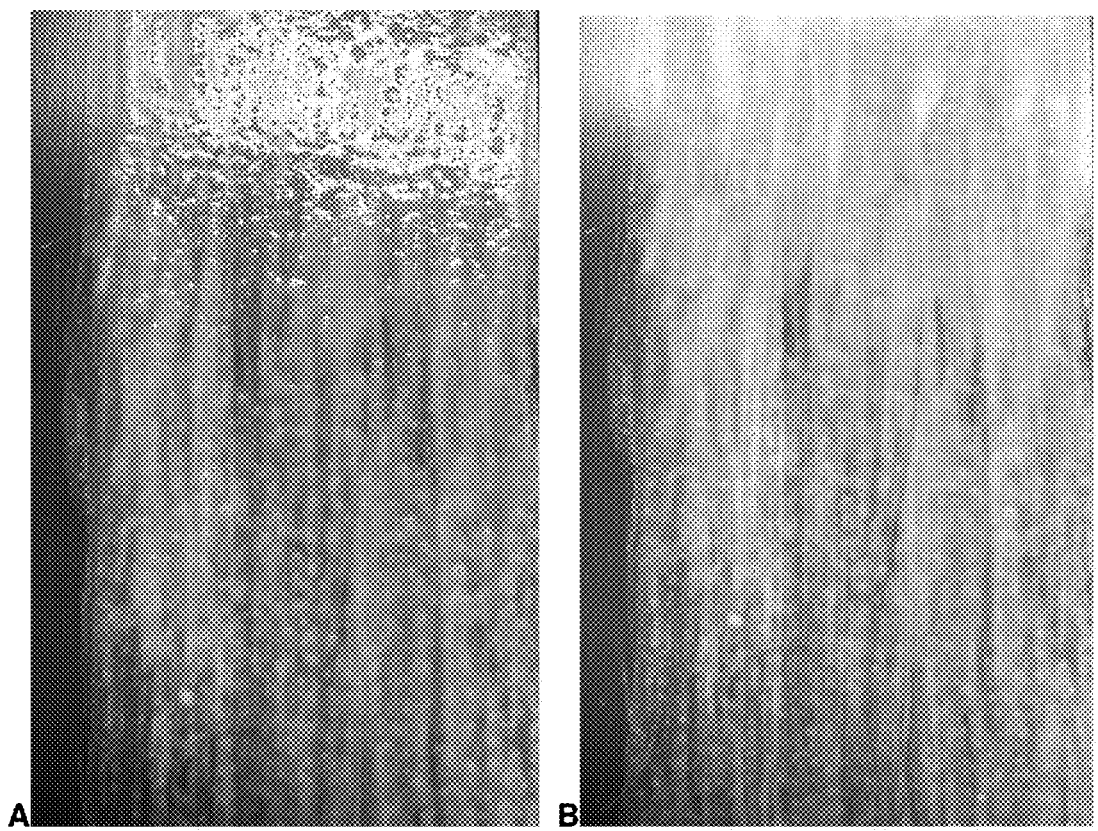
FIG. 3 depicts: A. 10/90 poly(MMA-co-DEAEMA) mixed with $TiO_2$ brushed onto primed aluminum sheet (wet); and, B. 10/90 poly(MMA-co-DEAEMA) mixed with $TiO_2$ brushed onto primed aluminum sheet (dried)

Adding a compound having a switchable group for a desired set of conditions (temperature and concentration), to water at that concentration will give a pH at which % protonation of the switchable group is low, and then adding $CO_2$ to the solution will give a pH at which % protonation of the switchable group is high. FIGS. 1 and 2, which were derived from equations (A) and (B) (under air), and (A) and (C) (under $CO_2$), show limitations on the basicity of the switchable group (as measured by its pKaH). Using equations (A), (B), and (C), similar graphs can be prepared for other temperatures (using appropriate values of the equilibrium constants) and/or other pressures of $CO_2$. This information facilitates selection of switchable groups.

Please note that the above assumes that there are no other components in the system that adjusts pH: it is assumed that pH is controlled exclusively by switchable groups and $CO_2$.

If $CO_2$-switchable groups are part of a polymer, then trends will be similar but the numbers may not be exactly the same. The exact numbers may not be the same because, in cases where the switchable groups may not be completely dissolved in an aqueous phase, the system midpoint and the aqueous midpoint may differ. As before, the best switchable functional group to choose is one that will ensure that pH without $CO_2$ and pH with $CO_2$ are on opposite sides of the system midpoint; but, in cases of partial or complete insolubility, the system midpoint may differ from the aqueous phase midpoint.

As would be readily appreciated by a worker skilled in the art, since few protonation ionization reactions proceed to completion, when a switchable or protonatable group, or polymer comprising switchable or protonatable groups (also referred herein as a switchable polymer), is referred to herein as being "protonated" or "ionized" it means that all, or a majority of the switchable groups are protonated/ionized; or, that the switchable groups/switchable moieties are at a degree of protonation/ionization that facilitates at least partial solvation/dissolution of the polymer in aqueous media. In non-limiting examples, the degree of protonation may be more than about 90%, or about 95%, or more than about 95% of the molecules are protonated/ionized.

As would be understood by one skilled in the relevant art, what degree of protonation/ionization is necessary to achieve at least partial solvation or dissolution of a polymer in aqueous media is dependent on the type of polymer(s) being used (as defined below), and the constituents, if any, of the water or aqueous media. One skilled in the relevant art would know how to determine the necessary degree of protonation/ionization, either qualitatively or quantitatively, through routine experimentation.

Further, without wishing to be bound by theory, it has been considered that lower degrees of protonation may also be sufficient for a polymer comprising protonatable moieties to become at least partially solvated in water or an aqueous medium; for example: between 50-60%. However, with a lower degree of protonation, a higher content of protonatable, or switchable groups may be required for the polymer to become at least partially solvated, consequently leaving a higher amount of protonatable moieties unprotonated in the polymer. As would be understood by one in the relevant art, a higher content of non-protonated, protonatable moieties (e.g., amine groups) may not be suitable for all applications of a paint or coating formulation. As such, in some embodiments, while a lower degree of protonation may suitable to achieve partial solvation of the polymer, it may not be suitable for a formulation's end use; and as such, a higher degree of protonation may be desired.

As would also be readily appreciated by a worker skilled in the relevant art, since few deprotonation/deionization reactions proceed to completion, when a switchable group, or polymer comprising a switchable group (also referred herein as a switchable polymer), is referred to herein as being "deprotonated", "non-protonated", "unprotonated", "deionized", or "non-ionized", it means that all, or a majority of the switchable groups are non-protonated/non-ionized; or, that the switchable groups/switchable moieties are at a degree of protonatation/ionization that does not facilitate at least partial solvation/dissolution of the polymer in aqueous media.

The term "switched" means that physical properties, such as water solubility, have been modified. "Switchable" means able to be converted from a first state with a first set of physical properties, e.g., a first state of a given water solubility, to a second state with a second set of physical properties, e.g., a state of higher water solubility. As one skilled in the relevant art would understand and appreciate, the terms "first set of physical properties" and "second set of physical properties" are considered different relative to each other. For example, as used herein, terms such as "water soluble or hydrophilic" and "substantially water-insoluble, water resistant, or hydrophobic" are relative with respect to each other: a first, water-insoluble, water-resistant, or hydrophobic form of a switchable polymer as described herein is considered to be more water-insoluble, water-resistant, or hydrophobic relative to a second, water soluble or hydrophilic form of the same switchable polymer. A "trigger" is a change of conditions (e.g., introduction or removal of a gas) that causes a change in the physical properties, e.g., water solubility. An example of such a trigger is an acid gas.

"Carbonated water" means a solution of water in which $CO_2$ has been dissolved in an amount higher than that resulting from contact with air under ambient conditions.

The term "non-carbonated water" refers to water that is free of $CO_2$ or that only contains $CO_2$ at an amount equivalent to or approximately equivalent to the amount of $CO_2$ present in water when the water is in contact with air under ambient conditions.

Further, although some terms used herein imply the exclusive use of $CO_2$ as a trigger, those terms are intended to be broad enough to encompass the use of other possible acid gases, such as COS or $SO_2$. For example the term "carbonated water" implies that $CO_2$ was added to water, but is intended to include the possibility that another acid gas was used instead. Similarly, references to bicarbonate salts or hydrogen carbonate salts imply use of $CO_2$ as the acid gas, but are intended to include the possibility that another acid gas was used instead. For example, one skilled in the relevant art would understand that if $SO_2$ were to be used as an acid gas, then a hydrogen sulfite salt would be formed.

As used herein, a "flushing gas" or "a gas that has substantially no carbon dioxide" means that the gas has insufficient acid gas (e.g., $CO_2$) content to interfere with removal of said acid gas from a solution, and is sufficiently inert such that it does not interfere with switching between a first state and a second state. For some applications, air may be a gas that has substantially no $CO_2$. Untreated air may be successfully employed, i.e., air in which the $CO_2$ content is unaltered; this would provide a cost saving. For instance, air may be a gas that has substantially no $CO_2$ because in some circumstances, the approximately 0.04% by volume of $CO_2$ present in air is insufficient to maintain a compound in a switched form, such that air can be a trigger used to remove $CO_2$ from a solution and cause switching. Similarly, "a gas that has substantially no $CO_2$, $CS_2$ or COS" has insufficient $CO_2$, $CS_2$ or COS content to interfere with the removal of $CO_2$, $CS_2$ or COS from the solution.

As used herein, "amidine" refers to a switchable group with a structure such as $X-N=CR^1NR^2R^1$, $R^1N=C(-X)NR^2R^3$, $R^3NH-CR^2N(-X)R^1$ where $R^1$ through $R^3$ are as defined herein, and X indicates a point of attachment. As would be readily appreciated by a worker skilled in the relevant art, the structures drawn herein to depict amidines encompass all rotational isomers thereof.

As used herein, "amine" refers to a switchable functional group with a structure $-NR^1R^2$, where $R^1$ and $R^2$ are as defined herein.

As used herein, "guanidine" refers to a switchable functional group with a structure such as $X-N=CNR^1R^2NR^3R^5$, $R^1N=CN(X)R^2NR^3R^5$, $R^1N=CNR^2R^3N(X)R^5$ where $R^1$ through $R^3$ are as defined herein and $R^5$ is defined the same as $R^1$ through $R^3$, and X indicates a point of attachment. As would be readily appreciated by a worker skilled in the relevant art, the structures drawn herein to depict guanidines encompass all rotational isomers thereof.

As used herein, the term "a basic nitrogen" or "a nitrogen that is sufficiently basic to be protonated by an acid gas/carbonic acid" is used to denote a nitrogen atom that has a lone pair of electrons available and susceptible to protonation. Although carbonic acid ($CO_2$ in water) is mentioned, such a nitrogen would also be protonated by $CS_2$ in water and COS in water. This term is intended to define the nitrogen's basicity and it is not meant to imply which of the three trigger gases ($CO_2$, $CS_2$ or COS) is used.

As used herein, "aliphatic" refers to hydrocarbon moieties that are linear, branched or cyclic, may be alkyl, alkenyl, alkynyl, aryl, heteroaryl, a $C_kSi_m$ group, or a $-(Si(R^4)_2-O)_p-$ chain, and may be substituted or unsubstituted. "Alkyl" means a hydrocarbon moiety that is linear, branched or cyclic and contains only single carbon to carbon bonds. Examples of alkyl groups are methyl, ethyl, propyl, isopropyl, cyclopropyl, n-butyl, t-butyl, cyclobutyl, pentyl, cyclopentyl, hexyl, cyclohexyl, and the like. "Alkenyl" means a hydrocarbon moiety that is linear, branched or cyclic and contains at least one carbon to carbon double bond. "Alkynyl" means a hydrocarbon moiety that is linear, branched or cyclic and contains at least one carbon to carbon triple bond. "Aryl" means a moiety including a substituted or unsubstituted aromatic ring, including heteroaryl moieties and moieties with more than one conjugated aromatic ring; optionally it may also include one or more non-aromatic ring. "$C_5$ to $C_8$ Aryl" means a moiety including a substituted or unsubstituted aromatic ring having from 5 to 8 carbon atoms in one or more conjugated aromatic rings. Examples of aryl moieties include phenyl. "Heteroaryl" means a moiety including a substituted or unsubstituted aromatic ring having from 4 to 8 carbon atoms and at least one heteroatom in one or more conjugated aromatic rings. As used herein, "heteroatom" refers to non-carbon and non-hydrogen atoms, such as, for example, O, S, and N. Examples of heteroaryl moieties include pyridyl tetrahydrofuranyl and thienyl. "$C_kSi_m$ group" means a substituted or unsubstituted $C_kSi_m$ group where k and m are, in a non-limiting example, independently a number from 0 to 8, and k+m is a number from 1 to 8. A "$-(Si(R^4)_2-O)_p-$ chain" means a chain in which p is, in a non-limiting example, from 1 to 8 which is terminated by H, or is terminated by a substituted or unsubstituted $C_1$ to $C_8$ aliphatic group, wherein $R^4$ is a substituted or unsubstituted $C_1$ to $C_8$ aliphatic group.

"Short chain aliphatic" or "lower aliphatic" refers to $C_1$ to $C_6$ aliphatic. "Long chain aliphatic" or "higher aliphatic" refers to aliphatic groups having more than 6 carbons, such as $C_7$ to $C_{20}$ or $C_7$ to $C_{12}$ aliphatic.

"Substituted" means having one or more substituent moieties whose presence does not interfere with the desired reaction; or means having one or more substituent moieties present that either facilitates or improves desired reactions and/or functions of the invention, or does not impede desired reactions and/or functions of the invention. Examples of substituents include alkyl, alkenyl, alkynyl, aryl, aryl-halide, heteroaryl, cycloalkyl (non-aromatic ring), $Si(alkyl)_3$, $Si(alkoxy)_3$, halo, alkoxyl, amino, alkylamino, alkenylamino, amide, amidine, hydroxyl, thioether, alkylcarbonyl, alkylcarbonyloxy, arylcarbonyloxy, alkoxycarbonyloxy, aryloxycarbonyloxy, carbonate, alkoxycarbonyl, aminocarbonyl, alkylthiocarbonyl, phosphate, phosphate ester, phosphonato, phosphinato, cyano, acylamino, imino, sulfhydryl, alkylthio, arylthio, thiocarboxylate, dithiocarboxylate, sulfate, sulfato, sulfonate, sulfamoyl, sulfonamide, nitro, nitrile, azido, heterocyclyl, ether, ester, silicon-containing moieties, thioester, or a combination thereof. Certain substituents, such as, but not limited to, alkyl halides, are known to be quite reactive, and are acceptable so long as they do not interfere with the desired reaction. Further, the substituents may themselves be substituted. For instance, an amino substituent may itself be mono or independently disubstitued by further substituents defined above, such as alkyl, alkenyl, alkynyl, aryl, aryl-halide and heteroaryl cycloalkyl (non-aromatic ring).

As used herein, the term "unsubstituted" refers to any open valence of an atom being occupied by hydrogen. Also, if an occupant of an open valence position on an atom is not specified then it is hydrogen.

As used herein, the term "polymer" means a molecule of higher relative molecular weight (e.g., a longer chained polymer), the structure of which essentially comprises multiple repeat units derived from molecules of low relative molecular weight. In the context of the herein described paint or coating compositions, a polymer's molecular weight may be selected in view of desired rheological properties, viscosities, etc. A non-limiting example of a suitable molecular weight, which is generally used in industry (for non-switchable polymers), is between approximately 40 000-60 000.

As used herein, the term "polymer" may include any one, or any combination of, the following terms: "homopolymer", meaning a polymer comprised of one type of repeat unit derived from a molecule of low relative molecular mass; "co-polymer", meaning a polymer comprised of at least two different types of repeat units derived from molecules of low relative molecular mass; the term "ter-polymer", meaning a polymer comprises of three different types of repeat units derived from molecules of low relative molecular mass; the term "cross-linked polymer", meaning a three-dimensional network of polymer chains bonded together via cross-links; the term "cross-linking polymer", meaning a polymer that comprises at least one cross-linking agent and will become cross-linked during or following application of the herein described painting and coating compositions to a substrate, wherein the crosslinking agent may be a constituent of the polymer (e.g., part of a repeat unit), or is an additive within the composition; and the term "switchable polymer" or "polymer switchable between a first form and a second form" refers to a polymer comprising switchable moieties that switches from a partially or substantially water-soluble form to a substantially water-insoluble form upon loss or removal of an acid gas (e.g., $CO_2$); or the term "oligomer", meaning a molecule of lower relative molecular weight as compared to a polymer (e.g., a shorter chained polymer), the structure of which essentially comprises multiple repeat units derived from molecules of low relative molecular weight. As used herein, the terms "co-polymer" and "ter-polymer" include random, block, graft, star-shaped, and dendrimer co- and ter-polymers, or a combination thereof. As used herein, the term polymer includes linear or branched polymers, or a combination thereof.

"Insoluble" refers to a solid (e.g., a film, or polymeric coating) being poorly solvated, poorly solubilized, or poorly dissolved by a specified liquid, such that when the solid and liquid are combined a heterogeneous mixture results (e.g., the solid does not completely dissolve in the liquid). It is recognized that the solubility of an "insoluble" solid in a specified liquid might not be zero but rather it would be smaller than that which is useful in practice.

As used herein, a 'dispersion', 'colloid', or 'suspension' refers to particles or polymeric chain aggregates being scattered or distributed through another substance (e.g., a liquid phase).

The term 'hydrophobic' is used herein to refer to materials that repel water, are insoluble in water, and/or do not absorb water.

The term 'water-resistant' is used herein to refer to materials that resist water penetration and/or that resist reaction with water.

"Miscibility" is a property of two liquids that when mixed provide a homogeneous solution. In contrast, "immiscibility" is a property of two liquids that when mixed provide a heterogeneous mixture, for instance having two distinct phases (i.e., layers).

As used herein, "immiscible" means unable to merge into a single phase. Thus two liquids are described as "immiscible" if they form two phases when combined in a proportion. This is not meant to imply that combinations of the two liquids will be two-phase mixtures in all proportions or under all conditions. The immiscibility of two liquids can be detected if two phases are present, for example via visual inspection. The two phases may be present as two layers of liquid, or as droplets of one phase distributed in the other phase. The use of the terms "immiscible", "miscible", "miscibility" and the like are not intended to imply that only a liquid/liquid mixture is intended.

As used herein, "solvate" refers to a specie (e.g. a switchable polymer, as herein described) becoming associated with solvent molecules (for example, forming a loosely bonded complex formed between a solvent and a dissolved species), and becoming surrounded by a solvent shell. In some embodiments, a 'solvated' polymer refers to a dissolved polymer.

The term 'ambient conditions' is used herein to refer to prevailing or surrounding conditions in terms of temperature, pressure and humidity. Ambient conditions change depending on time and/or location and include, but are not limited to, conditions of standard temperature and pressure ('STP'; temperature of about 0° C. and absolute pressure of about 1 atmosphere), or standard ambient temperature and pressure ('STAP'; temperature of about 25° C. and absolute pressure of about 1 atmosphere).

As used herein, "cross-linkers" or "crosslinking agents" are compounds that cause or promote formation of cross-linking connections in a polymer: they bond two or more different polymer chains together, thus increasing the molecular weight of the polymeric system. Non-limiting examples of cross-linkers or crosslinking agents include: thermally-induced cross-linkers (e.g., peroxides), UV-induced cross-linkers, pH-induced cross-linkers; electro-chemically-induced crosslinkers; di and tri-acrylates for Michael addition with a nucleophilic monomer/repeat unit; or, cross-linkers commonly used in coatings such as n-methylolacrylamide, polyaziridines, epoxy silanes, carbodiimides, adipic dihydrazide, and isocyanate functional pre-polymers; etc. Other non-limiting examples include diepoxides, diisocyanates, alkyl halides, methoxymelamines, melamine formaldehydes, and free radical initiators.

Paint and Coating Compositions and Formulations

As would be known by those in the relevant art, the terms "paint", "coating", or "surface coating" are often used interchangeably. However, a surface coating is a broader, more general description of a material that may be applied as a continuous layer to a surface, and includes paints and clear coatings, such as lacquers and varnishes. The term 'paint' is usually used to describe pigmented materials, and is generally considered separate from clear coatings.

As would also be known and understood in the relevant art, the relationship between a coating and the substrate to which it is applied is important. For example, requirements for a paint or coating formulation to be applied to wood is different from those to be applied to metal; further, methods by which a formulation is applied and cured (e.g., dried) may be different as well. As such, one skilled in the relevant art will know how best to formulate, apply, and cure a paint or coating based on the coated substrate's end use, and its physical and mechanical requirements. Other requirements a person of skill in the relevant art may also consider when formulating a paint or coating formulation include, for example: formulation shelf-life; application method (e.g., use of a brush versus use of a spray gun, or rollers); resultant coating's uniformity; reduction of volatile organic compounds; splatter reduction; reduction of slumping or dripping; cure rates; opacity; colour; sheen/gloss; smoothness/texture; substrate adhesion; specific mechanical or physical properties; chemical resistance; corrosion protection; stability (e.g., ultraviolet radiation, thermal); and durability.

Generally, a paint or coating formulation is composed of the following main components:

a. A continuous phase comprising a polymer or resin (also referred as a binder), and a solvent or diluent. The polymer or resin (binder) provides the basis of the film that coats a substrate, and varies in chemical composition according to end use. The solvent or diluent provides a medium by which the polymer or resin is dissolved/solvated/suspended/dispersed, and thus facilitates application of the paint or coating.

b. A discontinuous phase comprising additives, pigments (e.g., fine particles, organic or inorganic), or extenders (coarse particle inorganic matter). Additives, varied components of differing effect, may be tailored to the paint or coating formulation's end use; non-limiting examples of additives include stabilizers, antioxidants, rheology modifiers, adhesion promoters, anti-corrosives, anti-foams, anti-settling agents, anti-skinning agents, dispersion aids, preservatives, insecticidal additives, optical whiteners, reodorants, UV absorbers, catalysts, driers, flow agents, etc. Pigments, when used, provide opacity, colour, etc., and in some embodiments may be included for anti-corrosive properties. Non-limiting examples of pigments include: carbon black, copper carbonate, aniline black for black pigments; iron oxides, nickel azo yellow for yellow pigments; ultramarine, Prussian blue, phthalocyanin blue, carbazol violet for blue/violet pigments; pthalocyanin green for green pigments; red iron oxide, toluidine red for red pigments; titanium dioxide, zinc oxide for white pigments. Extenders are used for a range of purposes, such as opacity/obliteration, to facilitate sanding (surface priming), etc. Non-limiting examples of extenders include: barytes or blanc fixe (barium sulphate); chalk, calcite (calcium carbonate); gypsum, anhydrite (calcium sulphate); and silica, clay, talc, mica (silicate) [Paint and Surface Coatings Theory and Practice, Second Edition; Lambourne, R.; Strivens, T. A., Ed.; Woodhead Publishing Ltd: Cambridge, England, 1999].

As one skilled in the relevant art would understand, the type, number, and concentration of solvents (e.g., co-solvents), additives, pigments, or extenders used is dependent on the other components in the formulation, and/or the formulation's end use.

In some embodiments, a paint or coating formulation is formulated to meet requirements of a desired application method. Application methods include: spreading (e.g., by brush, roller, paint pad, doctor blade, etc.); spraying (e.g., air-fed spray, airless spray, hot spray, electrospray, etc.); flow coating (e.g., dipping, curtain coating, roller coating, reverse roller coating, etc.); and electro-deposition.

Thus, as used and described herein, the switchable paint or coating compositions of the present application are referring to the continuous phase of a paint or coating formulation (e.g., polymer and solvent/liquid medium/water). As used herein, the terms "film" or "polymeric coating" are intended to refer to a coating, film, paint, or the like, formed from the drying/curing of the paint and coating formulations described herein. In contrast, the terms "paint formulation", "coating formulation", or "paint and coating formulations" refer to a final formulation to be applied to a substrate that has been optimized or formulated (for example, by one skilled in the relevant art) based on any one of the coated substrate's end use, its application and cure methods, and the requirements thereof. In some embodiments, the terms "paint formulation" or "coating formulation" refer to final formulations to be applied to a substrate that comprise the herein described switchable paint or coating compositions.

In some embodiments, the herein described switchable paint or coating compositions may be comprised in ink formulations, the required components of which would be known by those skilled in the relevant art. Non-limiting examples of application methods for ink formulations comprising herein described switchable paint or coating compositions may include ink jet printing, roller applied printing, or drum-based printing.

Switchable Water-Based Paint or Coating Compositions

The present application provides polymeric compositions useful as paints and in forming coatings and the like. In some embodiments, these are non-solvent based compositions that have properties similar to oil-based paints and coatings. In other embodiments, the present compositions comprise polymers that solubilize in carbonated water but are insoluble or only minimally soluble in non-carbonated water.

The polymer(s) included in the compositions of the present application is selected based on its ability to switch between a form that is soluble in carbonated water, or aqueous medium comprising dissolved acid gases, and a form that is insoluble, or only minimally soluble in non-carbonated water, or said aqueous media that is largely devoid of said acid gas. In an aspect, the polymer chain contains uncharged protonatable moieties. When mixed with, for example, carbonated water, such a polymer has at least some, but not necessarily all, of these protonatable sites protonated (or cationic/ionized) such that the polymer dissolves in water or aqueous media. When $CO_2$ is used as an acid gas to protonate the polymers protonatable moieties, the counterions in solution are a mixture of bicarbonate and carbonate anions, or possibly carbamate ions. Unless the pH is very high (i.e., above about 10.3) the counterions are predominantly bicarbonate.

Figure 9:
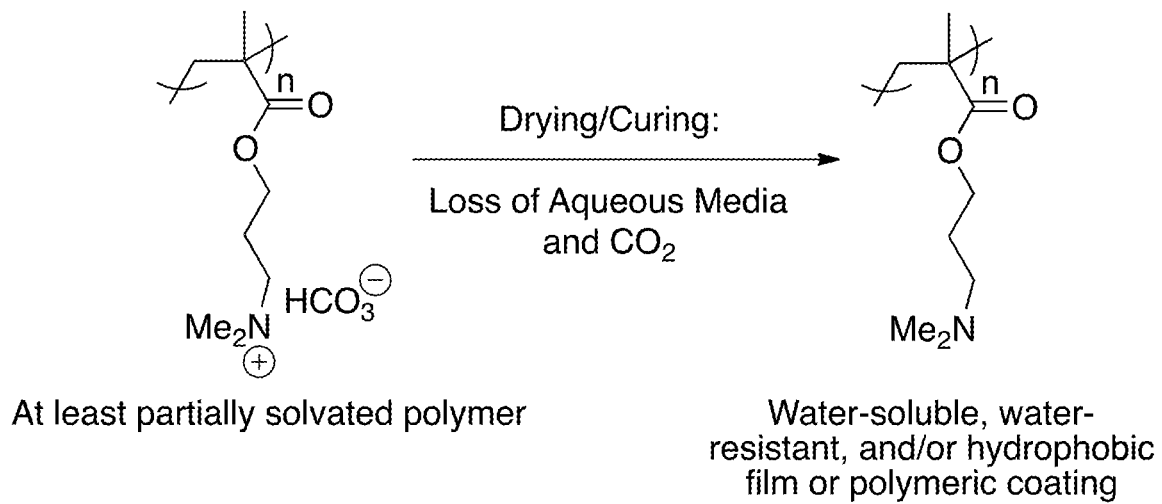
FIG. 9 depicts an embodiment of an at least partially solvated polymer of a herein described paint or coating composition that is applied, and dried or cured to form a water-insoluble, water-resistant, and/or hydrophobic film or polymeric coating.

In accordance with an embodiment, the present application provides a composition that can function as a paint or coating, comprising a solution of switchable polymer in its protonated form in carbonated water. Following application of this composition to a surface or substrate, the composition dries, leaving behind a water-insoluble, water-resistant, and/or hydrophobic film or polymeric coating as a result of evaporation of water and a loss of $CO_2$ (for example, see FIG. 9). In order for the composition to successfully form a film of water-insoluble polymer following application to a surface or substrate, deprotonation of the polymer occurs during the drying process, so that the protonatable sites in the polymer are largely not protonated (i.e., uncharged) after the drying is complete. This paint or coating composition is referred to herein as a switchable, homogeneous water-based paint or coating, although the formulation is not limited to its use as a paint.

A possible advantage of a homogeneous water-based paint, or switchable paint or coating composition of this kind is that it may offer a paint or coating composition that has none or reduced vapour emissions, flammability, and/or smog or inhalation hazards. Further, the composition may be readily removed from brushes, other tools and hands by washing with acidic solutions, such as carbonated water or vinegar. This avoids the use of volatile organic compounds (VOCs) or organic solvent cleaners typically required to remove oil-based paints.

The deprotonation of the polymer and loss of the acid gas (e.g., $CO_2$) from the composition following application to a surface or substrate must be sufficiently fast to be substantially complete before the drying process is complete. In some embodiments, it may be sufficient to rely on concentration gradients: for example, as concentration of $CO_2$ is higher in a paint or coating composition than the surrounding environment, when it is applied to a surface or substrate, $CO_2$ will diffuse out of the composition, thereby deprotonating the polymer and forming a film. If the deprotonation and/or $CO_2$ loss are too slow, so that the polymer is still protonated enough to have significant water solubility, then the resulting paint or coating will not be sufficiently water-insoluble, water-resistant, and/or hydrophobic, and will not be able to withstand exposure to washing or rain without damage to the paint or coating.

In some examples of the switchable, homogeneous water-based paint or coating composition, deprotonation of the polymer and loss of the acid gas (e.g., $CO_2$) is too slow relative to the drying process. This can be addressed by altering the composition or by altering the protonatable sites of the polymer, to either speed up one or both of the deprotonation and/or acid gas (e.g., $CO_2$) loss processes, or slow down the drying process. Specific, non-limiting, examples are provided below:

a. The drying process can be slowed down by incorporating one or more additives in the composition, which function to slow down the drying process (e.g., retarders or humectants).

b. The rate of the deprotonation process can be increased by reducing the magnitude of the protonation enthalpy of the protonatable sites in the polymer. Because deprotonation is endothermic, the activation enthalpy for the process must be at least as great as the absolute value of the protonation enthalpy. Protonation enthalpies are typically negative, so a key value here is the absolute value of the protonation enthalpy. For organic bases, for which the absolute value is not known, the $pK_{aH}$ can be used as a proxy. An organic base with a lower $pK_{aH}$ is expected to have a lower absolute value of the protonation enthalpy. The $pK_{aH}$ is the $pK_a$ of the protonated form of the polymer. Thus, the rate of the deprotonation process can be increased by selecting a protonatable group of lower basicity (i.e., lower $pK_{aH}$).

c. It is also possible to increase the rate of loss of an acid gas (e.g., $CO_2$), if that is found to be too slow. For a non-limiting example, the rate of $CO_2$ loss may be increased by (i) a catalyst, such as carbonic anhydrase, to catalyze the conversion of bicarbonate to free $CO_2$; (ii) preventing reabsorption of liberated $CO_2$ back into the coating, for example, by passing air over the coating as it dries or by applying partial vacuum; (iii) adding particles to a composition or formulation, where the particles supply nucleation sites for bubble formation, with care taken to mitigate or prevent the bubbles from forming undesired imperfections in a dried film or coating; or, in some embodiments, (iv) heating.

As noted above, it is not necessary for the switchable polymer to be completely deprotonated during the drying process. In fact, deprotonation of every single protonated site may not be achievable during the drying time. Incomplete deprotonation is acceptable provided that, following drying, the polymer is able to withstand exposure to water under the conditions of use. For example, a paint meant for outdoor use should be sufficiently deprotonated that it does not dissolve, in whole or in part, when exposed to water for extended periods, such as during a rain storm. A paint intended for indoor use should be sufficiently deprotonated that it does not dissolve when washed (i.e. exposed to water infrequently and for very short periods).

Switchable Polymers for use in Paint and Coating Compositions

A composition has been developed, and is herein described, that comprises a liquid medium, and a polymer comprising protonatable moieties wherein a portion of the protonatable moieties are in their protonated form, such that the degree of polymer protonation is sufficient to at least partially solvate the polymer in the liquid medium. The liquid medium comprises water or an aqueous solution, and an acid gas dissolved at a concentration sufficient to maintain said portion of protonatable moieties in their protonated form. When the composition is applied to a substrate under ambient conditions, the concentration of dissolved acid gas decreases such that some or all of the portion of protonatable moieties switch from their protonated form to their non-protonated form, and the degree of polymer protonation is reduced such that it becomes insufficient to maintain the at least partial dissolution of the polymer in the liquid medium, and the polymer forms a film that is substantially water-insoluble, water-resistant, and/or hydrophobic.

Jessop et al. have previously described a switchable water composition comprising water and a polymer additive reversibly switchable between a first, neutral form and a second, ionized form. Jessop et al. described that switching the polymer from its first form to its second form increases the composition's ionic strength; and, switching the polymer from its second form to its first form decreases the composition's ionic strength (see International Patent Application No. PCT/CA2011/050777 entitled Systems and Methods for Use of Water with Switchable Ionic Strength). The reversibly switchable nature of the polymer additives enabled use of switchable water compositions for distillation-free removal of water from solvents, solutes, or solutions; use in desalination, clay settling, viscosity switching, etc.; and, use as draw solutions in forward osmosis systems.

However, none of the compositions described in PCT application PCT/CA2011/050777 taught or suggested a switchable paint and coating composition as herein described: a composition comprising a polymer that, once applied to a surface, switches from a protonated form that is at least partially solvated in aqueous media, to a non-protonated, substantially water-insoluble form, thereby producing a substantially water-insoluble, water-resistant, and/or hydrophobic film or polymeric coating. In contrast to the compositions described by Jessop et al. in PCT application PCT/CA2011/050777, which require the reversibly switchable nature of the polymer additive, the herein described compositions do not require such reversibility.

The switchable polymers included in the present compositions can contain protonatable moieties that are guanidines, amidines, tertiary amines, secondary amines, primary amines, or a combination of two or more of these moieties. The polymers are designed such that that the protonation enthalpy is not too high. For example, a guanidine containing only alkyl groups or H atoms on the nitrogen atoms is too basic, with a protonation enthalpy that is too high, and, therefore, would be unsuitable. In contrast, however, a guanidine having an aryl group attached to at least one of the nitrogens would have a lower activation enthalpy and would be suitable for use in most paint formulations/applications. If the amine is secondary or primary, then having at least one secondary or tertiary carbon attached to the nitrogen is preferred in order to inhibit carbamate salt formation.

The following non-exhaustive list depicts examples of protonatable moieties suitable for incorporation in the switchable polymer:

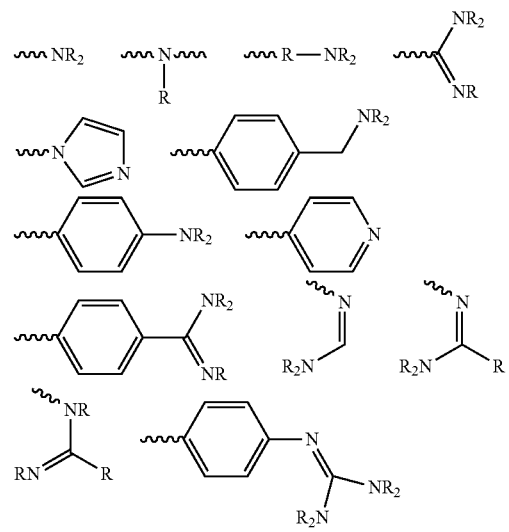

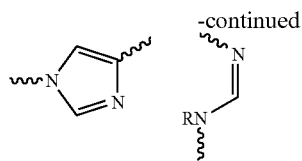

where

R is an aliphatic group or a substituted aliphatic group; and the wiggly or wavy lines represent one or more bonds attaching the protonatable, switchable moiety to the remainder of the polymer (note, the moiety can attach to the polymer by more than one bond, especially if it is in the backbone of the polymer).

In an embodiment, R is alkyl, substituted alkyl, alkenyl, substituted alkenyl, alkynyl, substituted alkynyl, aryl, or substituted aryl. In another embodiment, R is $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl. In a specific example, R is $C_1$-$C_6$ alkyl or substituted $C_1$-$C_6$ alkyl.

Optionally, two R groups, together with the atoms to which they are attached can form a cycle, or a heterocycle.

The following non-exhaustive list depicts further examples of protonatable moieties suitable for incorporation in the switchable polymer:

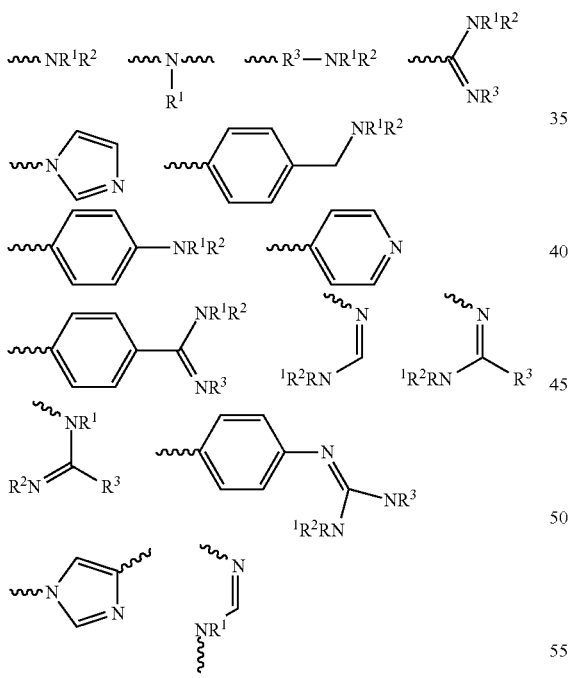

where the wiggly lines represent one or more bonds attaching the protonatable moiety to the remainder of the polymer; and each of $R^1$, $R^2$, and $R^3$ is independently H, an aliphatic group, a substituted aliphatic group, or absent, as required to satisfy valence rules.

In an embodiment, each R of $R^1$, $R^2$, and $R^3$ is independently H, alkyl, substituted alkyl, cycloalkyl, substituted cycloalkyl, heterocycloalkyl, substituted heterocycloalkyl, alkenyl, substituted alkenyl, alkynyl, substituted alkynyl, aryl, substituted aryl, heteroaryl, or substituted heteroaryl.

In another embodiment, each of of $R^1$, $R^2$, and $R^3$ is independently H; a substituted or unsubstituted $C_1$ to $C_8$ alkyl, alkenyl, or alkynyl group that is linear, branched, or cyclic; a substituted or unsubstituted $C_1$ to $C_8$ alkyl, alkenyl, or alkynyl group that is linear, branched, or cyclic, wherein one or more C of the alkyl group is replaced by $\{-Si(R^4)_2-O-\}$; a substituted or unsubstituted $C_kSi_m$ group where k and m are independently a number from 0 to 8 and k+m is a number from 1 to 8; a substituted or unsubstituted $C_4$ to $C_8$ aryl group; a substituted or unsubstituted $C_4$ to $C_8$ aryl group, wherein one or more C is replaced by $\{-Si(R^4)_2-O-\}$; a substituted or unsubstituted aryl group having 4 to 8 ring atoms; a substituted or unsubstituted aryl group having 4 to 8 ring atoms, wherein said aryl group comprises one or more $\{-Si(R^4)_2-O-\}$; a $-(Si(R^4)_2-O)_p-$ chain in which p is from 1 to 8 which is terminated by H, or is terminated by a substituted or unsubstituted $C_1$ to $C_8$ aliphatic group; wherein $R^4$ is a substituted or unsubstituted $C_1$ to $C_8$ aliphatic group; or wherein any two of $R^1$, $R^2$, and $R^3$, taken together with the nitrogen to which they are attached, are joined to form a heterocyclic ring.

In another embodiment, wherein each of of $R^1$, $R^2$, and $R^3$ is H, $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl.

Specific examples of protonatable, switchable moieties are provided below. These include methyl (Me) and ethyl (Et) as the R group. Methyl and ethyl groups are often used as they are an inexpensive alkyl group to include in a structure.

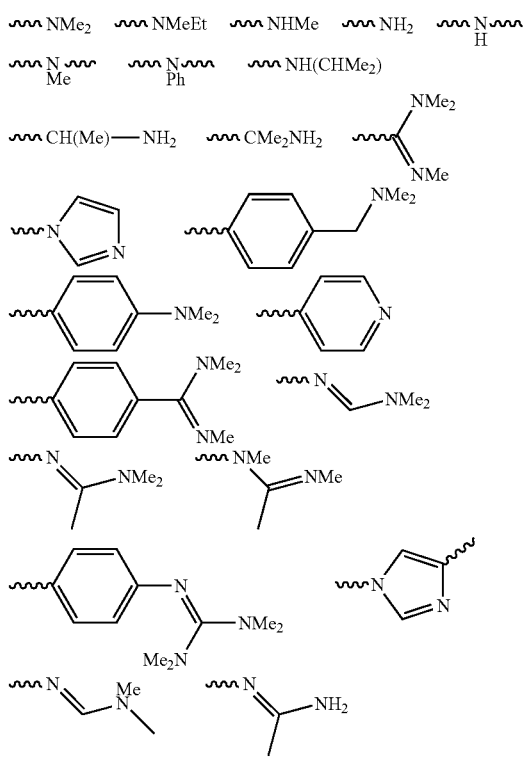

The protonatable, switchable moieties in the switchable polymer can be in the polymer backbone, the side groups, or the end groups of the polymer, or a combination thereof. If the polymer is a homopolymer, then the protonatable, switchable moieties would be in every repeat unit and/or in the end groups. If the polymer is a co-polymer, then there can be protonatable moieties in none, some, or all of the repeat units; if there are none in any of the repeat units then the protonatable, switchable moieties must be in the end groups. Generally placing the protonatable, switchable moieties only in the end groups is not preferred because it may not give sufficient solubility to the polymer in carbonated water. However, there may be specific applications in which this property may be desired.

Protonatable, switchable moieties can be introduced into the structure by use of a monomer, or one or more co-monomers containing protonatable moieties, use of an initiator/terminating agent containing protonatable moieties (for example, 2,2'-azobis[2-(2-imidazolin-2-yl)propane, as shown below), or by post-polymerization modification (e.g., grafting) of a polymer to introduce protonatable sites:

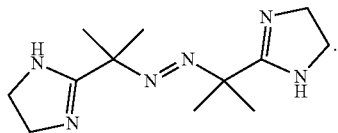 [SMILES: CC(C)(/N=N/C(C)(C)C1=NCCN1)C1=NCCN1]

Glass transition temperatures ($T_g$; ° C.) of polymer can dictate the hardness of a final paint or coating: too high of a $T_g$ may produce a hard and brittle coating; too low a $T_g$ may give a more rubbery, soft coating. For some applications, a switchable polymer having a glass transition temperature ($T_g$) within a specified range is desired; for example, to obtain a polymer having a $T_g$ in a desired range, such as, for example 20-50° C., or 30-45° C. Other applications may require a $T_g$ value outside of these ranges; for example, when used in specialty paint or coating formulations. In some instances, commercial paint or coating formulations, if applied at lower temperatures, may not properly coalesce, resulting in a film that may be physically removed from a substrate (e.g., visible chalking). To avoid this with the herein described paint or coating compositions, a switchable polymer having a glass transition temperature between −20 to −10° C. may be desired to facilitate applying the composition or formulation to substrates in cooler environments. Obtaining a switchable polymer having a glass transition temperature ($T_g$) within a specified range may be achieved by at least the following three strategies. Note that for this discussion, references to a monomer's $T_g$ are actually referencing the $T_g$ of the monomer's homopolymer, which would be obtained by polymerizing that monomer.

Strategy 1: Select a homopolymer that has a $T_g$ in the desired range (e.g. poly(2-tert-butylaminoethyl) methacrylate or ptBAEMA; 22° C.). A homopolymer is prepared from a single monomer, and will have to be selected to have a $T_g$ in the desired range. Currently, there are a certain number of switchable monomers that are commercially available; however, other switchable monomers that are not yet commercially available can be synthesized.

Strategy 2: Select a co-polymer, and control the composition of the co-polymer (i.e., relative amounts of each kind of repeat unit) so that the $T_g$ is in the desired range. A co-polymer is prepared from two or more different monomers. While in some embodiments both monomers, and therefore both types of repeat units, will contain switchable groups, in other embodiments only one of the two monomers, and therefore only one of the two types of repeat units, will contain switchable groups. The two monomers, and the proportions in which they are incorporated in the co-polymer, are chosen to obtain a co-polymer having a $T_g$ in a desired range. In such a co-polymer, one monomer may be chosen that gives a homopolymer of a lower $T_g$, and another monomer may be chosen that gives a homopolymer of a higher $T_g$. At least one of the co-monomers must be switchable/protonatable; or, at least the end-groups must comprise switchable/protonatable groups. Co-polymers containing two, or more than two co-monomers may be suitable. Non-limiting examples of switchable (protonatable) monomers that give a homopolymer of a suitable $T_g$ include N,N-dimethylaminoethyl methacrylate (DMAEMA) and N,N-diethylaminoethyl methacrylate (DEAEMA). Non-limiting examples of switchable (protonatable) monomers that give a homopolymer of a relatively higher $T_g$ may include dimethylaminopropyl methacrylamide (DMAPMAm), 4-(dimethylaminomethyl)styrene (DMAMS), vinylimidazole (VI), 4-vinylpyridine (4VP), 4-vinyl-N,N-dimethylbenzylamine (VDMBA), and potentially 4-vinyl-N,N-dimethylaniline (VDMAn), though its basicity may be too low for use with some acid gases. Non-limiting examples of switchable (protonatable) monomers that give a homopolymer of a relatively lower $T_g$ include acrylate analogues of methacrylate monomers, such as dimethyl- or diethyl-aminoethylacrylate (DMAEA, DEAEA), or dimethylaminopropylacrylate (DMAPA), as polyacrylates generally have a $T_g$ about 50-80° C. lower than the corresponding methacrylate. Non-limiting examples of non-switchable (non-protonatable) monomers that give a homopolymer of a relatively lower $T_g$ include butyl acrylate (BA) and 2-ethylhexyl acrylate (EHA). Non-limiting examples of non-switchable (non-protonatable) monomers that give a homopolymer of a relatively higher $T_g$ include styrene, alkyl methacrylates (e.g., methyl-, ethyl-, butyl-methacrylate), alkyl acrylates (e.g., ethyl-, butyl-acrylate). There are also switchable and non-switchable monomers having $T_g$ values intermediate between the high and low $T_g$ values mentioned above. In some embodiments, it may be desirable to have a co-polymer comprising a switchable monomer and a non-switchable monomer, wherein a majority of the resultant co-polymer consists of repeat units from the non-switchable monomer. In this embodiment, the co-polymer's amine nitrogen content is lower, and thus may minimize the resultant polymeric coating's potential for yellowing over time (e.g., from the amine nitrogen oxidizing or photooxidizing), potentially minimizing cost if the switchable monomer is relatively more expensive than the non-switchable monomer. In said embodiment, the $T_g$ of the co-polymer would be closer to the $T_g$ of the non-switchable monomer than the $T_g$ of the switchable monomer; therefore it would be important to choose a non-switchable monomer having a $T_g$ close to the desired $T_g$ of the overall co-polymer. The $T_g$ of a co-polymer can be approximately predicted from the $T_g$ values of each monomer, using the Fox equation (see Equation 8 for the equation for a co-polymer made from two kinds of monomers, wherein $w_1$ and $w_2$ are weight fractions of components 1 and 2 in the co-polymer).

$$\frac{1}{T_g} = \frac{w_1}{T_{g,1}} + \frac{w_2}{T_{g,2}} \qquad \text{(eqn. 8)}$$

Strategy 3: A co-polymer may be prepared from three or more different monomers, any of which may be switchable or non-switchable, so long as at least one monomer is switchable; or, at least the end groups comprise switchable groups. For example, a ter-polymer (a co-polymer made from three different monomers) may be synthesized from one switchable monomer and two non-switchable monomers. In ter-polymers, there may be relative flexibility in the respective monomer proportions; and therefore, there may be many options in terms of monomer choice, and proportions of each monomer, that may produce a ter-polymer having a $T_g$ in a desired range.

Additionally, if one monomer contains a desired protonatable, switchable moiety, but would generate a homopolymer being, for example, too water soluble, then it can be co-polymerized with at least one other monomer (one that makes homopolymers having less water solubility), such that the resulting co-polymer is essentially insoluble in non-carbonated water. Similarly, if one monomer contains a desired protonatable, switchable moiety but its homopolymer is not sufficiently soluble in, for example, carbonated water, then that monomer can be co-polymerized with at least one other monomer (one that makes homopolymers having greater water solubility), such that the resulting co-polymer is soluble in carbonated water and yet still essentially insoluble in non-carbonated water. It is possible to use more than two types of monomers in order to make a co-polymer (e.g., a ter-polymer) having the desired properties. Selection of the appropriate monomer(s) can allow tuning or optimization of the composition for each intended use.

The following are examples of repeat units containing protonatable, switchable moieties that might be useful in making a switchable homogeneous water-based paint or coating composition. This list is not exhaustive but merely illustrative. Some of these would not work as homopolymers. For example: PMVI; the structurally similar polymer poly(vinylimidazole) (PVI); and, PDMAEMA may be too water-soluble in their neutral forms to serve as a homopolymer for the herein described paint or coating compositions, but their repeat units may be used in a copolymer. In other examples, homopolymers such as PVI, PMVI, PVDMBA, PVDMAn and P4VP have switchable, protonatable moieties that may be too low in basicity to generate a degree of protonation necessary to at least partially solvate the polymer. To serve as a homopolymer for the herein described paint or coating compositions, or to use their repeat units in a copolymer, these polymers may require use of elevated $CO_2$ pressures, or use of a more acidic gas such as $SO_2$.

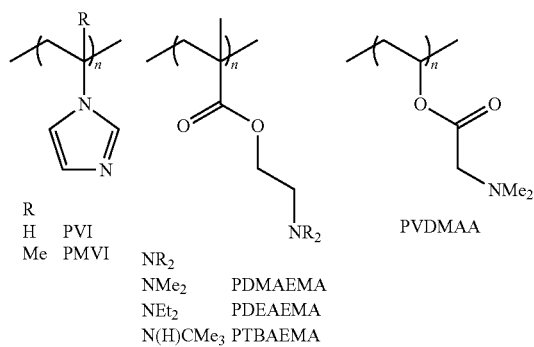

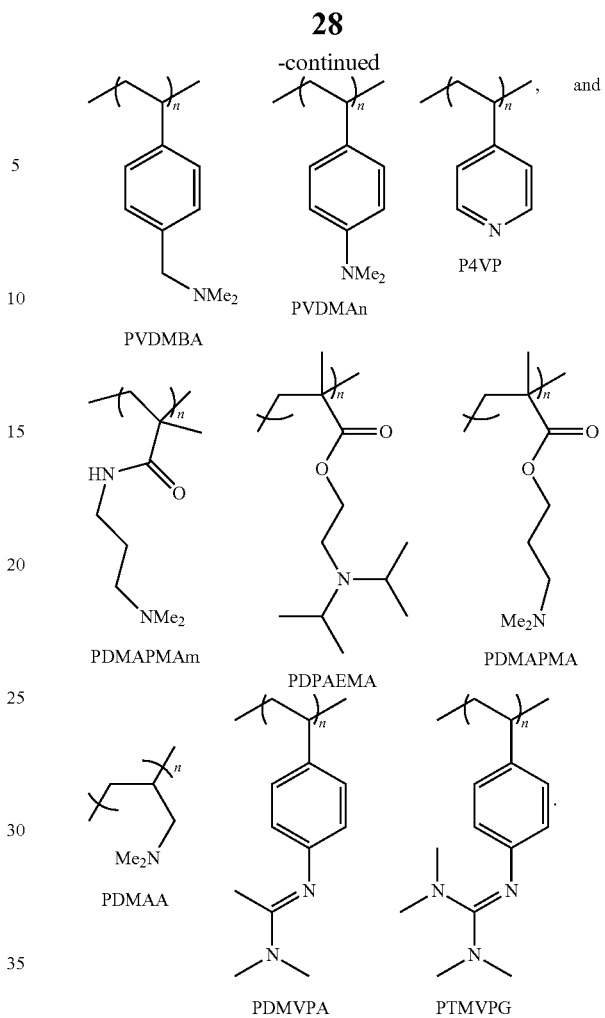

The reaction of protonatable, switchable groups in a polymer with $CO_2$ results in the formation of bicarbonate and/or carbonate salts (e.g. equations 1, 2, and 3); however formation of carbamic acids or carbamate salts is not excluded (e.g. equations 4 through 7). For amine, amidine, or guanidine protonatable groups containing an N—H bond, carbamic acid or carbamate salt formation may happen in addition to, or instead of, the formation of bicarbonate/carbonate salts. So long as this carbamic acid or carbamate salt formation allows the desired performance (e.g., polymer soluble in carbonated water, polymer not soluble in non-carbonated water, and sufficient reversion of the polymer from protonate to non-protonated form during the drying process so that the dried coating is reasonably water-insoluble, or water-resistant), then it is considered to be included in the present application. However, in some cases the enthalpy of formation of carbamate salts or carbamic acids may be so large that the reversion of the polymer to its neutral form is too slow, and is therefore not sufficiently complete by the end of the drying period; the polymer may therefore remain water-soluble. In some cases, the reversion of carbamate salts and carbamic acids may be sufficiently fast during the drying periods. In some cases, a polymer may exist in the carbonated water solution as a mixture of any two, three or four of the bicarbonate salt, the carbonate salt, the carbamic acid, and/or the carbamate salt. Again this is acceptable if it permits the desired performance (e.g., polymer soluble in carbonated water, polymer not soluble in non-carbonated water, and sufficient reversion of the polymer from protonate to non-protonated form during the drying process so that the dried coating is reasonably water-insoluble, or water-resistant). For example, one way by which reversion of carbamate salts or carbamic acids may be facilitated is by reducing basicity of the primary or secondary amine switchable moiety.

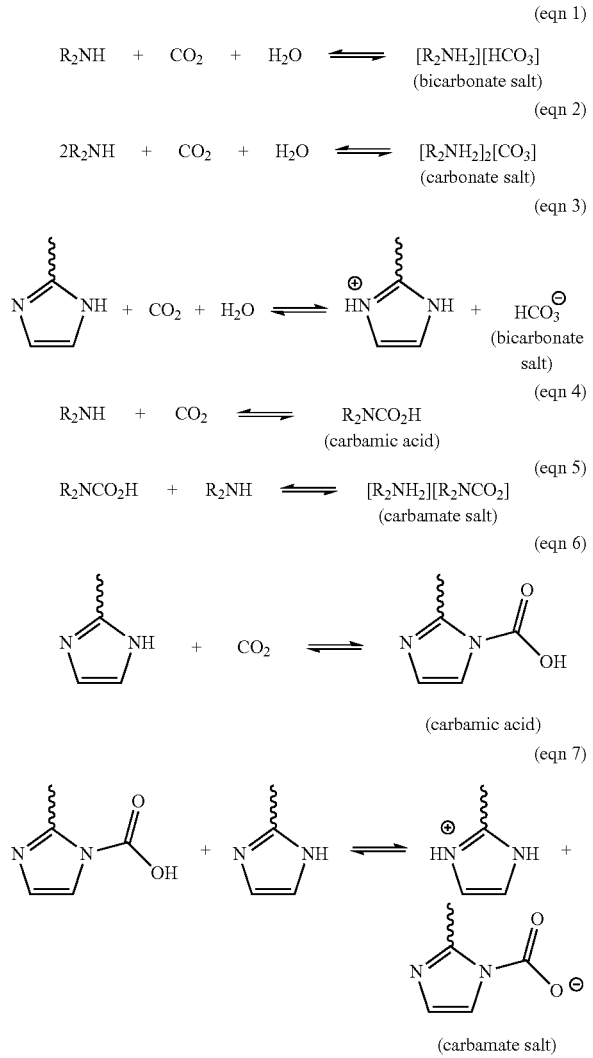

If the formation of bubbles during the off-gassing of an acid gas, such as $CO_2$, from the drying film causes flaws in the finished film, then this problem may be diminished by reducing the volume of acid gas (e.g., $CO_2$) that needs to off-gas during drying. That may be achieved by having fewer switchable groups per gram of polymer or per gram of paint formulation.

A lower molecular weight polymer allows for higher solids content (meaning higher wt % polymer in the paint composition) without the viscosity being too high for practical use as a paint.

In some embodiments, a polymer having a molecular weight approximately 40 000 to 60 000 is desired, as a molecular weight that is too large may cause unwanted rheological properties (e.g., too high a viscosity).

In another embodiment of the herein described switchable paint or coating compositions, the switchable polymer may form a latex suspension in the aqueous liquid medium, a suspension which may be prepared by emulsion polymerization, or by methods for preparing artificial latexes. In such embodiments, addition of an acid gas, such as $CO_2$, to the composition may cause sufficient protonation of the polymer's switchable/protonatable groups to soften and/or allow swelling of the latex particles, such that when the suspension is applied as a coating, the particles are able to merge or coalesce to form a film.

In an embodiment of the herein described switchable paint or coating compositions, the switchable polymer and aqueous liquid medium may form a waterborne dispersion. Waterborne dispersions known in the art comprise polymers such as polyurethanes, alky resins, acrylic resins, epoxy resins or polyolefins. Waterborne dispersions differ from latex paints, as described above, in that they are not made by emulsion polymerization. In contrast, waterborne dispersions are formed by preparing polymers with a sufficient amount of hydrophilic groups such that, when added to water, the polymers form small (sub-micron or micron-size) aggregates or particles, but do not completely dissolve. Functional groups on the polymer, or additives such as surfactants, may help stabilize the dispersion. Particles in a waterborne dispersion may be in the form of discrete particles, but may also be water-swollen aggregates or clusters of polymer chains. Waterborne dispersions are sufficiently colloidally stable that they do not settle out, or sediment quickly upon storage; and, are translucent or opaque because of the light scattered from the aggregates/clusters/particles.

In embodiments where the switchable paint or coating composition forms a waterborne dispersion, the composition comprises a co-polymer, ter-polymer, etc. that is partially soluble in the aqueous liquid medium, such that it forms small aggregates or particles, but is dispersed such that it does not sediment. A polymer having sufficient hydrophilicity to facilitate aggregate formation when protonated, and sufficient water-insolubility/hydrophobicity to form a water-insoluble, water-resistant, and/or hydrophobic film when unprotonated, is obtainable via selection of monomers having the requisite properties, such as hydrophilicity or water-insolubility, etc. (see above). Once the composition comprising the waterborne dispersion is applied to a substrate, a film formed may be one of the following: (i) if the dispersion comprises particles that are highly swollen with water, or comprises aggregates of polymer chains, the film or coating formed is similar to a continuous film; or (ii) if the dispersion comprises more 'particle like' species, then the particles need to fuse together to form the film, like a latex.

Additives for Switchable Water-Based Paint or Coating Compositions

Crosslinking of the herein described switchable polymer as it dries, or after it dries may increase durability, toughness, water resistance, and/or chemical resistance of the coating. In most embodiments, crosslinking should not take place to any great extent before applying the paint or coating composition or formulation to a substrate because the resulting cross-linked polymer may have insufficient solubility in carbonated water, or liquid media comprising water or an aqueous solution and a dissolved acid gas; or, if dissolved in, for example, carbonated water, may make a composition or formulation having too high a viscosity.

At least two possible methods are envisioned to promote crosslinking in the paint or coating composition as it dries or after it dries, without promoting extensive crosslinking before it's applied. First, one could use a "2-component post-cure system", meaning a system consisting of two compositions, one containing a dissolved polymer comprising switchable groups, and the other containing a crosslinking agent or promoter. The two compositions may be combined before or during application of the paint or coating formulation to a substrate, or possibly one composition may be applied to the substrate, and the other composition may be applied shortly afterwards.

Other envisioned methods include "single-component post-cure systems", meaning a composition that contains both a dissolved polymer comprising switchable groups and a crosslinking agent or promoter. In some embodiments, the crosslinking process is slow or blocked in the composition, but is faster and/or unblocked upon application or drying of the paint or coating composition. The increased rate or unblocking of the crosslinking process may be due to any one or more of the following phenomena: increasing concentration of polymer or crosslinking agent as the composition or formulation dries; loss of acid gas (e.g., $CO_2$) from the system; increase, or change in pH of the composition as it dries; loss of a proton from protonated basic groups in the composition, polymer or crosslinking agent/promoter; or decomposition of carbamic acid or carbamate groups in the polymer or crosslinking agent/promoter. For example, some crosslinking agents may normally react with the non-protonated, protonatable moieties (e.g., amine groups) of the polymer, thereby crosslinking the polymer; however, when these moieties are protonated by, for example, the carbonated aqueous medium of the composition, the protonation prevents, or at least slows any crosslinking reaction. As such, the rate of crosslinking only occurs at a significant rate when $CO_2$ leaves during the drying process.

In other embodiments, a crosslinking agent may be inhibited from crosslinking the polymer of a composition when an acid gas, such as $CO_2$, is present at a high enough concentration to maintain a degree of polymer protonation sufficient to at least partially solvate the polymer in a liquid medium; but, is largely uninhibited when the acid gas is lost or removed from the composition. In some embodiments, inhibition of the crosslinking agent in the presence of the acid gas may be due to a high degree of protonation of protonatable groups in the polymer and/or the crosslinking agent, and the substantial loss of the acidic gas reduces the inhibition by lowering the degree of protonation of said protonatable groups.

One potential advantage of incorporating cross-linkers in the herein described compositions would be to reduce sensitivity to acid-containing substances or organic solvents. For example, if the paint or coating composition or formulation, after being applied to a surface and after drying, were to be in contact with an acidic solution like apple juice, acid rain, or sweat, then some reprotonation of the switchable groups (e.g., amine sites) of the polymer may take place. If this occurs to a significant extent, then there is a risk that the paint or coating may peel, blister, dissolve, or otherwise become temporarily or permanently damaged. The extent of reprotonation would depend on many factors, such as, but not limited to, the paint or coating formulation, temperature, acidity of the liquid, duration of contact, and thickness of the paint or coating.

In applications, or end uses of a paint or coating in which there is a concern of exposure of the paint or coating to an acidic substance, then a crosslinking agent can be incorporated into the composition or formulation such that the crosslinking agent is inhibited (inactive or so slow as to be essentially inactive) until the paint is applied to a surface. Non-limiting examples of how inhibition of the crosslinking agent may be removed as the water and $CO_2$, or an acid gas evaporate include: by the polymer concentration increasing, by pH of the solution changing (e.g., rising), and/or because the inhibitor is inactive in the presence of $CO_2$, or an acid gas. Selection of an appropriate crosslinking agent would be based on the intended application of a paint or coating formulation and its environment. Once a crosslinking agent is no longer inhibited, the crosslinking agent would act to crosslink the polymer as the composition or formulation dries/cures, causing the resulting paint or coating to be insoluble even in acidic aqueous solutions, such as juice, acid rain, or sweat.

Non-limiting examples of cross-linkers or cross-linking agents may include: thermally-induced cross-linkers (e.g., peroxides), UV-induced cross-linkers, pH-induced cross-linkers; di and tri-acrylates for Michael addition with a nucleophilic monomer/repeat unit; electrochemically-induced cross-linkers; or, cross-linkers commonly used in coatings such as n-methylolacrylamide, polyaziridines, epoxy silanes, carbodiimides, adipic dihydrazide, and isocyanate functional prepolymers; etc. Other non-limiting examples include diepoxides, diisocyanates, alkyl halides, acid halides, vinylsilanes, methoxymelamines, melamine formaldehydes, and free radical initiators.

In some embodiments, the polymer of the herein described compositions may comprise a crosslinking agent (e.g., isocyanates or epoxides may be comprised within a polymer's repeat unit or backbone, and may then be used to crosslink with, for example, amines, diamines, diols, etc.). In other embodiments, the cross-linker may be thermally-induced, and require heat to begin a crosslinking reaction. A non-limiting example of this embodiment includes a paint or coating composition comprising a ter-polymer, having repeat units of DMAPMAm, butyl methacrylate, and a secondary amine functionalized repeat unit, and a di-epoxide crosslinker. Upon addition of $CO_2$, carbonates and carbamates form from reaction with DMAPMAm and the secondary amine functionalized repeat unit. Following application of the composition to a substrate, applying heat liberates $CO_2$ from the secondary amine and allows it to react with the crosslinking agent to form a crosslinked polymer. In yet other embodiments, when a composition or formulation is applied to a substrate (e.g., via roll-to-roll processing, or on a spray-line), initially a film that is water-soluble, hydrophilic, and/or oleophilic may be produced; then, at a further stage in processing the substrate, the substrate is passed under a UV, radiation, or thermal source (e.g., a lamp) to induced crosslinking of the film, thereby producing a coating that is substantially water-insoluble, water-resistant, and/or hydrophobic/oleophobic.

In other embodiments, a catalyst may be used to promote or induce crosslinking, such as, but not limited to, an acid catalyst. In some embodiments, an acid catalyst may be 'protected' via reaction with a base to form a salt; for example: protected as ammonium sulfonates, wherein sulfonic acids are the catalyst, and amines act as the base. When a composition or formulation comprising such a 'protected' acid is exposed to heat for curing (e.g., 120-140° C.), said 'protected' acids liberate, or produce (for example, via an equilibrium) enough free acid to act as a catalyst, and facilitate cross-linking within the composition or formulation. However, these 'protected' acids may persist within the final, dried paint or coating. Thus, 'protected' acids should be selected such that any persisting 'protected' acid will not negatively affect the final paint or coating; or, such catalytic systems should only be employed when persisting 'protected' acids is suitable for the final paint or coating's use. Other examples of 'protected' acids include sulphates, or carboxylates.

Additional components in a paint or coating composition or formulation may include, but are not limited to, any of the following: antioxidants, bactericides, fungicides, stabilizers (e.g., UV), pigments, titanium dioxide, nucleating aids, de-foamers, surfactants, humectants, rheology modifiers, adhesion promoters, anti-corrosives, anti-foams, anti-settling agents, anti-skinning agents, dispersion aids, preservatives, insecticidal additives, optical whiteners, reodorants, UV absorbers, catalysts, driers, flow agents, or organic co-solvents. A paint or coating composition may also include stabilizers, rheology modifiers, adhesion promoters, primers, self-primers, etc. Organic co-solvents, in this context, refer to organic compounds added to enhance solubility of a switchable polymer in carbonated water, or liquid media comprising water or an aqueous solution and a dissolved acid gas. In some compositions or formulations, such a compound may be necessary: in an embodiment, the organic compound is in low amounts relative to the amount of water. In other embodiments, the organic co-solvent is a VOC-exempt solvent. Non-limiting examples of such organic co-solvents include alcohols, water-soluble ketones, glycols, glycol ethers, and glycol ether acetates. Nucleating aids may aid formation of $CO_2$ bubbles in order to have bubbles form earlier in the drying process, or to increase number and thereby decrease size of bubbles; some pigments may act as nucleating agents. De-foamers may be helpful to prevent or reduce foam formation during preparation, carbonation, mixing, pouring, applying, or drying of a paint or coating composition or formulation. Antioxidants may be useful in reducing or eliminating any potential yellowing or browning of the composition or formulation that may result from oxidation of the amine polymer over time.

Use of Switchable Water-Based Paint or Coating Compositions or Formulations

5. Various embodiments of the herein described compositions comprising a switchable polymer are mixed by conventional means using apparatuses known to those skilled in the art, such as in the art of manufacturing paint or coating compositions or formulations. A composition or formulation may be applied to a surface by various means. Methods of applying the composition or formulation may include: roll-to-roll, brush, draw-down bar, doctor blades, knives, air knives, immersion, extrusion, spray, heated spray, ink jets, ink rollers, lithography, flexography; being spread, sprayed, flow coated, electrodeposited, painted, dipped, or cast on; or any other method of paint or coating application. If a paint or coating composition or formulation is applied by spray, then the propelling gas could be an add gas, such as $CO_2$, which would keep the acid gas (e.g., $CO_2$) applied to the composition or formulation (e.g., a paint) until the point that it leaves the spray nozzle. Alternatively, the propelling gas may be a non-acidic gas like air or nitrogen, which would start the de-carbonation process, or loss of acid gas very promptly upon application of the composition or formulation to a substrate.

Generally, once a composition or formulation is applied to a surface of a substrate, it forms a wet film. As used herein, the term "substrate" is used to refer to a substance or medium (e.g., a solid) to which the herein described composition is applied, and to which the resultant paint or coating adheres. Non-limiting examples of suitable substrates are architectural substrates such as walls, trim, clapboard, siding, window frames, ceilings, gypsum board, glass, metal, and the like.

In some embodiments, the herein described compositions or resultant paint or coating formulations may be shipped, stored, or sold as a dry powder which is later formulated, re-formulated, or re-constituted as a liquid by the addition of water and $CO_2$, a carbonated aqueous medium, or liquid media comprising water or an aqueous solution and a dissolved acid gas; plus, if desired, other liquid components or formulation additives. Such shipping, storage, or sale as a dry powder could be an advantage in avoiding the shipping, storage, or sale of large volumes of water.

In an embodiment, the dry paint or coating adhered to a substrate can be deliberately reprotonated (for example, by washing using carbonated water). This can lead to a slight swelling at the area of reprotonation due to water adsorption; however, this can be used during cleaning to facilitate flushing of the paint or coating with water. Cleaning using this method may facilitate removal or reduction of scratches, blemishes, or the like, from the paint or coating without the need for reapplication. Following the reprotonation treatment, the paint or coating may re-dry to a smooth finish.

In another embodiment, the herein described compositions or resultant formulations are stored (in liquid or powder form) in a container and maintained under a $CO_2$, or other acid gas atmosphere. When a composition or formulation is stored in its liquid form, the $CO_2$ or acid gas atmosphere may not only prevent the switchable polymer from precipitating, it may also inhibit oxidation of the polymer over time. Similarly, when the composition or formulation is stored in its powder form, the $CO_2$ or acid gas atmosphere may not only facilitate dissolution of the switchable polymer during constitution or reconstitution, it may also inhibit oxidation of the polymer over time. Oxidation of, for example, an amine polymer is generally not desirable since oxidation can result in yellowing or browning of the composition or formulation, and the resultant paint or coating.

To gain a better understanding of the invention described herein, the following examples are set forth. It should be understood that these examples are for illustrative purposes only. Therefore, they should not limit the scope of this invention in any way.

EXAMPLES

Example 1

PDEAEMA as Part of a Switchable Homogeneous Water-Based Paint or Coating Composition Water (2 mL) from Millipore purification systems was added to a vial containing poly(2-diethylamino)ethylmethacrylate, (pDEAEMA) (0.5 g, 25 wt. % solution, M.W. 20 K, PDI: 2.4) and the resulting mixture of immiscible pDEAEMA in water was saturated with $CO_2$ gas for a period of 16 hours. The resulting solution of pDEAEMA in water was cast on a borosilicate glass plate with agitation to spread the cast.

The borosilicate plate with the polymeric coating was dried for 16 hours in a vacuum oven preheated to 60° C., during which time the $CO_2$ was observed to escape in the form of bubbles from the surface, giving a rough texture and, in some areas of the coating, gave a white, semi-opaque appearance to the film/polymeric coating. The film/polymeric coating on the borosilicate plate was then brought to room temperature, and water (10 mL from Millipore water system) was added on to the film and let soak for 4 hours. There was no change in the physical state of the film/polymeric coating after 4 hours with water: the water beaded up/rolled up on the film/polymeric coating due to its hydrophobilc nature in its non-carbonated form, and thus was not able to dissolve the film/polymeric coating, leaving it unchanged. This demonstrated the polymer in the vacuum-dried film/polymeric coating was able to switch off due to elimination of $CO_2$ at 60° C., under vacuum.

$^1$H NMR Spectroscopy: The bottom and sides of a vial were coated with pDEAEMA and placed in a vacuum oven at 60° C. for about 16 h. The bottom and sides of the vial were scratched to lift the film/polymeric coating off the walls, and added 1 mL of $D_2O$ to it to let the film/polymeric coating soak for 4.5 h. The contents were mixed well, and 0.5 mL of $D_2O$ was used for $^1$H NMR spectroscopy.

The resulting $^1$H NMR spectrum showed no trace of any polymer (or monomer); the only signals observed in the resulting spectrum was that of residual protonated water (HDO) in the deuterated solvent. This indicates that the deposited film is at least largely insoluble in water.

Example 2

Preparation of Film/Polymeric Coating Under Ambient Conditions

Two different methods of film/polymeric coating drying were studied using films/polymeric coatings cast from solutions of pDMEAEMA in water. The solutions were prepared and cast on borosilicate glass as described in Example 1.

One of the cast films/polymeric coatings was air dried under ambient conditions for 28 h. The second cast film/polymeric coating was dried in a fume hood under a continuous flow of air directed on to the plate. The second cast film/polymeric coating dried in 2 h. Also, the second cast film/polymeric coating was treated with a stream of nitrogen, which was blown for 2 minutes over the sample to get rid of bubbles and to smoothen the film surface following removal of the continuous airflow.

Both of the films/polymeric coatings were observed to be better in surface texture than the sample film/polymeric coating that was dried in the vacuum oven (Example 1). Both of the cast films/polymeric coatings were successfully switched to their non-carbonated form. This was confirmed by scratching samples from each film, soaking the scrapings in $D_2O$ for over 3 hours, and analyzing these samples using $^1$H NMR spectroscopy. The resultant $^1$H NMR spectra confirmed the switch to non-carbonated form, given the absence of even trace polymer. The weight of the scrapings used for each sample was 25 mg, which would be expected to display a well-resolved spectrum if the film/polymeric coating had not switched to its original non-carbonated form. The spectra displayed no traces of carbonated form, which also confirmed that the deposited polymer film is largely insoluble in water.

Example 3A

Investigation of pMMA-pDEAEMA Co-polymers for Use in Switchable Paint or Coating Compositions Synthesis of PMMA-pDEAEMA Co-polymers Methyl methacrylate (MMA), diethylamino ethylmethacrylate (DEAEMA), azobisisobutyronitrile (AIBN), and titanium dioxide—anitase ($TiO_2$) was purchased from Sigma-Aldrich. Ti-Pure R-706 (titanium dioxide) was obtained from Dupont.

Switchable co-polymers were synthesized with varying ratios of MMA/DEAEMA monomer: 10/90, 20/80, 30/70 and 40/60, respectively. A free radical polymerization method was chosen with AIBN as initiator. Before use, AIBN was recrystallized from ethanol and dried in vacuum oven overnight.

A representative method for synthesis of the 10/90 co-polymer is provided, but said method was used for each co-polymer synthesis. Co-polymerizations were carried out under an inert, argon atmosphere, unless otherwise specified.

N,N-Dimethyl formamide (dried, 10 mL) was added to a flame-dried, schlenk round bottom flask, followed by AIBN (5.4 mg; 0.2 mol %) was added. MMA (0.16 mL; 10 mol %) was then added to the flask with DEAEMA (3.0 mL; 90 mol %), and heated to 75° C. for 6 hours under argon in a silicon oil bath. The reaction was stopped by lifting the flask from the silicon oil bath, and allowing it to equilibrate at room temperature in a fume hood. The resultant solution was added drop wise to cold Millipore water (2 L) to induce polymer precipitation. The polymer was then isolated by filtration, and washed with additional cold Millipore water (1 L) to remove any residual monomer. The isolated, washed co-polymer was then dissolved in acetone to repeat the polymer precipitation process using cold Millipore water (2 L). After the polymer was isolated for a second time, it was dried on a schlenk line overnight.

Isolated masses for the synthesized for 10/90, 20/80, 30/70 and 40/60 co-polymers were 1.39 g, 2.87 g, 1.01 g and 1.66 g respectively. Each co-polymer was analyzed by $^1$H and $^{13}$C NMR; if residual monomer peaks were observed in the NMR spectra, the above-described polymer precipitation process was repeated.

Molecular weight and polydispersity index (PDI) analysis was undertaken via gel-permeation chromatography (GPC) (See Table 1). GPC analysis was completed at 25° C. with a Wyatt Optilab rEX refractive index detector, using 3 columns respectively packed by MZ-Analysentechnik with 5µ AM 500, 10000 and 100000 Å gels, after calibrating the GPC system using monodisperse polystyrene standards. Chloroform was used as solvent at a flow rate of approximately 1 mL/minute. Prior to analysis, each co-polymer sample was filtered through a GE Whatman 0.2µ filter.

Testing Synthesized Co-Polymers for Use in Switchable Paint and Coating Compositions Application with Paint Brush A 13 wt % (0.6 g) loading of the above-described switchable co-polymers was added to Millipore water (4 mL) to generate a heterogeneous solution, through which $CO_2$ was bubbled for 6-8 hours until the co-polymer achieved a degree of protonation such that the co-polymer switched from its substantially water-insoluble form to its substantially water-soluble form, thus dissolving in water, and forming a homogenous polymer solution. The co-polymer solution was mixed with ($TiO_2$) (~55 mg) to create a paint-formulation analog, which was then applied to a primed aluminum surface with a paintbrush recommended for use with latex paints.

Application with Spray Gun

To investigate application of the above-described paint-formulation analogs to a surface using a spray gun (Iwata Eclipse HP-CS; Japan-KM), it was necessary to repeat and scale-up the above-described co-polymer synthesis, by a factor of two, to obtain enough co-polymer to generate a paint-formulation analog volume suitable for spray-painting. Approximately 5-7 mL of polymer solution was required for spray painting versus 3-4 mL for paint brushing.

Following the synthesis, precipitation, and isolation of the larger-scale co-polymers, polymer (0.6 g) was added to water (4 mL) to generate a heterogeneous solution. Said polymer solution was then mixed with Ti-Pure R-706, a titanium particle that was selected for its ability to mix better with aqueous solutions. $CO_2$ was then bubbled through the polymer-$TiO_2$ mixture for half an hour, following which the mixture was briefly vortexed to thoroughly disperse the titanium. The then paint-formulation analog was loaded into a spray gun and, using $CO_2$, applied onto a primed aluminum sheet (purchased primed from RONA).

Paint-Coating Tests

Each aluminum sheet painted, by brush or spray gun, was allowed to dry on a bench top over several hours, allowing for $CO_2$ evolution from the polymeric coating, resulting in de-protonation of the switchable co-polymer, switching it from its substantially water-soluble form to its substantially water-insoluble form; after which, a second or third coat was applied as necessary. The relative quality of each polymeric coating from each paint-formulation analog was then compared.

Each polymeric coating was then put through stress tests: (i) coating strength was evaluated via scratching with a glass rod; (ii) coating water stability (e.g., resistance to swelling, etc.) was evaluated via soaking in water for 24 hours; and, (iii) coating water stability was further evaluated via soaking in deuterated water for 6 hours, which facilitated NMR analysis to determine if any of the polymeric coating dissolved.

To determine if higher wt % loadings of polymer could be dissolved in water upon exposure to $CO_2$, a 20 wt % loading of the 20/80 switchable co-polymer (2.5 g) was added to Millipore water (10 mL) and exposed to $CO_2$; it was found that the polymer did dissolve, generating a 25 wt % switchable co-polymer solution.

This 20 wt % 20/80 switchable co-polymer solution was then used in a low-temperature test, at 4° C. in a cold room, to assess the co-polymer based, paint-formulation analogs' performance at decreased temperatures. Said polymer solution was mixed with Ti-Pure R-706, following which $CO_2$ was bubbled through the polymer-$TiO_2$ mixture for half an hour, after which the mixture was briefly vortexed to thoroughly disperse the titanium. The then paint-formulation analog was loaded into a spray gun and, using $CO_2$, applied onto a primed aluminum sheet (purchased primed from RONA).

A standard latex paint, purchased from RONA, was also spray-painted onto previously primed aluminum sheets, for comparison. The polymeric coating and paint were then compared for chalking. Chalking is known to occur when paint polymer resins do not coalesce: the resins only sit on a surface to which they are applied, such that mechanical manipulations (e.g., touching the surface) remove them. Consequently, chalking prevents formation of a smooth continuous coating, and has been observed when a paint is applied at too low a temperature (e.g., a temperature lower than the resins' $T_g$). It has been found that chalking is a characteristic of latex paints, wherein the resins remain in the latex's water-based solvent as an emulsion; in contrast, chalking has not generally been observed with oil/solvent-based paints, as the resins remain dissolved in the solvent.

Results and Discussion

Switchable co-polymers were synthesized to provide a selection of polymers with an appropriate glass-transition temperature range ($T_g$; ° C.) that would be suitable for use in a Switchable Paint and Coating Composition (approximately 40-50° C.) This range was selected for the composition given that, as the $T_g$ of a polymer increases, the polymer generally becomes more brittle; and, as the $T_g$ of a polymer decreases, the polymer generally becomes more rubber-like.

Diethylaminoethyl methacrylate (DEAEMA) and methyl methacrylate (MMA) were selected because of their switchable moieties (DEAEMA, amino-groups) and/or their $T_g$ values of approximately 20° C. (293.15 K) and approximately 110° C. (383.15 K), respectively. Switchable co-polymers were synthesized to contain MMA/DEAEMA molar ratios of 10/90, 20/80, 30/70 and 40/60 respectively, which had theoretically calculated $T_g$ values of 28° C., 37° C., 45° C. and 54° C. respectively (Table 1). The theoretical $T_g$ values were predicted using a Flory-Fox equation, which took the mass ratio of each monomeric unit, multiplied by the pure $T_g$ of the monomer. For example: 10/90 MMA/DEAEMA $T_g$ estimation, where $$T_g = M_1 T_{g1} + M_2 T_{g2};$$

$M_1$=MMA mass ratio=0.1;
$T_{g1}$=105° C. (378.15 K);
$M_2$=DEAEMA mass ratio=0.9;
$T_{g2}$=20° C. (293.15 K); and
$T_g$=(0.1*378.15)+(0.9*293.15)=301.65 K=28.5° C.

To form the polymeric coatings, as described above, a 13 wt % heterogeneous solution of a switchable co-polymer in water was exposed to $CO_2$, resulting in the co-polymer's dissolution to form a homogenous solution. Before use, each carbonated, homogeneous co-polymer solution was mixed with a $TiO_2$ to form a paint-formulation analog, which were then applied by paintbrush, or spray gun.

Figure 4:
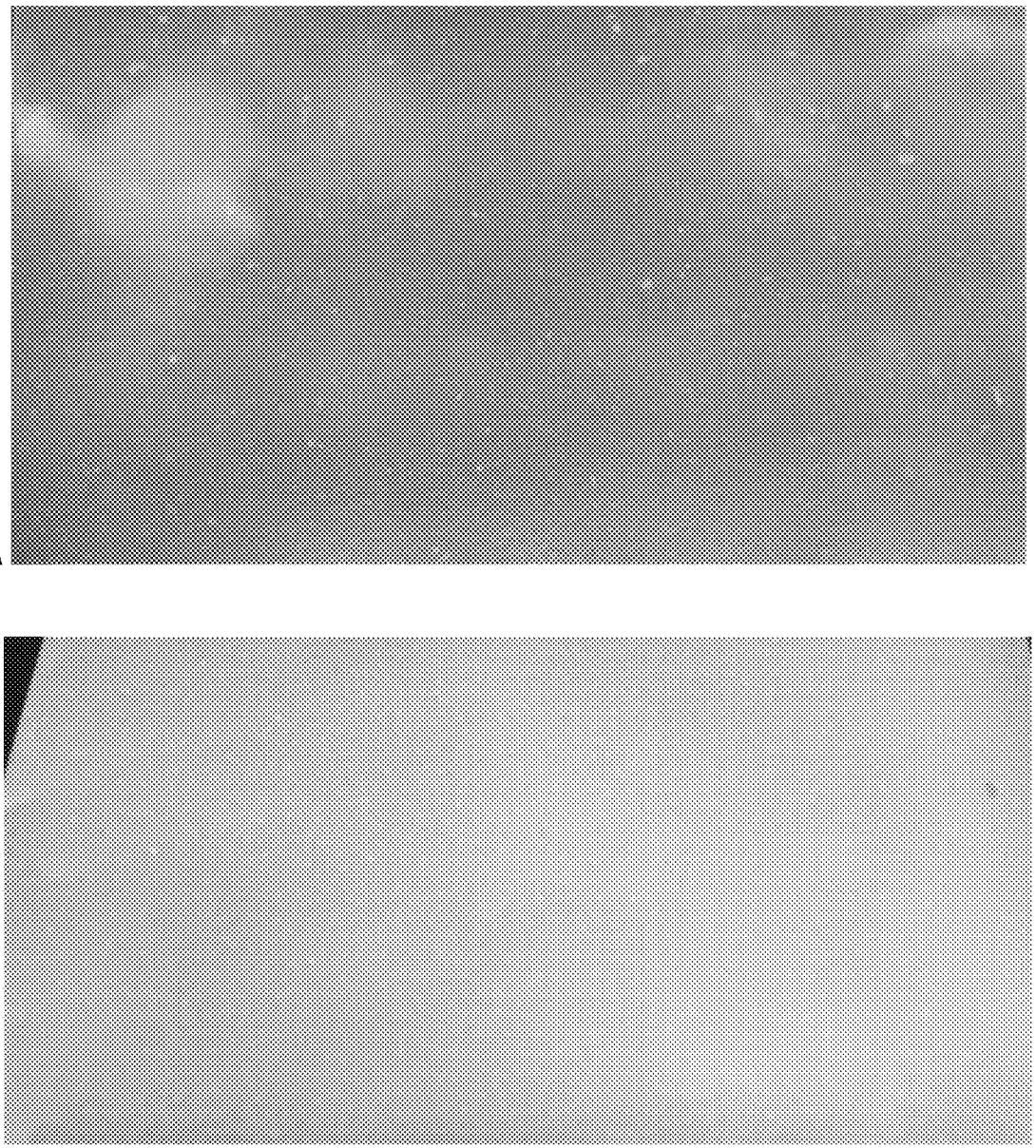
FIG. 4 depicts: A 1 coat of 10/90 poly(MMA-co-DEAEMA) at 13 wt % loading mixed with $TiO_2$, sprayed with spray gun using $CO_2$ gas, onto a grey primed aluminum sheet; B 2 coats of 20/80 poly(MMA-co-DEAEMA) at 13 wt % loading mixed with $TiO_2$, sprayed with spray gun using $CO_2$ gas, onto a grey primed aluminum sheet; C 1 coat of 30/70 poly(MMA-co-DEAEMA) at 13 wt % loading mixed with $TiO_2$, sprayed with spray gun using $CO_2$ gas, onto a grey primed aluminum sheet; D 2 coats of 40/60 poly(MMA-co-DEAEMA) at 13 wt % loading mixed with $TiO_2$, sprayed with spray gun using $CO_2$ gas, onto a grey primed aluminum sheet.
Figure 5:
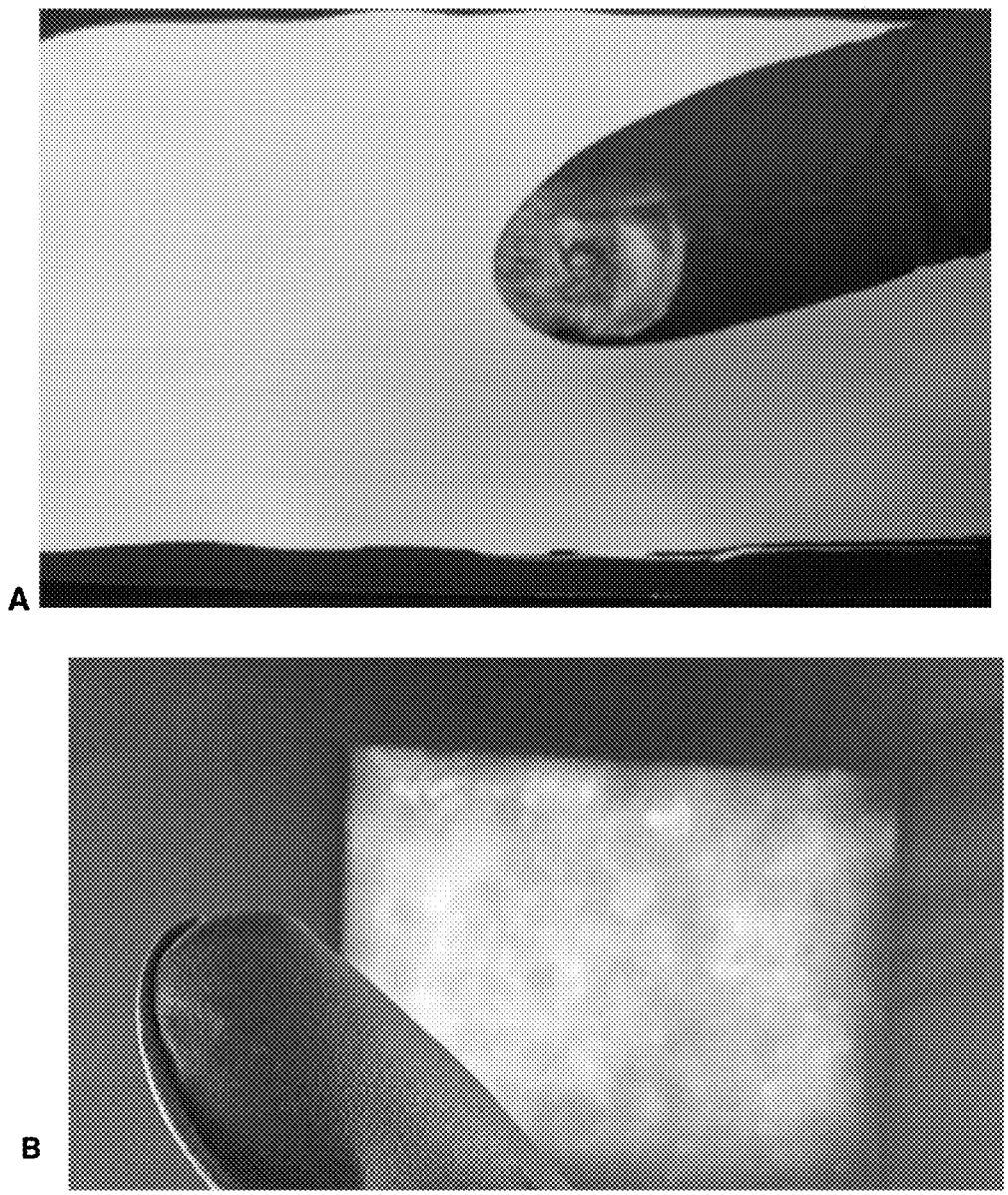
FIG. 5 depicts: A Commercial water-based latex paint chalking onto glove after being applied at 4° C. and allowed to dry B Lack of 20/80 poly(MMA-co-DEAEMA) paint chalking onto glove at a 25 wt % loading, after being applied at 4° C. and allowed to dry.

It was observed that polymeric coatings applied using a brush tended to be uneven, and it was considered that this is a consequence of paintbrush type (e.g., firmer bristles) and/or a lower wt % loading of polymer in the paint-formulation analogs (see FIG. 4). In contrast, it was observed that coatings applied using a spray gun tended to be more even relative to coatings applied with a brush (see FIG. 5). It was also considered that this uneven application via a brush may be a consequence of the polymeric coating having too high a viscosity or surface tension issues—and that further optimization of the paint or coating composition may correct this. For example, having too high a viscosity may be a result of the polymer having too high a molecular weight, having too high a polymer loading (wt %), insufficient branching in the polymer, etc. Thus reducing viscosity may be accomplished by using a polymer having a lower molecular weight, lowering the polymer loading, or increasing the amount of branching, etc. Also, surface tension issues may be caused by high airflow leading to water evaporation at the film/water interface; this may be minimized by adding a small amount of glycol or glycol ether to maintain viscosity if some water evaporates.

With respect to the spray gun, it was found that the paint-formulation analogs clogged the gun; though this was considered a potential result of undispersed $TiO_2$, which may be addressed with further optimization (e.g., diluting the paint or coating composition).

It was also observed that beading sometimes occurred when the paint-formulation analogs were spayed onto the aluminum sheets. It was considered that this may be a consequence of the switchable co-polymer solutions not having a high enough wt % loading to ensure an appropriate viscosity. Consequently, the 20/80 switchable co-polymer was solubilized in carbonated water to form a 20 wt % homogenous solution, which was then sprayed onto an aluminum sheet. It was observed that this relatively concentrated polymeric coating exhibited less beading.

It was observed that, as expected, the polymeric coatings were harder and more brittle with increasing MMA concentration; and, that the polymeric coatings were softer, more rubber-like at room temperature (~27° C.) with increasing DEAEMA concentration. Thus, it was considered that a polymer system having a relatively high $T_g$ value/range may be more suitable, in some applications, for use in a Switchable Paint or Coating Composition, as switchable co-polymers having a lower $T_g$ value/range were found to have a tacky texture that could lead to debris adhering to them.

By $^1$H and $^{13}$C NMR analysis, it was found that the switchable co-polymers contained little to no monomers. Further, water stability tests completed with deuterated water and analyzed by NMR spectroscopy, as described above, showed no traces of co-polymer or monomer in the water; this suggested that the above-described switchable co-polymers, once applied as a polymeric coating to a surface, will not dissolve back into neutral water—even after prolonged exposure.

It was observed, however, that each of the above-described, switchable co-polymer-based paint coatings swelled slightly upon soaking in water, as evidenced by their opaque discoloration relative to non-soaked portions of the paint coatings; but, given enough time to dry, each returned to their original state. It was observed that swelling intensity was slightly higher with the 10/90 and 20/80 co-polymers; it was considered that this was due to the higher concentrations of DEAEMA, which, as a homopolymer, is known to swell when exposed to water.

With respect to the coating-stability stress tests, which were undertaken to examine strengths of each switchable co-polymer-based polymeric coating on aluminum, each polymeric coating was scratched with a glass rod. It was found that polymeric coatings comprising higher concentrations of MMA (30/70 and 40/60) were more readily, mechanically removed than those with lower concentrations of MMA (10/90 and 20/80). It was considered that the harder, more brittle nature observed with higher-concentration MMA co-polymers contributed to said coatings be more readily, mechanically removed. In contrast, it was found that polymeric coatings comprising co-polymers having a higher concentration of DEAEMA were, as previously observed and described, softer and more rubber-like, and thus were less readily, mechanically damaged; it was found, however, that said coatings were also more prone to picking up debris overtime.

Figure 6:
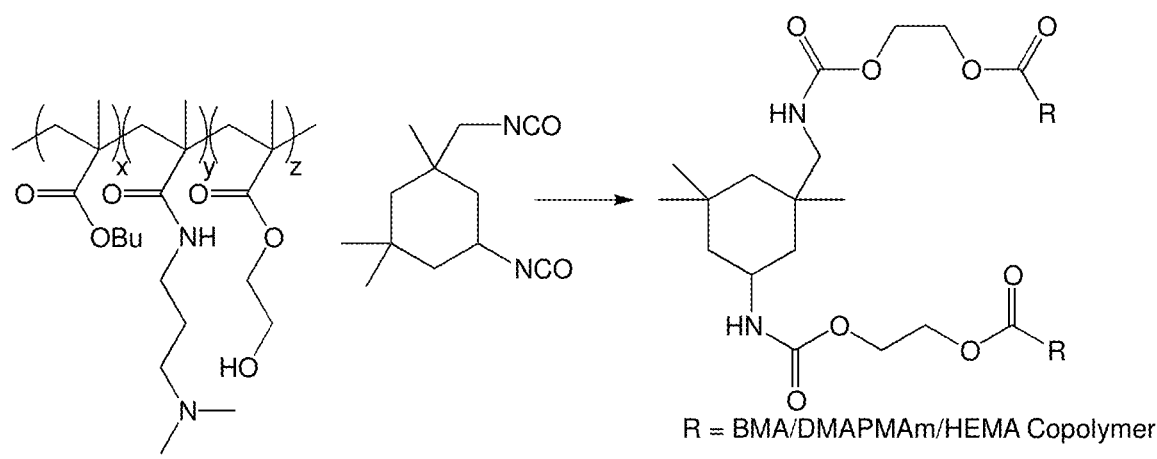
FIG. 6 depicts a general schematic of an isophorone diisocyanate crosslinking of poly(BMA-co-DMAPMAm-co-HEMA), wherein one crosslink is depicted.

Low temperature tests were undertaken at 4° C. with polymeric coatings comprising a 20 wt % loading of the 20/80 switchable co-polymer switchable and $TiO_2$. It was observed that, at 4° C., chalking of the paint coating did not occur. In contrast, a commercially acquired latex paint, which was tested for comparison, did exhibit chalking such that the latex paint coating was readily, mechanically removed (see FIG. 6).

Example 3B

Further Demonstration of p(MMA-Co-DEAEMA) Co-Polymers for Use in Switchable Paint or Coating Compositions Synthesis of p(MMA-Co-DEAEMA) Co-Polymers To further optimize rheological properties of the co-polymers described above (see Example 3A) approximately 10 g each of a 10/90, 20/80, 30/70 and 40/60 pMMA/pDEAEMA co-polymer was synthesized. The AIBN-initiated free radical polymerization synthesis outlined in Example 3A was followed to synthesize the approximately 10 g of each co-polymer; see Table 2.

GPC analysis of the p(MMA-co-DEAEMA)co-polymers was completed at 25° C. using a Wyatt Optilab rEX refractive index detector, and three columns respectively packed by MZ-Analysentechnik with 5μ AM 500, 10 000 and 100 000 Å gels. Chloroform was used as a solvent, at a flow rate of approximately 1 mL/min. Prior to analysis, the GPC system was calibrated using monodisperse polystyrene standards; and, each co-polymer sample was prepared for analysis by dissolving the sample in chloroform (approximately 10 mg/mL) and filtering it through a GE Whatman 0.2μ filter.

Testing of p(MMA-Co-DEAEMA) Co-Polymers

A carbonated solution of each co-polymer (10/90, 20/80, 30/70 and 40/60 p(MMA-co-DEAEMA)) was made, at a weight percent loading of approximately 23-26 wt %, by adding approximately 3.0-3.5 g of co-polymer to 10 mL Millipore water to form an aqueous mixture. $CO_2$ gas was bubbled through each aqueous mixture until a visually homogeneous solution of co-polymer in carbonated water was obtained. To achieve this, $CO_2$ was sparged through each aqueous mixture for approximately 8 hours.

Testing of p(MMA-Co-DEAEMA) Co-Polymers—Application with Spray Gun

Applying each resultant carbonated co-polymer solution (approximately 23-26 wt %) onto a pre-primed aluminum plate (purchased pre-primed from RONA Inc.) using a $CO_2$ propelled spray gun (Iwata Eclipse HP-CS; Japan-KM) was attempted. However, the model of spray gun used was meant for thinner oil based paints; consequently, the carbonated solution's viscosity was too high to allow use of the spray gun as a method of application.

Testing of p(MMA-Co-DEAEMA) Co-Polymers—Application with Paint Brush

Each resultant carbonated co-polymer solution (approximately 23-26 wt %) was applied onto a pre-primed aluminum plate (purchased pre-primed from RONA Inc.) by brush: a total of 3-5 mL of a carbonated co-polymer solution was brushed onto a plate via three separate coats having approximately 4 hours of drying time between each coat application. It was observed, after application and drying of the three coats of solution, that evaporation of the carbonated water resulted in a glossy, transparent coating on the aluminum plate, where coatings of the 10/90 and 20/80 co-polymers were rubbery and softer to the touch, and coatings of the 30/70 and 40/60 co-polymers were harder and brittle.

Coating Tests

Water spot tests and mechanical stress tests were performed on each co-polymer coated plate. A water spot test was conducted by placing approximately 5 mL of Millipore water onto the coated plate, ensuring that an adequate amount of the polymeric coating was covered by water. The water was left on the plate, in contact with the polymeric coating, for approximately a day (~18-24 hours), after which the water was removed by soaking it up with a lintless tissue. The polymeric coating was then observed to determine if any physical changes occurred, such as swelling or disolouration.

Mechanical tests were performed on each polymeric coating by: i) rubbing the coating with a gloved finger; and ii) scrating the coating with a glass rod. The polymeric coating was then observed to determine if any physical changes occurred.

Delamination tests were performed on each polymeric coating, whereby an "X" pattern was inscribed onto each surface with a blade. Adhesive tape/strips were then place over this pattern and lifted off quickly, to see if the coating would lift off the primed aluminum surface. For each of the polymeric coatings (i.e., coatings formed from co-polymers 10/90, 20/80, 30/70 and 40/60 MMA/DEAEMA), no delamination was observed.

A series of wipe tests were also performed on each polymeric coating, using: i) a dilute acetic acid solution (10% solution; 10 mL acetic acid in 90 mL of Millipore water); ii) common organic solvents (i.e.; acetone, isopropanol); iii) cleaners in the form of soapy water or detergents; and, iv) water. Each wipe-test solvent (~0.5 mL) was placed onto a dry polymeric coating; and, after 1-2 minutes of exposure, the solvent was removed by wiping the coating approximately 50 times with a lint-less tissue. Each polymeric coating was observed to determine if any physical changes occurred, such as swelling, discolouration, wear, tear, and abrasions, before, during, and after wiping. Table 3 summarizes results of the wipe tests, wherein 'fail' means the polymeric coating blistered and/or dissolved off the plate (e.g., with isopropyl alcohol or acetic acid), or when wiping the coating several times resulted in visual damage to the coating (e.g., soapy water).

Cross-Linking Tests

Investigation into synthesizing cross-linked polymers was undertaken using homopolymers pDEAEMA, ptBAEMA, pDMAPMAm and co-polymers 10/90, 20/80, 30/70 and 40/60 p(MMA-co-DEAEMA). For each polymer, three 20 wt % aqueous mixtures—mixtures (i), (ii), and (iii)—were made by mixing 1.25 g of polymer into 5 mL Millipore water; each mixture was then carbonated until an apparently homogeneous solution was obtained. Mixtures (i)-(iii) were as follows:

(a) Mixture (i) was the control, and had no crosslinking agent added;

(b) Mixture (ii) had 20 wt % (1 g) of a crosslinking agent added (i.e., 1,6-dichlorohexane, $\alpha,\alpha'$-dibromo-p-xylene, or 1,5-hexadiene diepoxide; purchased from Sigma-Aldrich);

(c) Mixture (iii) had 10-20 wt % (1 g) crosslinking agent added, as well as 9 mM surfactant (sodium dodecyl sulfate; SDS).

Each one of Mixtures (i)-(iii) was stirred via a magnetic stirrer and stir bar for approximately 8 hours after addition of the above-listed additives, poured onto pre-primed aluminum plates (purchased from RONA Inc), and allowed to dry overnight in a fumehood. Each polymeric coating was visually inspected and compared to the control (mixture (i)) for a qualitative assessment. Following visual inspection, each polymeric coating was subjected to the above-delineated coating tests; for results, see Tables 4-5.

Additional Depressed Temperature Tests

As described in Example 3A, a 20 wt % carbonated solution of co-polymer 20/80 p(MMA-co-DEAEMA), mixed with Ti-Pure R-706, was applied to a primed aluminum sheet at 4° C. in a cold room, and compared to a conventional latex paint (purchased from Rona Inc.) that was also applied to a primed aluminum sheet at 4° C. in a cold room.

To further investigate application of the herein-described switchable paint or coating compositions at depressed temperatures (e.g., 4° C.), the same test outlined in Example 3A was conducted with 23 wt % carbonated solutions of 10/90, 20/80 30/70 and 40/60 p(MMA-co-DEAEMA) mixed with Ti-Pure R-706 (55 mg). Following adequate mixing of Ti-Pure with each polymer mixture, the mixture was then carbonated, and applied to a primed aluminum sheet with a paintbrush. Each polymeric coating was allowed to dry on a benchtop in the cold room at 4° C. overnight. As a control, a commercially available latex also applied to a primed aluminum sheet in a cold room at 4° C. The following day, comparisons between the polymeric coatings and the commercially available latex were made via a 'rub test', wherein a gloved finger was rubbed over each surface approximately 50 times, with enough force that the plate would move if not held in place. Any perturbation or removal of latex/Ti-Pure R-706, or just Ti-Pure R-706 from the latex/polymeric coating, respectively, was observed. It was found that the co-polymers 10/90 and 20/80 p(MMA-co-DEAEMA) did not exhibit loss of Ti-Pure R-706; however, co-polymers 30/70 and 40/60 p(MMA-co-DEAEMA) did.

Results and Discussion

As described in Example 3A, previous polymeric coatings were applied at 20 wt % loadings; however, it was noted that for certain applications, a 20 wt % solution may not be viscous enough. As such, the weight percent of polymer in solution was increased to attempt to obtain a corresponding increase in viscosity and rheology.

As a first attempt, 23 wt % aqueous mixtures of 90/10, 20/80, 30/70 and 40/60 p(MMA-co-DEAEMA) were made and carbonated by bubbling $CO_2$ through the mixture, to form a visually homogeneous solution. To determine whether a higher weight-percent mixture could be formed, another approximately 5 wt % of each co-polymer was added to their respective flasks and further carbonated by bubbling $CO_2$ through the mixture to see if a visually homogeneous solution formed. Of the additional 5 wt % added to each co-polymer solution, it was observed that some of the additional co-polymer dissolved and that the resultant solution's viscosity increased; however, not all of the added co-polymer dissolved. It was considered, therefore, that the co-polymer's solubility in carbonated aqueous solutions was between approximately 30-35 wt %, at the molecular weights determined by GPC (see Table 2).

It was attempted to test application of the higher weight-percent carbonated solutions of each co-polymer using a $CO_2$ propelled spray gun (Iwata Eclipse HP-CS; Japan-KM); however, the solution's increased viscosity (relative to the 25 wt % solutions described in Example 3A), caused the spray gun to become clogged, resulting in uneven spraying of the solution onto the pre-primed aluminum plates. It was considered that the spray gun's inefficiency was due, at least in part, to it being designed for oil-based paints, which are known to be less viscous than the carbonated co-polymer solutions tested herein. It was then considered that a spray gun designed for more viscous solutions may be useful for applying the herein described higher weight-percent solutions of switchable polymer/co-polymers.

In place of a spray gun, a paintbrush was used as a method of application. When applying the higher weight-percent carbonated solutions of each co-polymer to an aluminum plate, approximately 5-7 mL of solution was brushed onto the pre-primed aluminum plates, and allowed to dry for 4 hours. A total of three coats of polymer solution were applied to each plate. As the higher weight-percent carbonated solutions were more viscous, it was observed that applying the polymeric coatings by paintbrush generated a relatively more even coat, as compared to the coatings described in Example 3A, wherein a less viscous, 15 wt % polymer solution was used. Further, the higher weight-percent solutions were applied using with a softer-bristled brush (purchased from RONA Inc.; SIMMS ECO SENSE PRO w/ 100% Recycled Dupont Nylon Filaments, angular sash (38 mm-1.5")), as opposed to the previously used harder-bristled brush (see Experiment 3A). It was observed that the softer-bristled brush became well coated in the relatively more viscous polymer solutions, and appeared to evenly distribute them on the plate. After applying three coatings, and upon visual inspection, it appeared as if a continuous polymeric coating had been evenly applied to each aluminum plate.

A series of stress tests were performed on each higher weight-percent polymer coating. First, each coating was subjected to the water spot test, as described above. Upon visual inspection, a swelling pattern (e.g., an observed discolouration compared to sections not in contact with water) was observed in each polymeric coating that was in keeping with previous testing (see Example 3A). It was further observed, however, that the appearance of swelling disappeared after a few hours, under exposure to air on a bench top.

In a separate 'rub test', each polymeric coating was rubbed with a gloved finger and then scratched with a glass rod, with any physical changes being observed. When rubbing with a gloved had, it appeared that the higher MMA content co-polymers (i.e., 30/70 and 40/60) formed relatively harder polymeric coatings, as the gloved finger easily glided across the coated plate surface. In contrast, co-polymers with a higher DEAEMA content (i.e., 10/90 and 20/80) did not appear to form as relatively hard coatings, as the glove did not glide as easily across the coated plate's surface—it stuck to the coating relatively more than it did with the higher MMA content co-polymer coatings.

With respect to the glass rod scratch test, it was observed that polymeric coatings with higher concentrations of MMA to DEAEMA (i.e., 30/70 and 40/60) were more likely to exhibit a surface scratch. Without wishing to be bound by theory, it was consider that this was due to the relatively brittle nature of those particular coatings because of their higher MMA content. As is known in the art, MMA as a homopolymer is a relatively hard and brittle polymer; as such, a polymeric coating with a higher MMA content may exhibit more defects under mechanical perturbations than polymeric coatings with a lower MM content. In contrast, it was observed that co-polymers having a lower MMA to DEAEMA content (i.e., 10/90 and 20/80) were less likely to be scratched by the glass rod. However due to the higher content of DEAEMA, the homopolymer of which is known in the art to be softer and relatively more rubbery, the resultant polymeric coatings qualitatively felt 'stickier', and were prone to debris adhesion as previously noted (see Example 3A).

Delamination tests (i.e., "X"-Pattern test) facilitate testing whether a polymeric coating, as described herein, will delaminate, or lift off a surface (e.g., a primed plate) once applied. An "X" pattern was incised into each polymeric coating with a knife, a piece of scotch tape was placed over the X-pattern, and that tape was quickly lifted away to see what effect it had on the coating. In all cases, removing the tape from the polymeric coatings did not cause delamination.

Additionally, a series of solvent wipe tests were performed on each polymeric coating. Water spot tests were performed on all coatings from 10/90, 20/80, 30/70 and 40/60 p(MMA-co-DEAEMA) and all passed. Swelling did occur, but disappeared after being given time to dry. Water wipe tests were also passed, after each coating had ~0.5 mL of Millipore water placed on it, and then wiped 50 times with a lint-less wipe afterwards. For wipe tests performed with water, isopropanol and 1M acetic acid, the results are summarized in Table 3. It was observed that there was no loss/removal/dissolution of the polymeric coatings with water, however there was observed damage (e.g., a dissolution or softening of the coating) to the polymeric coatings with isopropanol and acetic acid. There was observed damage (to the polymeric coatings of 10/90 and 20/80 p(MMA-co-DEAEMA) co-polymers with soapy water; however there was no observed loss/removal/dissolution of the polymeric coatings with soapy water for the 30/70 and 40/60 p(MMA-co-DEAEMA) co-polymers. Polymeric coatings with a higher MMA content appeared to fare better with isopropanol, not being damaged as much during the wiping. However, it was observed that all coatings appeared damaged when exposed to 1M acetic acid.

It was considered that crosslinking the co-polymers may result in a more physically and chemically robust coating. Without wishing to be bound by theory, it was considered that the crosslinking reaction would occur between the co-polymer's amine groups and the crosslinking agent(s). However, as the co-polymer's amine groups are protonated in a carbonated solution, initially no cross-linking reaction occurs until after the polymer solution was applied to a surface. Upon application to a surface, the polymer solution dries and evolves $CO_2$, thus deprotonating (e.g., deprotecting) the amine groups, and making them susceptible to reaction with crosslinking agents. As such, homopolymers pDEAEMA, ptBAEMA and pDMAPMAm, and co-polymer 10/90, 20/80, 30/70 and 40/60 MMA/DEAEMA were used with crosslinking agents 1,6-dichlorohexane, and $\alpha,\alpha'$-dibromo-p-xylene to investigate cross-linked coatings. A curing step was completed after each polymeric coating was applied to a plate and initially tested via wipe tests. Each coated plate was placed in a vacuum oven for 1 h at 25 mmHg and 120° C. (Fisher Scientific Isotemp vacuum oven, model 280A).

Initial testing began with one of pDMAEMA, pDMAPMAm and 20/80 p(MMA-co-DEAEMA), being mixed with cross-linker 1,6-dibromohexane. It was observed that insufficient mixing occurred, however, as evidenced by a persistent organic layer comprising the 1,6-dibromohexane; it was considered that this was due to the aqueous nature of the carbonated polymer solutions. A visible change in the polymer solution was observed, however: prior to addition of the crosslinking agent, each polymer solution was clear; but following addition of the crosslinking agent, each solution became cloudy and slightly more viscous. After mixing each solution overnight, the consistency of each solution became almost gel like; this gel-like solution was then cast onto an aluminum plate. However, the resultant polymeric coating showed no difference in coating performance than coatings formed from polymer solutions containing no crosslinking agent. Without wishing to be bound by theory, it was considered that some polymer may have cross-linked, as suggested by the qualitative observation of a gel-like solution forming, but that not enough crosslinking occurred to cause a noticeable change in coating performance; for example: water spot and scratch tests were performed on these coatings, and the coatings were observed to perform similarly to coatings formed from regular polymer solutions.

Without wishing to be bound by theory, it was considered that the crosslinking agent wasn't sufficiently soluble in the aqueous polymer solutions to be effective as a cross-linker. As such, a common surfactant (SDS) was added to the crosslinking agent-containing polymer solutions, at a concentration just above its critical micelle concentration (CMC) in water (9 mM), to help better solubilize and disperse the crosslinking agent. Further, the experiment was repeated with relatively water-soluble polymer ptBAEMA, in place of relatively water-insoluble polymers pDMAEMA, pDMAPMAm and 20/80 p(MMA-co-DEAEMA). This was done to provide a qualitative assessment as to whether crosslinking occurred: it is expected that crosslinking would render the water-soluble homopolymer tBAEMA insoluble.

Water spot tests were performed on co-polymers 10/90, 20/80, 30/70 and 40/60 p(MMA-co-DEAEMA)cross-linked with 1,6-dibromohexane or dibromo-p-xylene, homopolymer ptBAEMA, and ptBAEMA cross-linked with 1,6-dibromohexane or dibromo-p-xylene. None of the cured crosslinked, polymeric coatings exhibited damage or dissolution after the water test was performed, though a slight swelling was observed that disappeared after a few hours of drying. However, uncured coatings of 1,6-dibromohexane-crosslinked p(MMA-co-DEAEMA) 10/90, 20/80, and 30/70 co-polymers did not pass the water wipe test; as this had not been the case with the non-crosslinked co-polymers, it was considered (without wishing to be bound by theory) that the added surfactant may have affected coating quality. The cured 1,6-dibromohexane-crosslinked p(MMA-co-DEAEMA) 10/90 co-polymer did not pass the soapy water test, however all other cured crosslinked p(MMA-co-DEAEMA) co-polymers did. As expected, the polymeric coating formed from the relatively water-soluble homopolymer ptBAEMA did dissolve during the water spot test (see Tables 4 and 5).

Wipe tests using the organic solvents isopropanol and acetic acid were also performed on cured and uncured co-polymers 10/90, 20/80, 30/70 and 40/60 p(MMA-co-DEAEMA) cross-linked with 1,6-dibromohexane or dibromo-p-xylene, homopolymer ptBAEMA, and ptBAEMA cross-linked with 1,6-dibromohexane or dibromo-p-xylene. It was observed that homopolymer ptBAEMA was susceptible to dissolution/damage during each wipe test. When ptBAEMA was cross-linked with 1,6-dibromohexane or dibromo-p-xylene and cured, both passed the water and soapy wipe tests; ptBAEMA cross-linked with dibromo-p-xylene and cured passed the isopropyl alcohol wipe test. When ptBAEMA was cross-linked with 1,6-dibromohexane and not cured, the resultant coating only passed the water wipe test. When ptBAEMA was cross-linked with dibromo-p-xylene and not cured, it failed all tests. Though visually, the quality of the polymeric coating of uncured ptBAEMA cross-linked with dibromo-p-xylene appeared to be a smoother and relatively more continuous coating than that generated by homopolymer ptBAEMA, the polymeric coating of uncured ptBAEMA cross-linked with dibromo-p-xylene still exhibited damage/dissolution when exposed to solvents. For cured co-polymers 10/90, 20/80, 30/70 and 40/60 p(MMA-co-DEAEMA) cross-linked with 1,6-dibromohexane or dibromo-p-xylene, it was also observed that the coatings exhibited damage/dissolution when exposed to the organic solvents.

In instances where cross-linked coatings exhibited damage/dissolution when exposed to solvents, it was considered that perhaps an insufficient amount of crosslinking had occurred to impart the desired resistance; and, without wishing to be bound by theory, it was considered that improving upon, or increasing the crosslinking within the polymers would increase solvent resistance.

Example 4

Preparation of a Switchable Polymer Suitable for Paint or Coating Compositions Having a Lower $T_g$ Preparation of Poly(dimethylaminopropylmethacrylamide-co-butylacrylate) (poly(DMAPMAm-co-BA)):

Materials (E)-2,2'-(diazene-1,2-diyl)bis(2-methylpropanenitrile) was purchased from Sigma-Aldrich and recrystallized from methanol prior to use. Recrystallized (E)-2,2'-(diazene-1,2-diyl)bis(2-methylpropanenitrile) was stored in a nitrogen-filled glove box. N-(3-(dimethylamino)propyl)methacrylamide and butylacrylate was purchased from Sigma-Aldrich and used without further purification. Toluene and hexanes were purchased from Fisher Scientific Inc. and used without further purification. $CDCl_3$ was purchased Cambridge Isotope Laboratories Inc. and used without further purification.

Instrumentation and Copolymer Characterization

Copolymer compositions were analyzed by NMR spectrometry using a Varian 400 MHz spectrometer with $CDCl_3$ as deuterated solvent. Copolymer molecular weight was determined by gel permeation chromatography (GPC) on a Polymer Laboratories PL-50Plus instrument, utilizing as eluent of THF/250 ppm 2,6-di-tert-butyl-4-methylphenol at a flow rate of 1 mL/min at 40° C., a mixed-C PLgel 5 μm column, and a RI detector, using a polystyrene standard. NMR analysis was used to determine the copolymer composition of poly(DMAPMAm-co-BA) by integrating and comparing relative intensities of DMAPMAm's methylene proton resonances at 3.21 ppm, and BA's methylene-proton resonances at 3.99 ppm.

Thermogravimetric analysis (TGA) of the co-polymer was completed using a Mettler-Toledo TGA/DSC1. TGA analysis was undertaken at a heat rate of 10° C./min, from room temperature to 800° C.; this was done as a general heat ramp to determine the co-polymer's decomposition and stability range, wherein decomposition is generally complete before 800° C. The co-polymer's glass transition temperature ($T_g$) was determined via differential scanning calorimetry (DSC) under the following temperature profile: first, the temperature was ramped from 20° C.-180° C. at a rate 10° C./min; second, the temperature was held at 180° C. for 2 min, then cooled to −60° C. at a rate of 10° C./min.; third, the temperature was ramped to 100° C. at a rate of 10° C./min. The co-polymer's $T_g$ was determined on the last temperature ramp.

Preparation of Co-Polymer

All required glassware was dried prior to use in an oven at a temperature of 120° C. over 12 hours. A 100 mL three-neck round bottom flask was equipped with a 1-inch Teflon polygon stir bar, a small glass water condenser, a 60 mL additional funnel, and rubber septa. On top of the condenser, a glass vacuum adapter was used to connect the entire three-neck round bottom flask set up (apparatus) to a vacuum/inert gas manifold system (i.e., a Schlenk line), using nitrogen as the inert gas. After the apparatus was evacuated and refilled with nitrogen three times, the apparatus was set on a Heidolph MR Hei-tec hot plate to raise the temperature to 75° C. under a flow of nitrogen. In a 100 mL one neck round bottom flask, equipped with a 1-inch polygon Teflon stir bar, monomers N-(3-(dimethylamino)propyl) methacrylamide (1.5 g) and butyl acrylate (2.5 g) was mixed with toluene (20 mL) at room temperature and stirred for 30 minutes. A stainless steel 18" gauge needle was connected to the Schlenk line, and put into the toluene solution through the rubber septa, thereby sparging nitrogen through the Schlenk line and the solution for 30 minutes under positive pressure. The monomer solution was then transferred to the additional funnel attached to the 100 mL three neck flask. Then, in a separate 50 mL one neck round bottom flask, (E)-2,2'-(diazene-1,2-diyl)bis(2-methylpropanenitrile) (4.63 mg) was dissolved in 4 mL toluene, and then sparged with nitrogen through the Schlenk line and solution for 30 minutes under positive pressure. This toluene solution was then transferred to a 10 mL syringe, the needle of which then pierced the septum of the three-neck flask, to allow for addition of the toluene solution to the flask. At 75° C., with stirring, both the monomer solution in the additional funnel, and the toluene solution of (E)-2,2'-(diazene-1,2-diyl)bis(2-methylpropanenitrile) in the syringe, was added drop wise into the three-neck flask over 60 minutes. The reaction was then kept at 75° C. for 15 hours before the hot plate was turned off to let the reaction cool to room temperature. To a 400 L beaker, equipped with a 2-inch Teflon polygon stir bar, 200 mL of hexanes added. The reaction solution was poured slowly to the stirring hexanes over 30 minutes to obtain a soft gel product. The resultant co-polymer product was then re-dissolved in a minimal amount of 2-butanone, and precipitated from a 200 mL ice-water mixture. The resultant, isolated co-polymer product was further dried at 60° C. under vacuum for 24 hours.

Co-polymer Characterization: DMAPMAm: BA (mol/mol)=1:1.7 (as determined by NMR); $T_g$=−15° C. (as determined by TGA/DSC); Mn=2600, PDI=2.2 (toluene as solvent to dissolve sample; as determined by GPC)

Coating Preparation and Test

Co-polymer (1 g) was dissolved in 2-butanone (1.5 g) in a 60 mL glass beaker, and stirred by a 1-inch polygon Teflon stir bar to obtain a clear solution. De-ionized water (3 g) was then added to the polymer solution, and a white suspension was obtained. $CO_2$ gas was bubbled through the suspension via a plastic ¼" tubing, under a pressure of 15 psi. In 5 minutes, the suspension turned into a clear, carbonated solution. The carbonated solution was coated onto a cleaned aluminium panel via a draw down coating method with using a RDS 100G rod (the panel was cleaned with isopropanol three times and air-dried prior use). The polymeric coating was air-dried first and then further dried in a 60° C. oven for 15 hours at least.

Solvent Testing:

To test the polymeric coating's resistance to solvent, 1-2 drops of a solvent—one of water, hexane, isopropanol, acetic acid, and toluene—was added to the coating, and then wiped off after 10 seconds. It was observed that the polymeric coating was hexane resistant, but less resistant to isopropanol, acetic acid, or toluene, as the polymeric coating appeared to dissolve off of the aluminum plate. It was observed that the polymeric coating turned from clear to semi-transparent in the presence of water, indicating absorption of said water.

Bending Test:

A coated panel was bent at 90°, following which the coating was observed for any possible cracking. Upon visual inspection, the coating did not appear to have any cracking.

Adherence Test:

An "X" was cut through a polymeric coating on an aluminum plate by a knife, and masking tape was taped over to the "X". Then the tape was then tore off, and any change to the coating was observed. Upon visual inspection, there was no damage observed.

Example 5

Further Investigation into Co-Polymers for Use in a Paint or Coating Composition Materials Methanol, tetrahydrofuran (HPLC grade), and hexanes were used, as received, from Fisher Scientific. 2-Butanone (≥90%), ethylene glycol butyl ether (>99%), N,N'-dimethylaminopropylmethacrylamide (DMAPMAm, 99%), butyl methacrylate (BMA, 99%, 10 ppm MEHQ), 2-hydroxyethylmethacrylate (HEMA, ≥90%, <50 ppm MEHQ), isophorone diisocyanate (IPDI, 98%), 1,8-dibromooctane (98%), and hydroxylamine hydrochloride (99%) were used, as-received, from Sigma. AIBN was received from Sigma and recrystallized in methanol (50° C., limited amount), prior to use. Toluene (ACS Grade) was used, as received, from EMD Millipore. Surfynol 104PA (Allnex) was used, as received, from Air Products. Sodium hydroxide (97%) was used, as received, from Anachemia. Monomers and solvents were used without drying, degassing, or removing inhibitor.

Analytical Methods

A $^1$H NMR analysis was completed using a Varian 400 MHz Spectrometer. NMR samples were prepared using 50 mg co-polymer, 15 mg trichloroethylene as an internal standard, and chloroform-d as solvent. TGA analysis was completed using a Mettler Toledo TGA/DSC1 (20-1100° C.), equipped with a $N_2$ flow of 20 mL/min. DSC analysis was completed using a Mettler Toledo DSC1 (−100-500° C.) equipped with furnace No, flow of 20 mL/min. Samples for TGA and DSC analysis were dried under vacuum (50 mtorr) for at least 1 h prior to running thermal analysis. TGA was ramped from 25° C. to 1000° C., at a rate of 20° C./min. Three DSC cycles were run, beginning at −80 C and heating to 120° C., cooling back to −80° C. and finally heating back to 120° C. SEC-GPC analysis was completed using a Polymer Laboratories (Varian) PL-GPC-50, with a column temperature of 40° C., tetrahydrofuran flow rate of 1 mL/min, and using a refractive index detector calibrated with Varian polystyrene standards (PL2010-0100). The GPC column is a PLgel 5 μm MIXED-C column with 300×7.5 mm dimensions. The samples were dissolved in 2-butanone to obtain a polymer concentration of 3 mg/mL, which was then filtered through a 0.2 μm syringe filter before injection.

Polymerization Procedure—DMAPMAm/BMA Co-Polymerization

All required glassware was dried in an oven at 120° C. overnight, prior to use.

A three-neck 3 L round bottom flask was equipped with a stir bar, a water condenser, and two addition funnels (a 500 mL funnel, and a 1 L funnel). This set-up was evacuated under vacuum, and its atmosphere was replaced with nitrogen; this evacuation/nitrogen-fill cycle was repeated three times. 2-Butanone (MEK, 335 mL, 269.3) was mixed with toluene (310 mL, 268.8 g), yielding a 50 wt % solution of MEK in toluene. Azobisisobutyronitrile (AIBN, 1.04 g, 6.33 mmol, 0.12 mol %) was dissolved in 400 mL of the MEK/toluene solvent, and loaded into the 500 mL addition funnel. N,N'-dimethylaminopropylmethacrylamide (DMAPMAm, 200.65 g, 1.18 mol) and butyl methacrylate (BMA, 601.70 g, 4.23 mol) were dissolved in the MEK/toluene solution (150 mL) and loaded into the 1 L addition funnel. The remaining MEK/toluene (95 mL) was added to the 3 L, three-neck round bottom flask and heated to 75° C., with stirring at 300 rpm. Monomer (DMAPMAm/BMA) and initiator (AIBN) solutions were added simultaneously over 4 h, with addition rates of 4.3 mL/min and 1.7 mL/min, respectively. Once addition was complete, polymerization was allowed to proceed overnight, at 75° C. After 18 h of reaction, the three-neck 3 L round bottom flask was cooled to room temperature, and polymer solution was precipitated in excess hexanes, yielding a white, rubber-like solid. The resultant product was purified by precipitation/dissolution in 2-butanone/hexanes, and dried in a vacuum oven at 60° C. and 90 kPa for 48 h. Yield 71%, DMAPMAm Content: 24 mol %, 3.0 mmol/g, $^1$H NMR (6 ppm, CDCl$_3$, 400 MHz): 7.94 ppm (1H, br. s, —(C=O)—NH—), 3.93 ppm (2H, br. m, —(C=O)—O—CH$_2$—), 3.22 ppm (2H, br. m, —(C=O)—NH—CH$_2$—), 2.40 ppm (2H, br. m, —(C=O)—NH—(CH$_2$)$_2$—CH$_2$—N), 2.24 ppm (6H, s, —CH$_2$—N—(CH$_3$)$_2$), 1.61 ppm (2H, br. m, —(C=O)—NH—CH$_2$—CH$_2$—CH$_2$—), 1.61 ppm (2H, br. m, —(C=O)—O—CH$_2$—CH$_2$—), 1.40 ppm (2H, br. m, —(C=O)—O—(CH$_2$)$_2$—CH$_2$—), 0.95 ppm (3H, br. m, —(C=O)—O—(CH$_2$)$_3$—CH$_3$), 0.8-1.9 ppm (backbone CH$_2$ and CH$_3$ groups), Glass Transition: 42.2° C., Molecular weight: M$_n$=30 000, M$_w$=67 000, PDI=2.2.

DMAPMAm/BMA Co-Polymer Waterborne Dispersion Composition

It was found that this co-polymer formed a waterborne dispersion (e.g., was not completely soluble in water), even when carbon dioxide was passed through aqueous suspensions of the co-polymer for >1 h. To test carbonated water solubility, poly(DMAPMAm-co-BMA) (0.5 g, 1 wt %) was added to de-ionized water (49.5 g, 99 wt %) in a 2-neck, 100 mL round-bottom flask and stirred at 500 rpm, for 1 h. A 15 mg aliquot of the liquid was taken for $^1$H NMR, dissolved in methanol-d$_4$, and no polymer resonances were observed. The dispersion was then bubbled with CO$_2$ (50-100 mL/min) for 2 h, and a second aliquot of the liquid phase was taken for $^1$H NMR analysis. The aliquot was dissolved in methanol-d$_4$, and again no polymer resonances were observed.

However, to prepare the co-polymer for application to a surface as a coating, and to thereby allow testing of the resultant polymeric coating, the following procedure was followed:

Co-polymer (20 g) was dissolved in MEK (20 g, 25 mL) and ethylene glycol butyl ether (20 g, 22 mL) for at least 4 h (33 wt % polymer loading). Ethylene glycol butyl ether was used to facilitate film formation. To the solution, de-ionized water (40 g) was slowly added, at which time the solution became a 'milky' dispersion. CO$_2$ was injected through a needle, into the mixture, with vigorous stirring, for 60 min. Formulation weight decreased with CO$_2$ injection, due to MEK vaporization, so any mass loss was replaced with an equal mass of MEK. After dissolution/dispersion, the non-ionic surfactant Surfynol 104PA (1 g, 1.25 mL) was added to the mixture.

The resultant waterborne dispersion was then applied to an aluminum panel using a drawdown bar to produce approximately 75 μm thick wet films. Films were dried in an oven, at 80° C. for 1 h, prior to coating assessment tests.

Coating Assessment Tests

As would be understood by one skilled in the art, paints and coatings, etc., that use acrylic polymers or co-polymers as binder must have a range of physical properties to impart the desired adhesion, water/oil resistance, chip and flake resistance, and longevity when such products are applied to a surface. Resistance to chipping and flaking is imparted by at least the hardness and glassiness of, for example, an acrylic co-polymer; and, this can be assessed by glass transition measurements with a differential scanning calorimeter (DSC). Typically, a glass transition (T$_g$) in the range of 20-50° C. provides chip, flake, and scratch resistance, and can be achieved by using a homopolymer with a T$_g$ in this range, or co-polymerizing two monomers where the corresponding homopolymers have higher and lower T$_g$ values. For example: DMAPMAm (homopolymer T$_g$=137° C.) was copolymerized with butyl methacrylate, a common monomer found in at least some acrylic polymer coatings, in such a ratio as to achieve a glass transition in the range of 20-50° C. Generally, it was considered that a polymer with 20-30 mol % DMAPMAm, with the remaining composition BMA, for example, will give copolymers with T$_g$ values in the desired range.

It was found that once the above-described polymer suspensions were applied to an aluminum panel and dried, the resultant dried polymeric coating exhibited good adhesion to the panels, and was not easily removed. This was further demonstrated when the coating was cut with a knife, the cut section of the coating was covered with a piece of masking tape, and the tape was pulled off: no loss or peeling of coating was observed. When a panel covered in the dried poly(DMAPMAm-co-BMA) coating was bent, the coating exhibited some stress cracking due to the relatively higher T$_g$ of the polymeric material. It was considered that the T$_g$ of the co-polymer could be reduced further by copolymerizing it with a third monomer, where the third monomer's homopolymer has a T$_g$ lower than BMA.

Solvent resistance of the polymeric coating was assessed qualitatively by applying a solvent to the dried film surface, and wiping with a non-abrasive lint-less wipe 50 times. After wiping, the coating was visually assessed for coating quality, transparency change, and thickness. All films had an initial thickness of 50 μm±5 μm, and solvent resistance results are shown in Table 6. Reduction in film thickness (loss of film thickness) indicated film removal after wiping each polymeric coating with the solvents listed in Table 6. In the case of deionized water, there was negligible loss of film thickness (4%, ~2 μm), and as such the polymer film was considered water-insoluble. Conversely, coatings that underwent 50 wipes with 2-butanone exhibited a 100% loss in film thickness, and therefore the entire coating was wiped off the panel. This indicated solubility in, and a lack of chemical resistance towards 2-butanone (methyl ethyl ketone, MEK).

The dried coatings exhibited resistance to water and aqueous solutions, however they exhibited reduced resistance to concentrated acid and organic solvents. It was considered, however, that resistance to solvents and acids could be improved by crosslinking the polymeric coating; for example, crosslinking with blocked isocyanate, melamine-formaldehydes, or epoxide chemistry, among other nucleophilic substitution reactions.

Polymerization Procedure—DMAPMAm/BMA/HEMA Copolymerization

It was considered that the reduced solvent resistance exhibited by the above-described polymeric coating could be improved by using conventional crosslinking methods for acrylic co-polymers; for example, 2-hydroxyethylmethacrylate (HEMA) is known in the art as a common acrylic co-monomer that crosslinks with isocyanate crosslinking agents. As such, a crosslinking reaction was designed with a blocked isocyanate, and a ter-polymer of DMAPMAm, BMA, and HEMA.

All required glassware was dried in an oven at 120° C. overnight, prior to use.

A three-neck 500 mL round bottom flask was equipped with a stir bar, a water condenser and two addition funnels (a 100 mL funnel, and a 250 mL funnel). This set-up was evacuated under vacuum, and its atmosphere was replaced with nitrogen; this evacuation/nitrogen-fill cycle was repeated three times. Azobisisobutyronitrile (AIBN, 0.128 g, 0.79 mmol, 0.11 mol %) was dissolved in 2-butanone (MEK; 40 mL), and loaded into the 100 mL addition funnel. N,N'-dimethylaminopropylmethacrylamide (DMAPMAm, 30.05 g, 0.18 mol), hydroxyethylmethacrylate (HEMA, 9.03 g, 0.07 mol), and butyl methacrylate (BMA, 63.24 g, 0.44 mol) were dissolved in the MEK (30 mL), and loaded the 250 mL addition funnel. The remaining MEK (15 mL) was added to the 500 mL three-neck round bottom flask, and heated to 75° C., with stirring at 300 rpm. Monomer (DMAPMAm/BMA/HEMA) and initiator (AIBN) solutions were added simultaneously over 2 h, with addition rates of 1.17 mL/min and 0.33 mL/min, respectively. Once addition was complete, polymerization was allowed to proceed overnight at 75° C. After 18 h of reaction, AIBN (0.06 g, 0.37 mmol, 0.05 mol %) dissolved in 20 mL MEK was added to the 500 mL three-neck round bottom flask, and the flask was heated to 90° C. to improve monomer conversion. Polymerization reaction was held at 90° C. for 5 h, before cooling to room temperature. The resultant polymer solution was used without further purification. DMAPMAm Content: 26.9 mol %, 3.2 mmol/g, HEMA Content: 13.5 mol %, 1.0 mmol/g, $^1$H NMR (6 ppm, CDCl$_3$, 400 MHz): 7.85 ppm (1H, br. s, —(C=O)—NH—), 3.90 ppm (2H, br. m, —(C=O)—O—CH$_2$—), 3.79 ppm (2H, br. m, —(C=O)—O—CH$_2$—CH$_2$—OH), 3.17 ppm (2H, br. m, —(C=O)—NH—CH$_2$—), 2.39 ppm (2H, br. m, —(C=O)—NH—(CH$_2$)$_2$—CH$_2$—N), 2.39 ppm (2H, br. m, —(C=O)—O—CH$_2$—CH$_2$—OH), 2.21 ppm (6H, s, —CH$_2$—N—(CH$_3$)$_2$), 1.58 ppm (2H, br. m, —(C=O)—NH—CH$_2$—CH$_2$—CH$_2$—), 1.58 ppm (2H, br. m, —(C=O)—O—CH$_2$—CH$_2$—), 1.37 ppm (2H, br. m, —(C=O)—O—(CH$_2$)$_2$—CH$_2$—), 0.91 ppm (3H, br. m, —(C=O)—O—(CH$_2$)$_3$—CH$_3$), 0.8-1.9 ppm (backbone CH$_2$ and CH$_3$ groups), Glass Transition: 47.5° C., Molecular weight: M$_n$=37 000, M$_w$=75 000, PDI=2.1.

$^1$H NMR measurements were used to determine monomer conversion to ter-polymer, ratios of DMAPMAm, BMA, and/or HEMA in each ter-polymer, and to measure monomer and solvent content in final polymer products. SEC-GPC measurements were used to determine molecular weight and molecular weight distributions for each ter-polymer. TGA was used to determine the ter-polymer degradation temperature, while DSC experiments were run below the degradation temperature to determine the ter-polymer's glass transition temperature.

Crosslinking DMAPMAm/HEMA/BMA Copolymer

2-Hydroxyethylmethacrylate (HEMA) is a known common acrylic comonomer that crosslinks with isocyanate crosslinking agents. It is known in the art that, in the presence of tertiary amines, there is some precedent for reaction of pendant hydroxyl groups with epoxides, alkyl/aryl halides, melamine-formaldehyde resins, etc. As such, a polyurethane crosslinking reaction was designed with isophorone diisocyanate (IPDI), and a ter-polymer of DMAPMAm, BMA, and HEMA (see FIG. 6). It was considered that crosslinked polymeric coatings would have improved solvent resistance compared to the above-described poly(DMAPMAm-co-BMA) co-polymer.

Figure 7:
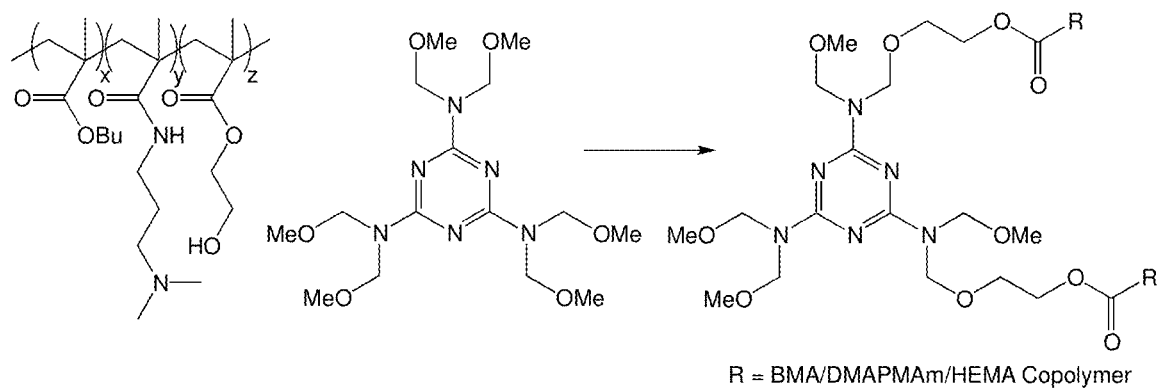
FIG. 7 depicts a general schematic of poly(BMA-co-DMAPMAm-co-HEMA) crosslinking with hexamethoxymethylmelamine, wherein one crosslink is depicted.
Figure 8:
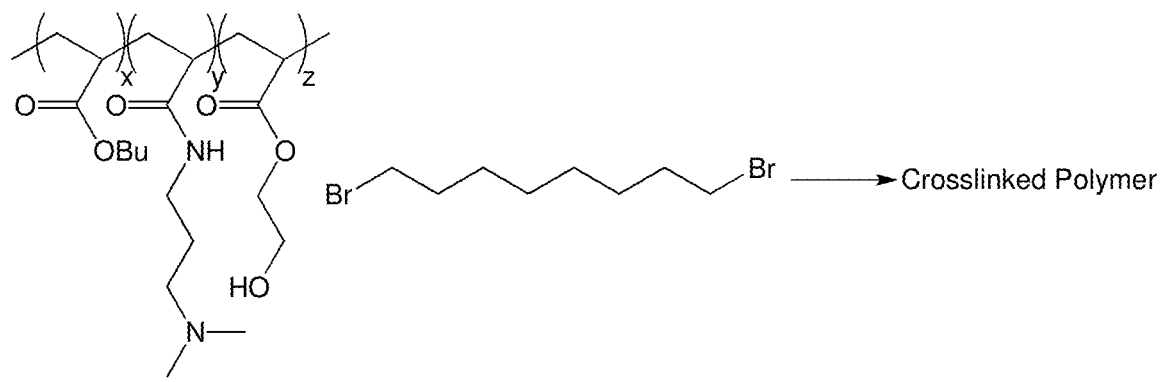
FIG. 8 depicts a general schematic of a nucleophilic substitution cross-linking reaction of 1,8-dibromobutane ($C_8H_{16}Br_2$) with poly(BMA-co-DMAPMAm-co-HEMA) generating a cross-linked polymer.

It was considered that poly(BMA-co-DMAPMAm-co-HEMA) can also be cross-linked with melamine/formaldehyde resins (FIG. 7), and even alkyl halides (FIG. 8). Melamine/formaldehyde resins (hexamethoxymethylmelamine) typically require a strong acid catalyst to react with hydroxyl groups, however it was considered that pendant amine groups of poly(BMA-co-DMAPMAm-co-HEMA) may deprotonate a small fraction of the hydroxyl groups to form strong enough nucleophiles to displace methoxy groups in the hexamethoxymethyl-melamine (HMMM). Alkyl halide crosslinking was expected to produce tetraalkylammonium bromide groups within the cross-linked polymer, although it was considered that the tertiary amine groups may deprotonate a fraction of pendant hydroxyl groups, leading to O-alkylation reactions with the dibromooctane (C$_8$H$_{16}$Br$_2$) cross-linker.

Poly(BMA-co-DMAPMAm-co-HEMA) Crosslinking in MEK Solution

Poly(BMA-co-DMAPMAm-co-HEMA) (1 g solution) in 50 wt % MEK solution was mixed with IPDI (108 mg), or HMMM (63.1 mg), or 1,8-dibromooctane (132 mg). Each sample was mixed on a rotary shaker at 500 rpm, for 20 min. After mixing, each sample was applied to a separate aluminum panel using a 125 µm wet film drawdown bar. The three samples comprising cross-linkers and a control sample (no cross-linker in the control sample), were cured at 130° C. in an oven for 2 h. After 2 h, samples were removed from the oven, cooled to room temperature, and assessed for solvent resistance. Reduction in film thickness (loss of film thickness) indicated film removal after wiping each polymeric coating with the solvents listed in Table 7. In the case of deionized water, there was negligible loss of film thickness (4%, 2 µm), and as such the polymer film was considered water resistant. Conversely, some coatings that underwent 50 wipes with 2-butanone exhibited a 100% loss in film thickness, and therefore the entire coating was wiped off the panel. This indicated solubility in, and a lack of chemical resistance towards 2-butanone (methyl ethyl ketone, MEK).

Poly(BMA-co-DMAPMAm-co-HEMA) Crosslinking in MEK/Carbonated Water Solution

Crosslinking of poly(BMA-co-DMAPMAm-co-HEMA) in aqueous solution was investigated to determine whether conventional crosslinking chemistry was still applicable to the switchable ter-polymer. An aqueous polymer solution was prepared, beginning with 50 wt % poly(BMA-co-DMAPMAm-co-HEMA) in MEK. To this solution was slowly added de-ionized water. After adding 20 g of deionized water, the solution became cloudy and an additional 12 g of MEK was added to the solution while mixing at 500 rpm. Water/solvent addition was continued, and the final solution contained an additional 34 g water and 24 g MEK, with a 25 wt % polymer loading. Isocyanates are known to not be stable in aqueous solution, and react with water to form the corresponding amine and release carbon dioxide; as such, IPDI and a second isocyanate polyhexamethylenediisocyanate (pHMDI) were protected with methyl ethyl ketone oxime (MEKOx) to prevent reaction with water.

Synthesis of Methyl Ethyl Ketone Oxime MEKOx): Methyl ethyl ketone oxime was prepared following the procedure of Keglevich et al (Keglevich, G., et al., *Spectroscopy Letters*, 42 (2009), 67-72). To a single-neck, 100 mL round bottom flask was added hydroxylamine hydrochloride (10.00 g, 0.14 mol), sodium hydroxide (6.03 g, 0.15 mol), and 30 mL de-ionized water. MEK (12 mL, 9.60 g, 0.13 mol) was added to the flask, and the contents were stirred at 400 rpm for 3 h. After 3 h, the resultant two-phase mixture was separated, and the organic phase was dried with sodium sulphate and distilled under vacuum. Oxime (5.2 g, 48% yield) was recovered as a colourless oil, $^1$H NMR (6 ppm, CDCl$_3$, 400 MHz): 2.38 ppm (2H, q, —N=C—CH$_2$—, E isomer), 2.20 ppm (2H, q, —N=C—CH$_2$—, Z isomer), 1.87 ppm (3H, s, —N=C—CH$_3$, Z Isomer), 1.85 ppm (3H, s, —N=C—CH$_3$, E Isomer), 1.07 ppm (3H, m, —CH$_2$—CH$_3$).

Synthesis of MEKOx-Blocked IPDI: All glassware was dried at 120° C. overnight prior to use, and evacuated and back-filled with nitrogen gas prior to use. To a 2-neck, 25 mL round bottom flask was added methyl ethyl ketone oxime (MEKOx, 0.429 g, 4.92 mmol), isophorone diisocyanate (IPDI, 0.988, 4.49 mmol), and MEK (5 mL). This solution was stirred at 300 rpm and heated to 50° C. for 18 h. After 18 h, the solution was cooled, an aliquot was taken for $^1$H NMR analysis, and the solution was used as is for aqueous crosslinking reactions. $^1$H NMR (6 ppm, CDCl$_3$, 400 MHz): 3.01 ppm (s, 2H), 2.26 ppm (m, 3H).

Synthesis of MEKOx-Blocked polyhexamethylenediisocyanate (pHMDI): All glassware was dried at 120° C. overnight prior to use, and evacuated and back-filed with nitrogen gas prior to use. To a 2-neck, 25 mL round bottom flask was added methyl ethyl ketone oxime (MEKOx, 0.322 g, 3.67 mmol), polyhexamethylenediisocyanate (pHMDI, 0.431 g, 0.90 mmol), and MEK (5 mL). This solution was stirred at 300 rpm and heated to 50° C. for 18 h. After 18 h, the solution was cooled, an aliquot was taken for $^1$H NMR analysis, and the solution was used as is for aqueous crosslinking reactions. $^1$H NMR (6 ppm, CDCl$_3$, 400 MHz): 2.24 ppm (s, 2H), 1.93 ppm (m, 3H).

Crosslinking: Poly(BMA-co-DMAPMAm-co-HEMA) (10.00 g solution) in 25 wt % MEK/carbonated water solution was mixed with MEKOx-blocked IPDI (MEKOx-b-IPDI, 0.48 g), or MEKOx-blocked pHMDI (MEKOx-b-pHMDI, 0.60 g), or HMMM (0.18 g), or 1,8-dibromooctane (0.33). Each sample was mixed on a rotary shaker at 500 rpm, for 20 min. After mixing, each sample was applied to a separate aluminum panel using a 125 μm wet film drawdown bar. The four samples comprising cross-linkers and a control sample (control contained no cross-linker), were cured at 130° C. in an oven for 2 h. After 2 h, samples were removed from the oven, cooled to room temperature, and assessed for solvent resistance. Reduction in film thickness (loss of film thickness) indicated film removal after wiping each polymeric coating with the solvents listed in Table 8. In the case of deionized water, there was negligible loss of film thickness (≤4%, ≤2 μm), and as such the polymer film was considered water-resistant. Conversely, some coatings that underwent 50 wipes with 2-butanone exhibited a 100% loss in film thickness, and therefore the entire coating was wiped off the panel. This indicated solubility in, and a lack of chemical resistance towards 2-butanone (methyl ethyl ketone, MEK).

TABLE 1

GPC analysis of switchable co-polymers

| | poly(MMA-co-DEAEMA) | | | |
|---|---|---|---|---|
| | 10/90 | 20/80 | 30/70 | 40/60 |
| Molecular Weight[a] | 27,000 | 70,000 | 28,000 | 64,000 |
| Polydispersity Index[a] | 1.8 | 1.7 | 1.8 | 1.8 |
| $T_g$ ° C. (Estimated)[b] | 29 | 37 | 46 | 54 |

[a]Obtained from Gel Permeation Chromatography;
[b]Estimated from Flory-Fox Equation

TABLE 2

Characterization of poly(MMA-co-DEAEMA) co-polymers (Example 3B)

| | poly(MMA-co-DEAEMA) | | | |
|---|---|---|---|---|
| | 10/90 | 20/80 | 30/70 | 40/60 |
| Molecular weight (*10$^3$) | 45 | 60 | 40 | 50 |
| Polydispersity index | 1.8 | 1.7 | 1.8 | 1.6 |
| $T_g$ ° C. (Estimated) | 29 | 37 | 46 | 54 |

TABLE 3

Water, isopropanol and 1M acetic acid wipe tests on 10/90, 20/80, 30/70 and 40/60 poly(MMA-co-DEAEMA) polymeric coatings

| | poly(MMA-co-DEAEMA) | | | |
|---|---|---|---|---|
| | 10/90 | 20/80 | 30/70 | 40/60 |
| Water | Pass | Pass | Pass | Pass |
| Soapy Water | Fail | Fail | Pass | Pass |
| Isopropanol | Fail | Fail | Fail | Fail |
| Acetic Acid | Fail | Fail | Fail | Fail |

TABLE 4

Water, isopropanol and 1M acetic acid wipe tests on cured co-polymer 10/90, 20/80, 30/70 and 40/60 poly(MMA-co-DEAEMA) polymeric coatings cross-linked with 1,6-dibromohexane (a) or dibromo-p-xylene (b)

| | poly(MMA-co-DEAEMA) | | | | | | | |
|---|---|---|---|---|---|---|---|---|
| | 10/90 | | 20/80 | | 30/70 | | 40/60 | |
| | a | b | a | b | a | b | a | b |
| Water | Pass | Pass | Pass | Pass | Pass | Pass | Pass | Pass |
| Soapy Water | Fail | Pass | Pass | Pass | Pass | Pass | Pass | Pass |
| Isopropanol | Fail | Fail | Fail | Fail | Fail | Fail | Fail | Fail |
| Acetic Acid | Fail | Fail | Fail | Fail | Fail | Fail | Fail | Fail |

TABLE 5

Water, isopropanol and 1M acetic acid wipe tests on cured polymeric coatings of homopolymer ptBAEMA, ptBAEMA cross-linked with 1,6-dibromo hexane, and ptBAEMA cross-linked dibromo-p-xylene

| | ptBAEMA | ptBAEMA + 1,6-dibromohexane | ptBAEMA + dibromo-p-xylene |
|---|---|---|---|
| Water | Fail | Pass | Pass |
| Soapy Water | Fail | Pass | Pass |
| Isopropanol | Fail | Fail | Pass |
| Acetic Acid | Fail | Fail | Fail |

TABLE 6

Poly(DMAPMAm-co-BMA) resistance to aqueous solutions, and organic solvents

| Solvent | Transparency | Loss of Film Thickness (% loss) |
|---|---|---|
| De-ionized water | Transparent | 4 |
| Soapy Water (5 mL soap in 100 mL water) | Transparent | 0 |

TABLE 6-continued

Poly(DMAPMAm-co-BMA) resistance to aqueous solutions, and organic solvents

| Solvent | Transparency | Loss of Film Thickness (% loss) |
|---|---|---|
| Acetic Acid (3 wt % in water) | Transparent | 0 |
| Glacial Acetic Acid (98%) | Film Wiped Off | 100 |
| Methanol | Film Wiped Off | 100 |
| 2-Butanone | Film Wiped Off | 100 |

TABLE 7

Solvent wipe tests for poly(BMA-co-DMAPMAm-co-HEMA) coatings where polymer was dissolved in MEK prior to application (example without $CO_2$)

| Solvent | Crosslinker | Transparency | Loss of Film Thickness (% loss) |
|---|---|---|---|
| De-ionized water | No Crosslinker | Transparent | 4 |
| | IPDI | Transparent | 1 |
| | HMMM | Transparent | 2 |
| | $C_8H_{16}Br_2$ | Transparent | 0 |
| Soapy Water (5 wt % in $H_2O$) | No Crosslinker | Transparent | 0 |
| | IPDI | Transparent | 5 |
| | HMMM | Transparent | 2 |
| | $C_8H_{16}Br_2$ | Transparent | 2 |
| Acetic Acid (3 wt % in $H_2O$) | No Crosslinker | Transparent | 0 |
| | IPDI | Transparent | 0 |
| | HMMM | Transparent | 0 |
| | $C_8H_{16}Br_2$ | Transparent | 3 |
| Glacial Acetic Acid (98%) | No Crosslinker | Film Wiped Off | 100 |
| | IPDI | Film Wiped Off | 100 |
| | HMMM | Film Wiped Off | 100 |
| | $C_8H_{16}Br_2$ | Film Wiped Off | 100 |
| Methanol | No Crosslinker | Film Wiped Off | 100 |
| | IPDI | Translucent | 25 |
| | HMMM | Opaque | 10 |
| | $C_8H_{16}Br_2$ | Film Wiped Off | 100 |
| MEK | No Crosslinker | Film Wiped Off | 100 |
| | IPDI | Transparent | 8 |
| | HMMM | Opaque | 23 |
| | $C_8H_{16}Br_2$ | Film Wiped Off | 100 |

TABLE 8

Solvent wipe tests for poly(BMA-co-DMAPMAm-co-HEMA) coatings where polymer was dissolved in methyl ethyl ketone (MEK)/carbonated water prior to application (example with aqueous $CO_2$)

| Solvent | Crosslinker | Transparency | Loss of Film Thickness (% loss) |
|---|---|---|---|
| De-ionized water | No Crosslinker | Transparent | 4 |
| | MEKOx-b-IPDI | Transparent | 5 |
| | MEKOx-b-pHMDI | Transparent | 5 |
| | HMMM | Transparent | 4 |
| | $C_8H_{16}Br_2$ | Transparent | 0 |
| Soapy Water (5 wt % in $H_2O$) | No Crosslinker | Transparent | 0 |
| | MEKOx-b-IPDI | Transparent | 4 |
| | MEKOx-b-pHMDI | Transparent | 4 |
| | HMMM | Transparent | 3 |
| | $C_8H_{16}Br_2$ | Transparent | 5 |
| Acetic Acid (3 wt % in $H_2O$) | No Crosslinker | Transparent | 0 |
| | MEKOx-b-IPDI | Transparent | 3 |
| | MEKOx-b-pHMDI | Transparent | 3 |
| | HMMM | Transparent | 4 |
| | $C_8H_{16}Br_2$ | Transparent | 7 |

TABLE 8-continued

Solvent wipe tests for poly(BMA-co-DMAPMAm-co-HEMA) coatings where polymer was dissolved in methyl ethyl ketone (MEK)/carbonated water prior to application (example with aqueous $CO_2$)

| Solvent | Crosslinker | Transparency | Loss of Film Thickness (% loss) |
|---|---|---|---|
| Glacial Acetic Acid (98%) | No Crosslinker | Film Wiped Off | 100 |
| | MEKOx-b-IPDI | Opaque | 6 |
| | MEKOx-b-pHMDI | Opaque | 4 |
| | HMMM | Opaque | 0 |
| | $C_8H_{16}Br_2$ | Opaque | 10 |
| Methanol | No Crosslinker | Film Wiped Off | 100 |
| | MEKOx-b-IPDI | Opaque | 28 |
| | MEKOx-b-pHMDI | Transparent | 4 |
| | HMMM | Opaque | 11 |
| | $C_8H_{16}Br_2$ | Opaque | 0 |
| MEK | No Crosslinker | Film Wiped Off | 100 |
| | MEKOx-b-IPDI | Translucent | 5 |
| | MEKOx-b-pHMDI | Transparent | 0 |
| | HMMM | Opaque | 21 |
| | $C_8H_{16}Br_2$ | Translucent | 5 |

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of forming a film on a substrate, comprising:
applying to a substrate a composition comprising:
a liquid medium; and
a polymer that has a $T_g$ in the range of from about 20° C. to about 50° C., and that comprises protonatable moieties, wherein a portion of the protonatable moieties are in their protonated form such that the degree of polymer protonation is sufficient to at least partially solvate the polymer in the liquid medium; the liquid medium comprising water or an aqueous solution and an acid gas dissolved at a concentration sufficient to maintain said portion of protonatable moieties in their protonated form;
crosslinking the composition, the composition comprising at least one cross-linking agent,
wherein the at least one crosslinking agent is inhibited from cross-linking by the dissolved acid gas,
wherein, when the composition is applied to the substrate under ambient conditions the concentration of dissolved acid gas decreases such that some or all of the portion of protonatable moieties switch from their protonated form to their non-protonated form and the degree of polymer protonation is reduced such that it becomes insufficient to maintain the at least partial dissolution of the polymer in the liquid medium, and the polymer forms a film that is substantially water-insoluble, water-resistant, and/or hydrophobic.

2. The method of claim 1, wherein the acid gas is $CO_2$, $CS_2$, or COS.

3. The method of claim 1, wherein the protonatable moieties of the composition comprise one or more of the following characteristics:
(i) the protonatable moieties are guanidines, amidines, tertiary amines, secondary amines, primary amines, or a combination of two or more of these moieties; and
(ii) the protonatable moieties comprise one or more of

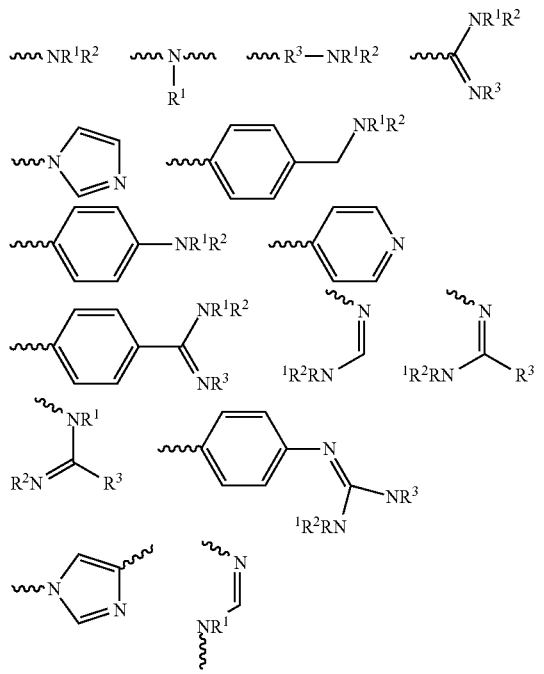

where
the wiggly lines represent one or more bonds attaching the protonatable moiety to the remainder of the polymer; and
each of $R^1$, $R^2$, and $R^3$ is independently:
(a) H, an aliphatic group, a substituted aliphatic group, or absent, as required to satisfy valence rules;
(b) H, alkyl, substituted alkyl, cycloalkyl, substituted cycloalkyl, heterocycloalkyl, substituted heterocycloalkyl, alkenyl, substituted alkenyl, alkynyl, substituted alkynyl, aryl, substituted aryl, heteroaryl, or substituted heteroaryl;
(c) H; a substituted or unsubstituted $C_1$ to $C_8$ alkyl, alkenyl, or alkynyl group that is linear, branched, or cyclic; a substituted or unsubstituted $C_1$ to $C_8$ alkyl, alkenyl, or alkynyl group that is linear, branched, or cyclic, wherein one or more C of the alkyl group is replaced by $\{-Si(R^4)_2-O-\}$; a substituted or unsubstituted $C_kSi_m$ group where k and m are independently a number from 0 to 8 and k+m is a number from 1 to 8; a substituted or unsubstituted $C_4$ to $C_8$ aryl group; a substituted or unsubstituted $C_4$ to $C_8$ aryl group, wherein one or more C is replaced by $\{-Si(R^4)_2-O-\}$; a substituted or unsubstituted aryl group having 4 to 8 ring atoms; a substituted or unsubstituted aryl group having 4 to 8 ring atoms, wherein said aryl group comprises one or more $\{-Si(R^4)_2-O-\}$; a $-(Si(R^4)_2-O)_p-$ chain in which p is from 1 to 8 which is terminated by H, or is terminated by a substituted or unsubstituted $C_1$ to $C_8$ aliphatic group; wherein $R^4$ is a substituted or unsubstituted $C_1$ to $C_8$ aliphatic group; or wherein any two of $R^1$, $R^2$, and $R^3$, taken together with the nitrogen to which they are attached, are joined to form a heterocyclic ring; or
(d) H, $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl.
4. The method of claim 1, wherein the polymer comprises one or more of the following characteristics:
(a) the polymer is a linear or branched homopolymer; a linear or branched co-polymer comprising two or more repeat units; a dendrimer; a self-assembled polymer; a cross-linking polymer; or any combination thereof;
(b) the polymer is a linear or branched homopolymer; a linear or branched co-polymer comprising two or more repeat units; a dendrimer; a self-assembled polymer; a cross-linking polymer; or any combination thereof; wherein the co-polymer, dendrimer, self-assembled polymer, or cross-linking polymer comprise repeat units having protonatable moieties, and repeat units having no protonatable moieties;
(c) the polymer is a linear or branched homopolymer; a linear or branched co-polymer comprising two or more repeat units; a dendrimer; a self-assembled polymer; a cross-linking polymer; or any combination thereof; wherein the co-polymer is a random co-polymer; a graft co-polymer; a block co-polymer; a star co-polymer; or any combination thereof;
(d) the polymer comprises one or more repeat units selected from the group consisting of:

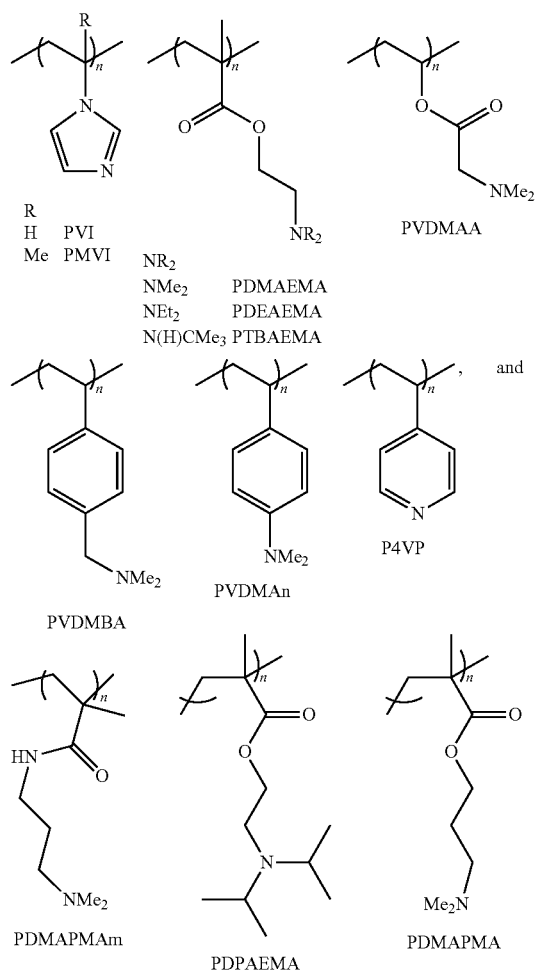

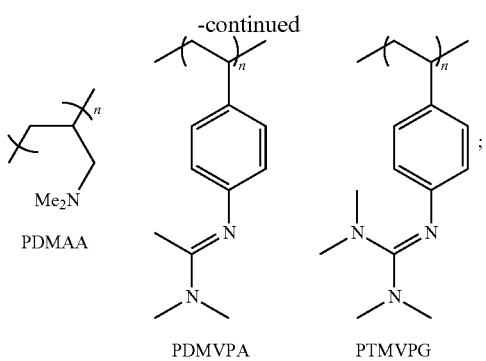

PDMAA   PDMVPA   PTMVPG (e) the polymer is poly(2-diethylamino)ethyl methacrylate, (p(DEAEMA)); or poly(methylmethacrylate)-poly(2-diethylamino)ethylmethacrylate (p(MMA-co-DEAEMA)); or, poly(N,N'-dimethylaminopropylmethacrylamide); or, poly(N,N'-dimethylaminopropylmethacrylamide)-co-poly(butylmethacrylate) (p(DMAPMAm-co-BMA)); or poly(dimethylaminopropylmethacrylamide-co-butylacrylate) (p(DMAPMAm-co-BA)); or poly(N,N'-dimethylaminopropylmethacrylamide)-poly(butylmethacrylate)-poly(2-hydroxyethylmethacrylate) (p(DMAPMAm-co-BMA-co-HEMA));

(f) the polymer has a $T_g$ in the range of from about 20° C. to about 50° C.; or, alternatively, from about 30° C. to about 50° C.; or, alternatively, from about 40° C. to about 50° C.; or, alternatively, from about 30° C. to about 45° C.;

(g) the polymer has a $T_g$ in the range of from about −20° C. to about 50° C.; or, alternatively, from about −15° C. to about 50° C.; or, alternatively from about −20° C. to about 20° C.;

(h) the polymer has a molecular weight between 5000-100000; or, between 10000-100000; or, between 10000-80000; or between 15000-80000; or, between 20000-75000; or, between 25000-70000; or between 40000-60000;

(i) the polymer is present at a concentration of from about 10-60% by weight, or from about 15-40% by weight; and (j) the polymer is present at a concentration of from about 20-40% by weight, or from about 20-30% by weight, or about 20%, or about 25%.

5. The method of claim 1, wherein the composition is applied to a surface at a temperature of:

(a) about room temperature; or, alternatively, at a temperature of about 25° C.; or, alternatively, at a temperature between about 25° C. to about 15° C.; or, alternatively at a temperature between about 25° C. to about 10° C.; or, alternatively at a temperature between about 25° C. to about 5° C.; or, alternatively at a temperature between about 25° C. to about 1° C.; or, alternatively at a temperature about 4° C.; or, alternatively at a temperature about, or below 0° C.; or (b) about 250° C.; or, alternatively, at a temperature of about 150° C.; or, alternatively, at a temperature between about 60° C. to about 250° C.; or, alternatively at a temperature between about 60° C. to about 200° C.; or, alternatively at a temperature between about 60° C. to about 150° C.; or, alternatively at a temperature between about 60° C. to about 110° C.

6. The method of claim 1, wherein applying is:
(a) spread, sprayed, flow coated, electrodeposited, roll-to-roll processed, painted, dipped, or cast on the substrate;
(b) applied to a substrate by brush, draw-down bar, doctor blades, knives, air knives, immersion, extrusion, spray, heated spray, or any other application method; or
(c) applied to the substrate by ink jets, roll-to-roll processing, lithography, flexography, or ink rollers.

7. The method of claim 1, wherein crosslinking the composition comprises crosslinking during, or after application of the composition to the substrate; or wherein crosslinking the composition comprises crosslinking while curing the composition.

8. The method of claim 7, wherein curing comprises heating, drying under a stream of flushing gas, or allowing the composition to dry under ambient conditions.

9. A method of forming a film on a substrate, comprising:
applying to a substrate a composition comprising:
a liquid medium; and a polymer that has a $T_g$ in the range of from about 40° C. to about 50° C., and that comprises protonatable moieties, wherein a portion of the protonatable moieties are in their protonated form such that the degree of polymer protonation is sufficient to at least partially solvate the polymer in the liquid medium; the liquid medium comprising water or an aqueous solution and an acid gas dissolved at a concentration sufficient to maintain said portion of protonatable moieties in their protonated form;
wherein, when the composition is applied to the substrate under ambient conditions the concentration of dissolved acid gas decreases such that some or all of the portion of protonatable moieties switch from their protonated form to their non-protonated form and the degree of polymer protonation is reduced such that it becomes insufficient to maintain the at least partial dissolution of the polymer in the liquid medium, and the polymer forms a film that is substantially water-insoluble, water-resistant, and/or hydrophobic; and
curing the composition.

10. The method of claim 9, wherein the acid gas is $CO_2$, $CS_2$, or COS.

11. The method of claim 9, wherein the protonatable moieties of the composition comprise one or more of the following characteristics:
(i) the protonatable moieties are guanidines, amidines, tertiary amines, secondary amines, primary amines, or a combination of two or more of these moieties; and
(ii) the protonatable moieties comprise one or more of

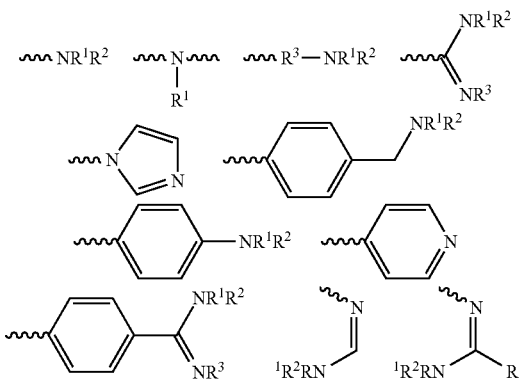

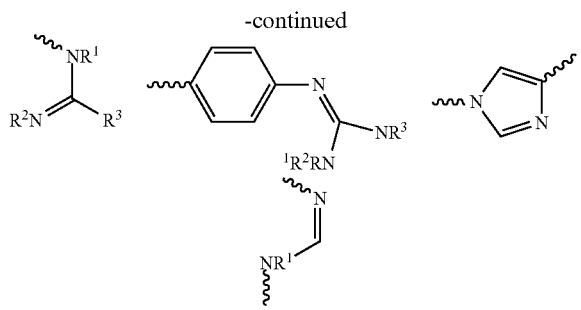

where
the wiggly lines represent one or more bonds attaching the protonatable moiety to the remainder of the polymer; and
each of $R^1$, $R^2$, and $R^3$ is independently:
(a) H, an aliphatic group, a substituted aliphatic group, or absent, as required to satisfy valence rules;
(b) H, alkyl, substituted alkyl, cycloalkyl, substituted cycloalkyl, heterocycloalkyl, substituted heterocycloalkyl, alkenyl, substituted alkenyl, alkynyl, substituted alkynyl, aryl, substituted aryl, heteroaryl, or substituted heteroaryl;
(c) H; a substituted or unsubstituted $C_1$ to $C_8$ alkyl, alkenyl, or alkynyl group that is linear, branched, or cyclic; a substituted or unsubstituted $C_1$ to $C_8$ alkyl, alkenyl, or alkynyl group that is linear, branched, or cyclic, wherein one or more C of the alkyl group is replaced by $\{-Si(R^4)_2-O-\}$; a substituted or unsubstituted $C_kSi_m$ group where k and m are independently a number from 0 to 8 and k+m is a number from 1 to 8; a substituted or unsubstituted $C_4$ to $C_8$ aryl group; a substituted or unsubstituted $C_4$ to $C_8$ aryl group, wherein one or more C is replaced by $\{-Si(R^4)_2-O-\}$; a substituted or unsubstituted aryl group having 4 to 8 ring atoms; a substituted or unsubstituted aryl group having 4 to 8 ring atoms, wherein said aryl group comprises one or more $\{-Si(R^4)_2-O-\}$; a $-(Si(R^4)_2-O)_p-$ chain in which p is from 1 to 8 which is terminated by H, or is terminated by a substituted or unsubstituted $C_1$ to $C_8$ aliphatic group; wherein $R^4$ is a substituted or unsubstituted $C_1$ to $C_8$ aliphatic group; or wherein any two of $R^1$, $R^2$, and $R^3$, taken together with the nitrogen to which they are attached, are joined to form a heterocyclic ring; or
(d) H, $C_1$-$C_6$ alkyl, substituted $C_1$-$C_6$ alkyl, $C_2$-$C_6$ alkenyl, substituted $C_2$-$C_6$ alkenyl, $C_2$-$C_6$ alkynyl, or substituted $C_2$-$C_6$ alkynyl.

12. The method of claim 9, wherein the polymer comprises one or more of the following characteristics:
(a) the polymer is a linear or branched homopolymer; a linear or branched co-polymer comprising two or more repeat units; a dendrimer; a self-assembled polymer; a cross-linking polymer; or any combination thereof;
(b) the polymer is a linear or branched homopolymer; a linear or branched co-polymer comprising two or more repeat units; a dendrimer; a self-assembled polymer; a cross-linking polymer; or any combination thereof; wherein the co-polymer, dendrimer, self-assembled polymer, or cross-linking polymer comprise repeat units having protonatable moieties, and repeat units having no protonatable moieties;
(c) the polymer is a linear or branched homopolymer; a linear or branched co-polymer comprising two or more repeat units; a dendrimer; a self-assembled polymer; a cross-linking polymer; or any combination thereof; wherein the co-polymer is a random co-polymer; a graft co-polymer; a block co-polymer; a star co-polymer; or any combination thereof;
(d) the polymer comprises one or more repeat units selected from the group consisting of:

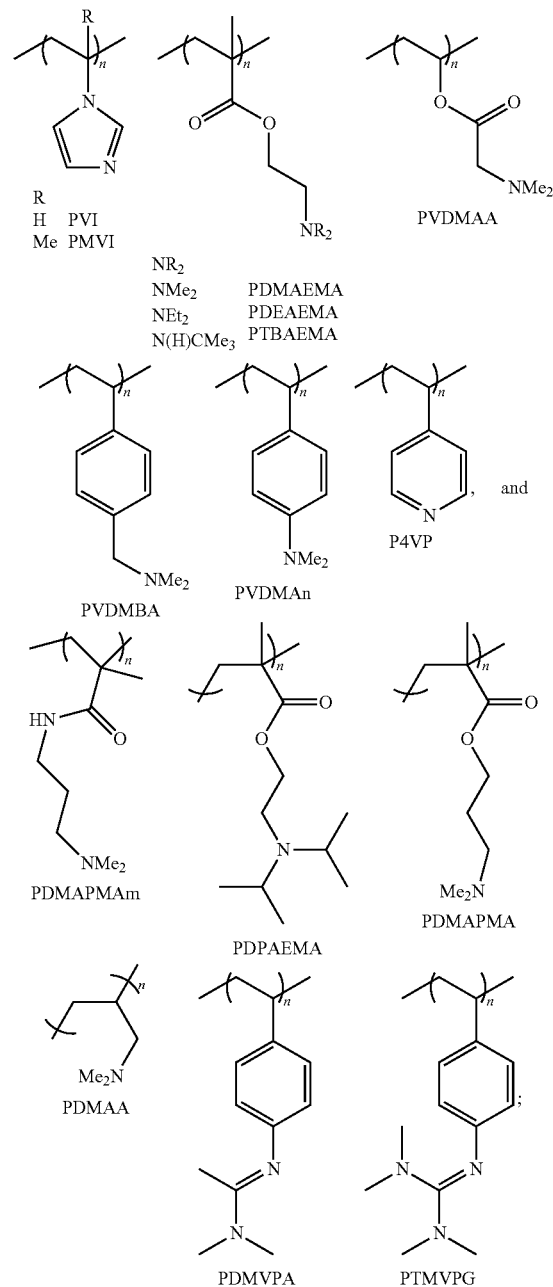

(e) the polymer is poly(2-diethylamino)ethyl methacrylate, (p(DEAEMA)); or poly(methylmethacrylate)-poly(2-diethylamino)ethylmethacrylate (p(MMA-co-DEAEMA)); or, poly(N,N'-dimethylaminopropylmethacrylamide); or, poly(N,N'-dimethylaminopropylmethacrylamide)-co-poly (butylmethacrylate) (p(DMAPMAm-co-BMA)); or poly(dimethylaminopropylmethacrylamide-co-butylacrylate) (p(DMAPMAm-co-BA)); or poly(N,N'-dimethylaminopropylmethacrylamide)-poly(butylmethacrylate)-poly(2-hydroxyethylmethacrylate) (p(DMAPMAm-co-BMA-co-HEMA));

(f) the polymer has a $T_g$ in the range of from about 20° C. to about 50° C.; or, alternatively, from about 30° C. to about 50° C.; or, alternatively, from about 40° C. to about 50° C.; or, alternatively, from about 30° C. to about 45° C.;

(g) the polymer has a $T_g$ in the range of from about −20° C. to about 50° C.; or, alternatively, from about −15° C. to about 50° C.; or, alternatively from about −20° C. to about 20° C.;

(h) the polymer has a molecular weight between 5000-100000; or, between 10000-100000; or, between 10000-80000; or between 15000-80000; or, between 20000-75000; or, between 25000-70000; or between 40000-60000;

(i) the polymer is present at a concentration of from about 10-60% by weight, or from about 15-40% by weight; and (j) the polymer is present at a concentration of from about 20-40% by weight, or from about 20-30% by weight, or about 20%, or about 25%.

13. The method of claim 9, wherein the composition is applied to a surface at a temperature of:

(a) about room temperature; or, alternatively, at a temperature of about 25° C.; or, alternatively, at a temperature between about 25° C. to about 15° C.; or, alternatively at a temperature between about 25° C. to about 10° C.; or, alternatively at a temperature between about 25° C. to about 5° C.; or, alternatively at a temperature between about 25° C. to about 1° C.; or, alternatively at a temperature about 4° C.; or, alternatively at a temperature about, or below 0° C.; or (b) about 250° C.; or, alternatively, at a temperature of about 150° C.; or, alternatively, at a temperature between about 60° C. to about 250° C.; or, alternatively at a temperature between about 60° C. to about 200° C.; or, alternatively at a temperature between about 60° C. to about 150° C.; or, alternatively at a temperature between about 60° C. to about 110° C.

14. The method of claim 9, wherein the composition is:

(a) spread, sprayed, flow coated, electrodeposited, roll-to-roll processed, painted, dipped, or cast on the substrate;

(b) applied to a substrate by brush, draw-down bar, doctor blades, knives, air knives, immersion, extrusion, spray, heated spray, or any other application method; or (c) applied to the substrate by ink jets, roll-to-roll processing, lithography, flexography, or ink rollers.

15. The method of claim 9, wherein curing the composition comprises crosslinking during, or after application of the composition to the substrate.

16. The method of claim 9, wherein curing comprises heating, drying under a stream of flushing gas, or allowing the composition to dry under ambient conditions.

* * * * *